US012560685B2

(12) United States Patent
Ono

(10) Patent No.: US 12,560,685 B2
(45) Date of Patent: Feb. 24, 2026

(54) Q-SWITCHED SEMICONDUCTOR LIGHT-EMITTING ELEMENT AND DISTANCE MEASURING DEVICE

(71) Applicant: Sony Group Corporation, Tokyo (JP)

(72) Inventor: Tomoki Ono, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 857 days.

(21) Appl. No.: 17/769,918

(22) PCT Filed: Nov. 16, 2020

(86) PCT No.: PCT/JP2020/042557
§ 371 (c)(1),
(2) Date: Apr. 18, 2022

(87) PCT Pub. No.: WO2021/100644
PCT Pub. Date: May 27, 2021

(65) Prior Publication Data
US 2022/0413099 A1 Dec. 29, 2022

(30) Foreign Application Priority Data

Nov. 18, 2019 (JP) ................................. 2019-207930

(51) Int. Cl.
G01S 7/481 (2006.01)
G01S 7/4863 (2020.01)
G01S 17/10 (2020.01)

(52) U.S. Cl.
CPC ........... G01S 7/4811 (2013.01); G01S 7/4818 (2013.01); G01S 7/4863 (2013.01); G01S 17/10 (2013.01)

(58) Field of Classification Search
CPC .... G01S 7/4811; G01S 7/4818; G01S 7/4863; G01S 17/10; G01S 7/4812; G01S 7/484; H01S 5/22; H01S 5/06253; H01S 5/0615
See application file for complete search history.

(56) References Cited

U.S. PATENT DOCUMENTS 4,380,391 A    4/1983   Buser et al.
5,854,870 A   *   12/1998   Helmfrid ............... G11B 7/127
                                               359/328

(Continued)

FOREIGN PATENT DOCUMENTS

JP       H01-262683 A    10/1989
JP       H05-090700 A    4/1993

(Continued)

OTHER PUBLICATIONS

International Search Report issued in International Patent Application No. PCT/JP2020/042557 on Feb. 2, 2021 and English translation of same. 8 pages.

(Continued)

*Primary Examiner* — Seung C Sohn
(74) *Attorney, Agent, or Firm* — K&L Gates LLP

(57) ABSTRACT

There is provided a Q-switched semiconductor light-emitting element, including a comb electrode that has at least two or more gain regions and two or more absorption regions, the regions including an active layer and being continuous on a semiconductor substrate, separation regions being provided between the gain regions and the absorption regions, the longest region of the gain regions being located on a rear end surface side; and an optical waveguide that staddles the gain regions, the absorption regions, and the separation regions.

5 Claims, 49 Drawing Sheets

(56) References Cited

U.S. PATENT DOCUMENTS

| 9,287,450 B2 * | 3/2016 | Saito .................... H10H 20/825 |
|---|---|---|
| 2006/0227818 A1 | 10/2006 | Gubenko |
| 2019/0173262 A1 | 6/2019 | Ono et al. |
| 2019/0181608 A1 | 6/2019 | Ono et al. |

FOREIGN PATENT DOCUMENTS

| JP | H10-229252 A | 8/1998 |
|---|---|---|
| JP | 2005-039099 A | 2/2005 |
| JP | 2005-051504 A | 2/2005 |
| JP | 2008-258274 A | 10/2008 |
| JP | 2014-089069 A | 5/2014 |
| WO | WO2005008851 | 1/2005 |
| WO | WO2018037697 A1 | 3/2018 |
| WO | WO2018037747 A1 | 3/2018 |

OTHER PUBLICATIONS

Written Opinion issued in International Patent Application No. PCT/JP2020/042557 on Feb. 2, 2021. 4 pages.

P. P. Vasil'ev, IEEE Journal of Quantum Electronics, vol. 24, pp. 2386-2391 (1988). 6 pages.

Jaakko M. T. Huikari, Eugene A. Avrutin, Boris S. Ryvkin, Jan J. Nissinen, Juha Tapio Kostamovaara, IEEE Journal of Selected Topics in Quantum Electronics, vol. 21, pp. 1501206 (2015). 6 pages.

* cited by examiner

A

B

To second light-receiving unit

To second light-receiving unit

To second light-receiving unit

A

B

A

B

A

B

A

B

A

B

A

2900

B

2901

3000

A

B

A

B

A

B

A

B

Q-SWITCHED SEMICONDUCTOR LIGHT-EMITTING ELEMENT AND DISTANCE MEASURING DEVICE

TECHNICAL FIELD

The present disclosure relates to a Q-switched semiconductor light-emitting element and a distance measuring device.

BACKGROUND ART

A ToF (Time of Flight) lidar (light detection and ranging) that applies a laser to an object to measure the distance to the object on the basis of the time it takes for scattered light from the object to reach a measuring device is used for various purposes such as terrain measurement, structure management, obstacle measurement in automatic driving, gesture input, and defect inspection in production lines. Various reports have been made on the structure of the distance sensor in accordance with the application, and proposals have been made in consideration of a measurement range, distance accuracy, a repetition frequency, and a usage environment (particularly, whether or not it can be used outdoors) (see, for example, the following Patent Literatures 1 to 5 and Non-Patent Literatures 1 and 2).

CITATION LIST

Patent Literature

Patent Literature 1: Japanese Patent Application Laid-open No. 1989-262683
Patent Literature 2: Japanese Patent Application Laid-open No. 1993-090700
Patent Literature 3: Japanese Patent Application Laid-open No. 1998-229252
Patent Literature 4: Japanese Patent Application Laid-open No. 2005-039099
Patent Literature 5: Japanese Patent Application Laid-open No. 2008-258274

Non-Patent Literature

Non-Patent Literature 1: P. P. Vasil'ev, IEEE Journal of Quantum Electronics, Vol. 24, pp. 2386-2391 (1988).
Non-Patent Literature 2: Jaakko M. T. Huikari, Eugene A. Avrutin, Boris S. Ryvkin, Jan J. Nissinen, Juha Tapio Kostamovaara, IEEE Journal of Selected Topics in Quantum Electronics, Vol. 21, pp. 1501206 (2015)

DISCLOSURE OF INVENTION

Technical Problem

Such new distance measurement applications require miniaturization, low-power consumption, real-time detection, a distance range, and distance accuracy, but the technologies described in the above-mentioned literatures have room for further improvement. It is an object of the present disclosure to provide a Q-switched semiconductor light-emitting element and a light-receiving circuit made in view of such points.

Solution to Problem

The present disclosure is
a Q-switched semiconductor light-emitting element, including:
a comb electrode that has at least two or more gain regions and two or more absorption regions, the regions including an active layer and being continuous on a semiconductor substrate, separation regions being provided between the gain regions and the absorption regions, the longest region of the gain regions being located on a rear end surface side; and
an optical waveguide that staddles the gain regions, the absorption regions, and the separation regions.
Further, the present disclosure is
a distance measuring device, including:
an optical part that
has an optically-polished non-coated plane disposed on an object that is transparent to a wavelength of a light source,
has a structure in which light enters the plane from inside the object at an angle larger than a Brewster's angle with P polarization, refracted measurement light is applied to an object to be measured outside a casing, and detection light that is part of light scattered from the object to be measured is reflected on the plane in an orientation opposite to an optical path of the measurement light and enters a light-receiving element, and
includes, vertically above reflected light of the light that has entered the plane from inside the object at an angle larger than the Brewster's angle with P polarization, no portion that introduces the light into the object.
Further, the present disclosure is
a distance measuring device, including:
a light-receiving circuit in which one end of a primary-side coil of a balun transformer is connected to a light-receiving element and the other end is connected to a replica of the light-receiving element.
Further, the present disclosure is
a distance measuring device, including:
a light-receiving circuit in which both ends of a primary-side coil of a balun transformer are connected to a light-receiving element and a replica of the light-receiving element, the light-receiving element and the replica are connected to a bias T, one end of the bias T is connected to a modulator circuit, and an application voltage to the light-receiving element and the replica is modulated by the modulator circuit.

MODE(S) FOR CARRYING OUT THE INVENTION

Figure 1:
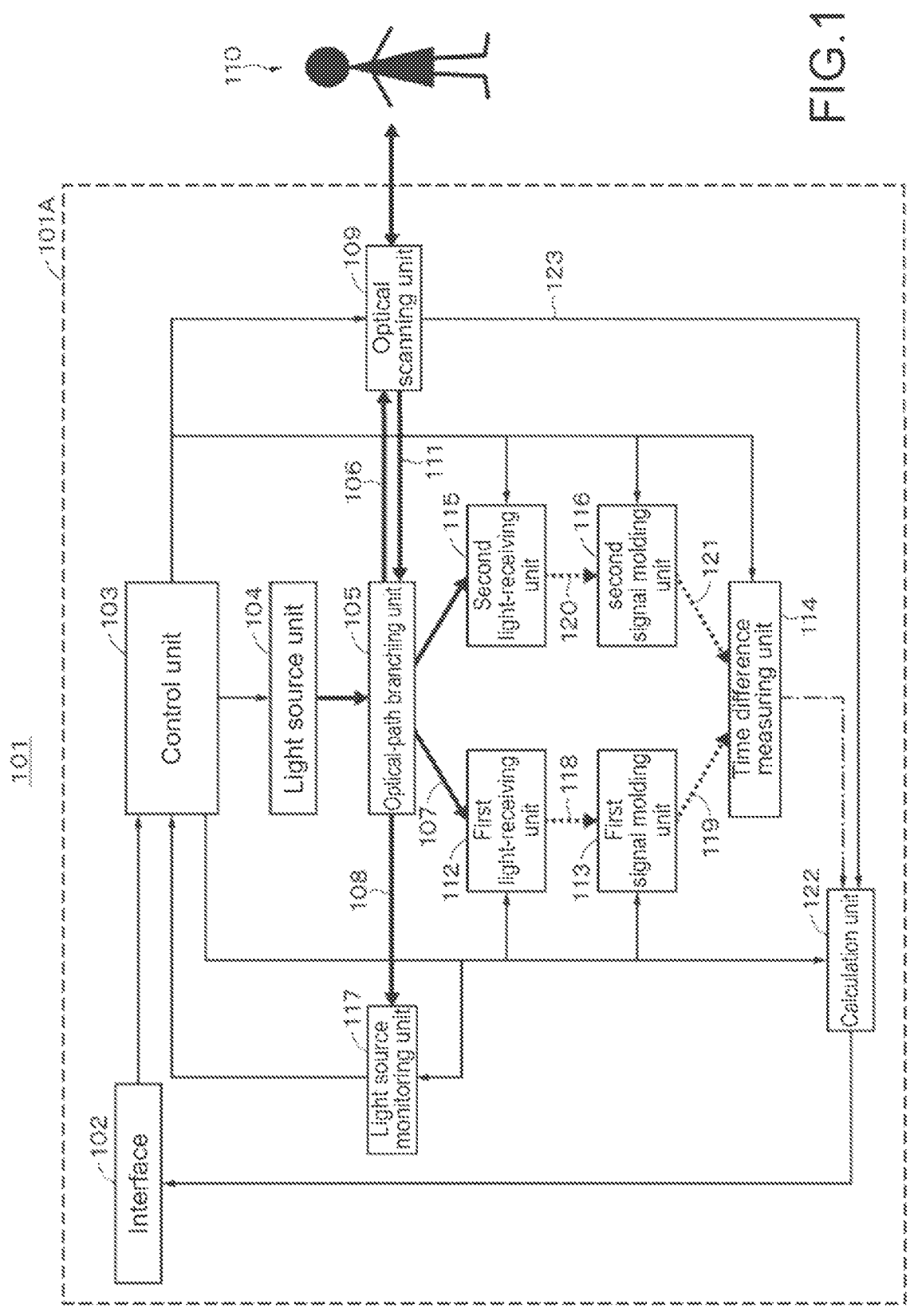
FIG. 1 is a diagram showing a configuration example of a distance sensor system according to an embodiment.

Hereinafter, an embodiment and the like of the present disclosure will be described with reference to the drawings. Note that the description will be made in the following order.

Technology Relating to Present Disclosure

Embodiment

Modified Example

Application Example

The embodiment and the like described below are favorable specific examples of the present disclosure, and content of the present disclosure is not limited to the embodiment and the like.

Technology Relating to Present Disclosure

First, in order to facilitate the understanding of the present disclosure, the technology relating to the present disclosure will be described.

The ToF method is classified into two types, and includes an i-ToF (indirect-ToF) method that uses an intensity-modulated light source to measure the distance on the basis of phase information of scattered light and a d-ToF (direct-ToF) method that uses a pulse light source to directly measure the distance on the basis of the light-receiving time. The d-ToF method is classified into three types of an LM (Linear-mode), a GM (Geiger-mode), and an SP (Single-photon). In the LM, a PD (Photodiode) or an APD (Avalanche photo-diode) is used as a light-receiving element, and the number of received photons is proportional to the output signal intensity. While the multiplication factor is 1 in the PD, a multiplication factor of approximately 100 is achieved in the APD.

In the LM, rise detection of a pulse output signal is performed with a threshold value higher than an optical noise level of sunlight or the like and electrical noise of the system, and time measurement using TDC (Time to Digital Converter) is performed. Since it is a light source with a large pulse energy, the power consumption is large and the application thereof is limited. Since the distance measurement can be performed with a single shot and simple calculation, the latency is low and real-time detection can be performed.

The GM is a method of calculating the light-receiving time using a histogram obtained from photon counting. As a light-receiving element, an SPAD (Single Photon Avalanche Diode) or the like capable of performing single photon detection is used. In the CDTCSPC (Coincidence Detection of Time Correlated Single Photon Counting) method, an array element including at least two SPADs is used to measure the light-receiving time by counting TDC prepared for each SPAD. By setting true only when only the output signals of the two or more SPADs have been obtained within the set time gate, it is possible to exclude the case where dark count has occurred or the influence of optical noise of sunlight or the like. In either method, in order to calculate an expected value of the light-receiving time from a histogram of the light-receiving time obtained from a plurality of shots, a dozen to dozens of shots are performed for each frame. It is known that in the SPAD, Time-walk occurs when a plurality of photons is incident. Since the number of these photons follows the Poisson distribution, it is extremely difficult to obtain information of the number of incident photons. Therefore, the distance accuracy in the GM is limited by Time-walk and is limited to approximately centimeters. Since the GM requires a plurality of shots and histogram processing for each frame, the latency is high.

The SP is a method of acquiring the light-receiving time with a single shot by rise detection of the signal based on single photon detection. As a light-receiving element, a SiPM (Silicon Photomultiplier), an MCP (Multi-channel Photomultiplier), a PMT (Photomultiplier), or the like is used. In any element, a multiplication factor of 105 to 106 is obtained, single photon detection and multiphoton detection can be performed, and the number of received photons is proportional to the output signal intensity. Due to recent improvement in the performance of SiPM, SiPM is often used in, particularly, a small system. The SiPM includes hundreds to thousands of cells, each of the cells includes an SPAD, and a quenching resistance is built in each SPAD. The output of each cell is a parallel circuit connected on the anode side and the cathode side. Since the number of cells is large, even in the case where a plurality of photons has entered the SiPM, the probability that a plurality of photons enters one cell is low and therefore, Time-walk caused by the avalanche breakdown can be ignored. In the ideal SP, while distance measurement is possible with a single photon, the averaging effect for the jitter of a light source, the jitter of a light-receiving element, and the jitter of TDC, which are the main factors of the standard deviation of the measurement distance, cannot be achieved at the time of single photon measurement. As compared with the LM, the pulse energy of the light source necessary for the SP is substantially proportional to the multiplication factor of the light-receiving element, and therefore, it is possible to significantly reduce the power consumption of the light source. Further, when compared with the GM, it is approximately an order of magnitude lower because it is proportional to the number of shots. Since the SP is capable of performing distance measurement with a single shot and simple calculation, the latency is low and real-time detection is possible. However, it is difficult to reduce noise than the signal level of a single photon, and several photons are often targeted in the actual SP. In either case, a light source, a light-receiving element, and TDC with a low jitter are necessary to take advantage of the characteristics of the SP, and they have been used only for the limited purpose such as terrain measuring instrument mounted on an artificial satellite so far.

The jitter of the light source is caused by the pulse width of pulsed light and the jitter of the drive circuit. In the case of performing accurate distance measurement, by generating an electrical signal from pulsed light without transmitting an electrical signal from a control unit to the start signal input to TDC, it is possible to remove the influence of the jitter caused by the drive circuit of the light source. The pulse width of the pulsed light is desired to be 100 picoseconds or less, and the pulse width of several picoseconds to several tens of picoseconds significantly improves the distance accuracy. The pulse energy is desired to be several hundred picojoules to several nanojoules. A semiconductor laser having an absorption region provided in a resonator of a semiconductor laser has been developed (see, for example, Patent Literatures 1 to 5). In a Q-switched semiconductor laser that has been developed for optical communication, a maximum pulse energy of approximately ten and several picojoules is generated with a pulse width of several picoseconds to ten and several picoseconds (see, for example, Non-Patent Literature 1). They oscillate in the lateral basic mode because they are coupled to optical fibers. The electrode is divided into two or three and part thereof is used as an absorption region, thereby causing the Q-switch operation. Further, a Q-switched semiconductor laser that has a wide stripe width and oscillates in a lateral multimode has been reported for lidar (see, for example, Non-Patent Literature 2). As a method of increasing the pulse energy, a method of weakening the light confinement in the semiconductor laminating direction in the propagation mode to suppress the carrier saturation due to ASE (Amplification of spontaneous emission) has been used. With such a structure, since the light confinement coefficient in the semiconductor lamination surface direction is small, oscillation is performed in a lateral multimode, and the beam quality is reduced, and therefore, it cannot be used for the SP.

In the SiPM used as a light-receiving element, the electric crosstalk and optical crosstalk are reduced by a guide ring and a trench structure. The quenching resistance of several tens of kiloohms provided in each cell is capable of converging the avalanche breakdown, but the recharge time becomes long due to the CR time constant of the SiPM. Since the charges generated by the avalanche amplification are output via the quenching resistance and the parasitic capacitance, the pulse received by the SiPM has a steep rise property. In the case where the quenching resistance and the parasitic capacitance are connected to the same electrode, the SiPM is connected to a transimpedance amplifier or an operational amplifier with a read resistance via a capacitor cut filter. Further, in the case where the quenching resistance and the parasitic capacitance are connected to different electrodes, the output of the latter is connected to a transimpedance amplifier or an operational amplifier with a read resistance. As a result, the tail of the output waveform caused by the CR time constant of the SiPM is removed and the measurement rate can be increased. In the case of using the SiPM for the SP, it is important to reduce the jitter. The jitter in a read path is dominated by the decrease in S/N due to mixing of common mode noise into the signal line and S/N of the first-stage amplifier. In particular, in a small SP, it is difficult to remove noise generated from a pulse light source drive circuit, a DCDC converter, or the like, and the common mode noise increases. Since the above-mentioned connection between the SiPM and the amplifier is a single-ended input, a phase difference occurs between the common mode noise mixed into the signal line and the common mode noise of the amplifier via the ground. For this reason, the high-frequency component of the common mode noise cannot be removed. In the case of using the SP at a short distance, it is necessary to prevent false detection due to stray light. In the SiPM, electrons or holes trapped in semiconductor defects are released during the process of avalanche amplification, and after-pulses that cause avalanche amplification again are randomly generated. After-pulses are generated also during the measurement period, and thus cannot be separated from the signal in the subsequent stage.

A coaxial optical system is often used in the SP. In a large SP, the measurement light emitted from a light source and the detection light scattered from an object are branched in the radial direction using a perforated mirror or the like. Meanwhile, in a small SP, a perforated mirror or the like cannot be used, and a polarizing beam splitter including a dielectric multilayer film is used. However, the scattering coefficient of the beam splitter is as high as $10^{-4}$, which causes a large amount of stray light.

Incidentally, with the spread of AI (Artificial Intelligence) and 5G (Generation), there is a demand for an interaction technology that captures the dynamic activity of people in real time. For example, slight movement of people from a distance that does not obstruct the flow of people can be captured by a natural UI (User Interface), the position can be accurately captured and used for coating and technical judgment even if it is violent movement in a UI in sports, the position and vibration of internal organs or the like can be accurately captured in a medical endoscope, and slight movement of people from a position that does not obstruct the flow of people can be captured and used as data for security and smart cities in ambient intelligence. In such applications, distance measurement from a short distance of ten and several centimeters to a medium distance of several ten meters is necessary, and high FOV (Field of View), low latency, and external-light resistance are required. These properties can be used also for real-time distance measurement at a crowded intersection and narrow roads in residential areas and downtown areas in automatic driving of an automobile, collision prevention of a drone, three-dimensional measurement of a structure using a drone, and the like.

As mentioned above, a Q-switched semiconductor laser capable of generating short pulsed light has had a problem that the pulse energy cannot be increased because carrier saturation occurs due to ASE. As a countermeasure, when the light confinement in the semiconductor laminating direction in the propagation mode is weakened, also the light confinement in the horizontal direction is weakened, and therefore, a problem that the beam quality is reduced has newly occurred. In the Q-switch operation, a passive method using the saturable absorption property of a semiconductor and an active method modulating the absorption rate of an absorption region have been reported. The active method is capable of increasing the pulse energy, but has a problem that it is difficult to synchronize the electrical modulation, the circuit is complicated, the jitter increases, and the noise increases. In the SP, it is required to improve the problems of the pulse width, the pulse energy, the beam quality, the jitter, the noise, and the like at the same time. The signal forming unit of the existing SiPM has a problem that the common mode noise is mixed, and S/N is reduced in the SP, which makes it difficult to perform single photon detection. In particular, in a small SP, there is a demand for a signal molding unit that suppresses the generation of noise, in which the common mode noise is less likely to be mixed. In the SP of a coaxial optical system, there has been a problem that stray light scattered by a polarizing beam splitter enters the SiPM and generates noise. There is a demand for a signal molding unit that suppresses generation of such stray light noise and is not easily affected by stray light noise.

In such an application of new distance measurement, miniaturization, low power consumption, real-time detection, a distance range, and distance accuracy are required. Although the SP is suitable for these requirements in principle, improvement in the light source, the light-receiving element, and the optical part is necessary as described above.

The present disclosure made in view of such a point will be described below in detail.

One Embodiment

Configuration Example of Distance Sensor System

FIG. 1 is a diagram showing a configuration example of a distance sensor system (distance sensor system 101)

according to this embodiment. The solid arrows in FIG. 1 indicate control signals, the thick arrows indicate optical paths, the dotted arrows indicate signal lines, and the alternate long and short dashed arrow indicates a data line. The distance sensor system 101 includes a distance measuring device 101A and a to-be-measured object 110. The distance measuring device 101A includes an interface 102, a control unit 103, a light source unit 104, an optical-path branching 105, an optical scanning unit 109, a first light-receiving unit 112, a first signal molding unit 113, a time difference measuring unit 114, a second light-receiving unit 115, a second signal molding unit 116, a light source monitoring unit 117, and a calculation unit 122.

The interface 102 is an interface for exchanging data and commands between the distance measuring device 101A and an external device. The control unit 103 integrally controls the entire distance measuring device 101A. The control unit 103 controls the operation of the respective units of the distance measuring device 101A.

The control unit 103 that has received a control parameter from the outside via the interface 102 transmits a control signal to a plurality of devices and circuits described below. As will be described below, the light source unit 104 includes a Q-switched semiconductor light-emitting element and a drive circuit, and emits pulsed light having a pulse width of sub-nanoseconds, desirably, 20 picoseconds or less, the pulse energy of several hundred picojoules to several nanojoules, and high beam quality.

In the optical-path branching 105, the light from the light source unit 104 is branched via a beam splitter or the like into measurement light 106 to be applied to the to-be-measured object 110, reference light 107 for obtaining a start signal of time measurement, and control light 108 for controlling the light source. As will be described below, the beam splitter is desired to have low scattering and less stray light. The measurement light 106 is transmitted to the optical scanning unit 109 and sequentially applied to the range of the designed FOV (Field of View). The measurement light 106 applied to the to-be-measured object 110 such as a person is scattered. Part of the scattered light passes through the optical scanning unit 109 to be detection light 111. The detection light 111 returns to the optical-path branching 105 coaxially with and in the direction opposite to the measurement light 106.

The reference light 107 is transmitted to the first light-receiving unit 112 and converted into a reference electrical signal 118 by a light-receiving element such as a PD, an APD, and a SiPM. The reference electrical signal 118 is transmitted to the time difference measuring unit 114 Via the first signal molding unit 113. Part of the detection light 111 is transmitted to the second light-receiving unit 115 via the optical-path branching 105 and converted into a detection electrical signal 120 by a light-receiving element such as a SiPM. The detection electrical signal 120 is transmitted to the time difference measuring unit 114 via the second signal molding unit 116. As will be described below, the second signal molding unit 116 amplifies, with high S/N and low jitter, the very weak detection electrical signal 120 by single photon detection.

The first signal molding unit 113 amplifies the reference electrical signal 118 that is an analog waveform output from a light-receiving element, and generates a reference square wave 119 on the basis of a detection threshold value arbitrarily set. The second signal molding unit 116 amplifies the detection electrical signal 120 that is an analog waveform output from a light-receiving element, and generates a detection square wave 121 on the basis of a detection threshold value arbitrarily set. The control light 108 is transmitted to the light source monitoring unit 117, the pulse energy and the pulse width are measured, and information is returned to the control unit 103. The number of square waves to be transmitted to the time difference measuring unit 114 may be one or two or more, and the square waves may be different square waves obtained with two or more detection threshold values. The time difference measuring unit 114 measures the relative time of the input square wave by TDC. This may be the time difference between the reference square wave 119 and the detection square wave 121 or the time difference between a clock and a reference square wave prepared separately and a clock and a detection square wave. They differ depending on the type of TDC. For TDC, a counter method alone, a method of calculating the average value by performing measurement a plurality of times by a counter method and an inverter ring-delay line, a method combining a counter method and a highly-accurate measurement method having picosecond resolution such as Vernier buffering and pulse shrink buffering, or the like is used. Further, the time difference measuring unit 114 may have functions of measuring the rise time of the detection electrical signal 120 output from the second light-receiving unit 115, measuring the peak value, and measuring the pulse integrated value. These can be measured by TDC or ADC (Analog to Digital Converter).

The time difference measured by the time difference measuring unit 114 is transmitted to the calculation unit 122. The calculation unit 122 adjusts the offset, corrects the Time-walk error using the rise of the detection electrical signal 120, the peak value, the pulse integrated value, and the like, and corrects the temperature. Then, the calculation unit 122 performs vector calculation using scanning timing information 123 transmitted from the optical scanning unit 109. Note that distance data and scanning angle data may be output from the interface 102 without performing vector calculation. Further, appropriate processing such as noise reduction, the averaging with adjacent points, and interpolation may be performed on these pieces of data, and an advanced algorithm such as recognition processing may be performed.

As mentioned above, in the ideal SP, while distance measurement is possible with a single photon, the averaging effect for the jitter of a light source, the jitter of a light-receiving element, and the jitter of TDC, which are the main factors of the standard deviation of the measurement distance, cannot be achieved at the time of single photon measurement. Further, at the time of multiphoton detection by several photons to several ten photons, although a slight averaging effect according to the number of photons can be achieved for the jitter of a light source and the jitter of a light-receiving element, an averaging effect cannot be achieved for the jitter of TDC. Since the high-precision TDC occupies the area of several nanometer square to several ten nanometer square even if it has a fine structure by a CMOS (Complementary Metal Oxide Semiconductor) technology, it is difficult to achieve two-dimensional array, miniaturization, and an increase in density, but both miniaturization and an increase in density can be achieved in the case of a single unit or one-dimensional array. Therefore, by using the high-precision TDC, it is possible to reduce the jitter to several picoseconds. Meanwhile, there is a correlation between the jitter of a light source and the jitter of a light-receiving element, and development fully understanding the properties of both is desired. Therefore, the present disclosure will focus on these. A plurality of features of the present disclosure described below may be combined and used, and some or each of them may be used alone to be effective.

The SP type distance sensor system 101 is an example, and the coaxial optical system may be a two-axis optical system, for example. In the two-axis optical system, since the probability that the scattered light generated from a light branching unit of reference light and measurement light turns into stray light is reduced, a simpler beam splitter can be used. However, the present disclosure can be applied because the content required for a light source and a light-receiving element is common.

(Light Source Unit)

Subsequently, the characteristic configuration of the present disclosure will be descried. First, the light source unit 104 will be described in detail. The SP is different from the GM in that it is based on single photon detection with a single shot. Since the GM generates a histogram by photon counting to obtain the expected value of the arrival time of the reflected light of an object, multi-shots are required. Therefore, since the jitter caused by the pulse width of applied pulsed light is averaged by the number of multi-shots, pulsed light having a pulse width of several nanoseconds is often used. Also in the case of the SP, multi-level measurement is possible in the case where a plurality of photons has arrived at the same time, and the jitter caused by the pulse width of pulsed light is averaged by the number of photons even with a single shot. Meanwhile, in the case where the measurement threshold value is set to a lo value such as the number of photons of 1, i.e., it is used in an environment where external optical noise is low, measurement can be performed with a single photon. Therefore, the reduction of jitter by averaging as mentioned above cannot be performed, and the jitter caused by the pulse width significantly affects the distance accuracy. The pulse width is sub-nanoseconds, and may be favorably 20 picoseconds or less. For example, in the case where the pulse width is 20 picoseconds, the jitter caused by a light source is 20 picoseconds when the number of detected photons is 1 and 6.6 picoseconds when the number of photons is 9, which are 3 mm and 1 mm when converted into the standard deviation of distance accuracy. The larger the number of photons, the higher the distance accuracy, so that the larger the pulse energy, the better.

In a small SP, since the size of a casing is assumed to be the palm size to the ultra-small size such that it can be built in, it is difficult to use a large solid-state laser or a fiber laser. In this regard, in this embodiment, a small Q-switched semiconductor light-emitting element that does not require optical external feedback is used. A semiconductor laser having an absorption region provided in a resonator of a semiconductor laser has been developed. In the Q-switched semiconductor laser that has been developed for optical communication, a pulse energy of approximately ten and several picojoules at most is generated with the pulse width from several picoseconds to ten and several picoseconds. They oscillate in the lateral basic mode because they are coupled to optical fibers. The electrode is divided into two or three and part thereof is used as an absorption region, thereby causing the Q-switch operation. Further, a Q-switched semiconductor laser that has a wide stripe width and oscillates in a lateral multimode has been proposed for lidar. As a method of increasing the pulse energy, a method of weakening the light confinement in the semiconductor laminating direction in the propagation mode to suppress the carrier saturation due to ASE (Amplification of spontaneous emission) has been used. With such a structure, since the light confinement coefficient in the semiconductor lamination surface direction is reduced and oscillation is performed in a lateral multimode, the beam quality is reduced.

In the Q-switch operation, a passive method using the saturable absorption property of a semiconductor and an active method modulating the absorption rate of an absorption region have been reported. The active method is capable of increasing the pulse energy, but has a problem that it is difficult to synchronize the electrical modulation, the circuit is complicated, and the jitter increases.

In this embodiment, a pulsed light-emitting element that has a structure for reducing the carrier saturation due to ASE, has a Q-switching function and beam quality, and is a small and stable circuit capable of self-generating a modulation pulse electrical signal while using an active method is used. Hereinafter, the configuration of the light source unit 104 and the circuit and the like of the light source unit 104 will be further described in detail.

"Comb Electrode Structure"

Figure 2:
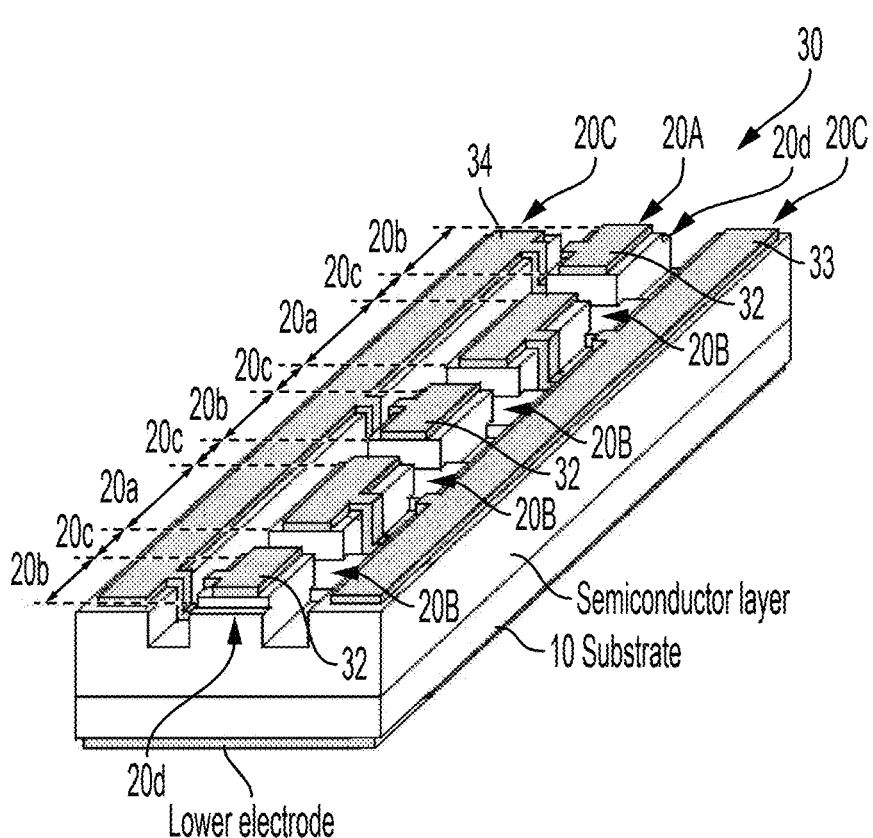
FIG. 2 is a diagram referred to when a light source unit according to the embodiment is described.
Figure 3:
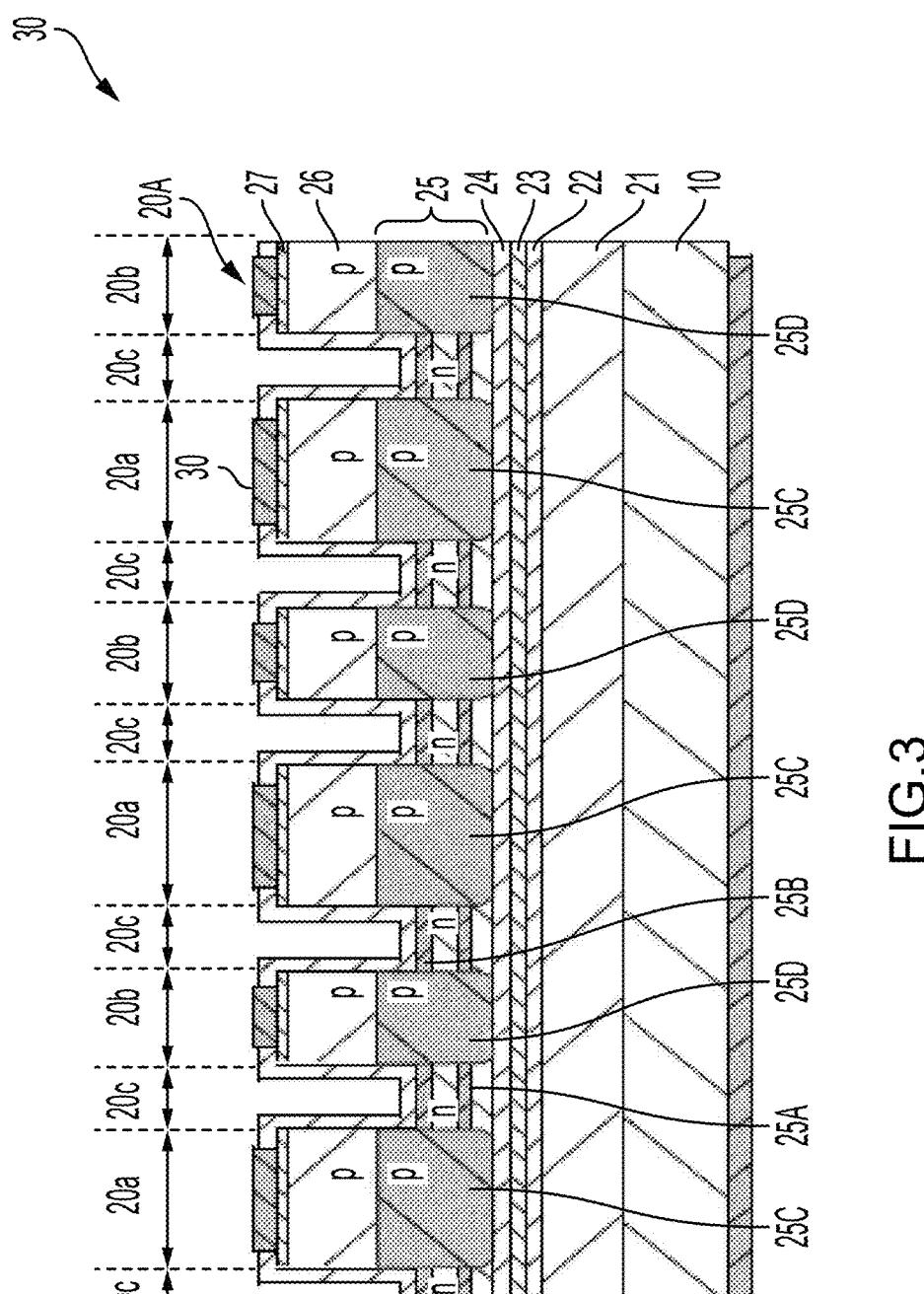
FIG. 3 is a diagram referred to when the light source unit according to the embodiment is described.

A comb electrode structure of the light source unit 104 will be described with reference to FIG. 2 and FIG. 3. As shown in FIG. 2 and FIG. 3, a semiconductor layer formed on a semiconductor substrate 10 by a semiconductor growth method such as MOCVD (Metal Organic Chemical Vapor Deposition) includes an n-type buffer layer, an n-type first cladding layer 21, an n-type first guide layer 22, and an active layer, and the upper part of the active layer has at least three types of regions. These include a gain region 20a, a Q-switch region 20b as an absorption region, and a separation region 20c. The gain region and the Q-switch region include a p-type or n-type second guide layer 23, p-type second cladding layers 25C, 25D, and 26, and a p-type contact layer 27, and the separation region includes an n-type second guide layer 24 and an n-type second cladding layer 25.

The active layer desirably has an SQW (Single Quantum Well) structure. This is because the linear slope gain is reduced, making it possible to suppress the reduction of injection carriers due to ASE, in the gain region as well as the photoexcited electron-hole pair can be easily separated and can be quickly moved to cathode and anode electrodes at the time of reverse bias and the overlap between the electron distribution and the hole distribution rapidly increases, making it easy to be absorbed and saturated at the time of the Q-switch operation in the Q-switch region.

Each of the cladding layers and the guide layers may be a single layer or a plurality of layers. Further, the cladding layer above the active layer may include, as an etching stop layer, a single layer 25A or a plurality of layers 25B. Further, the p-type occupied volumes of the guide layers of the gain region and the Q-switch region may be the same or different from each other. The respective layers of the three regions are continuous. Therefore, a region in which the p-type and the n-type are continuous in the plane is provided. Such a structure can be formed by impurity diffusion or the like. However, the present disclosure is not limited to the impurity diffusion method. For example, selective grows may be used. A separation region is provided between the gain region and the Q-switch region, and the gain region and the Q-switch region are electrically separated from each other by a PNP structure. Therefore, sufficient insulation is possible even if the separation width is very narrow, and it is possible to improve the optical propagation loss and the occupancy of the gain region and the Q-switch region. The gain region, the separation region, and the absorption region on the surface layer side (upper part) of the active layer on the semiconductor substrate 10 have a PNP structure.

As an example, in the case where the separation width is 4 micrometers, 33 pairs of the gain region and the Q-switch region are provided in the resonator length of 2 mm. The total separation width is 4×68=272 micrometers, which is approximately 13.6% of the resonator length. The 33 gain regions and the 34 Q-switch regions have a comb electrode structure respectively connected to a common gain electrode and a common Q-switch electrode. The length of one gain region in the resonator direction is only 20 micrometers to 30 micrometers. Since the spontaneously emitted light generated in the gain region is quickly absorbed in the Q-switch region, generation of ASE is significantly suppressed. As a result, since the stimulated emission of injection carriers due to ASE, which is a problem in the existing Q-switched semiconductor laser is reduced, the carrier saturation is suppressed and a high-carrier state can be achieved.

The peak position of the light propagation mode in the semiconductor laminating direction is in or near the active layer, and slightly protrudes to the substrate side. With such a configuration, the waveguide on the ridge side enables gentle light confinement in the semiconductor lamination surface direction. For example, light distribution of a single peak is obtained with a ridge width of 8 micrometers. It is favorable that the front end surface and the rear end surface are formed by a cleavage method or a dry etching method, AR (Anti-reflection) coating of reflectance of several % or less is performed on the front end surface, and HR (High-reflection) coating of 90% or more is performed on the rear end surface.

The operation principle of the Q-switched semiconductor light-emitting element in this embodiment will be described. When a pulse current is applied to the gain region while a reverse bias is applied to the Q-switch region, the carrier density of the active layer gradually increases. The photoexcited electron-hole pair of the active layer is mitigated by spontaneous emission, non-radiative recombination, and ASE. As mentioned above, since ASE is suppressed by the comb electrode structure, carrier saturation occurs at approximately the time constant of spontaneous emission. In the active layer of the Q-switch region, a depletion layer is formed in the active layer by the reverse bias and the photoexcited electron-hole pair generated by photoexcitation is rapidly separated and moves to the cathode side and the anode side. Therefore, the absorption coefficient is very large. When the reverse bias of the Q-switch region is set to a voltage similar to or slightly higher than that of the cathode, the depletion layer shrinks or disappears, the photoexcited electron-hole pair caused by photoexcitation rapidly increases, and the absorption coefficient is rapidly reduced. The light generated in each gain region is not absorbed in the Q-switch region, and significant SL (Super Luminescent) and laser oscillation are caused depending on the state of the carrier density of the gain region, which greatly exceeds the carrier density of the laser oscillation threshold value of a general semiconductor laser. The SL and the laser are in the mixed state, and the longer the resonator length, the higher the SL ratio. However, the ratio does not matter because the time distribution of pulsed light is important in the incoherent d-TOF such as the SP.

[Drive Circuit]

Subsequently, a drive circuit that drives the Q-switched semiconductor light-emitting element having the above-mentioned configuration (hereinafter, abbreviated as the semiconductor element 30 as appropriate) and a driving method by the drive circuit will be described with reference to FIG. 4A and FIG. 4B. FIG. 4A shows an example of a circuit (pulse self-generation circuit) that drives the semiconductor element 30, and FIG. 4B shows another example of the circuit (pulse self-generation circuit) that drives the semiconductor element 30.

Figure 4:
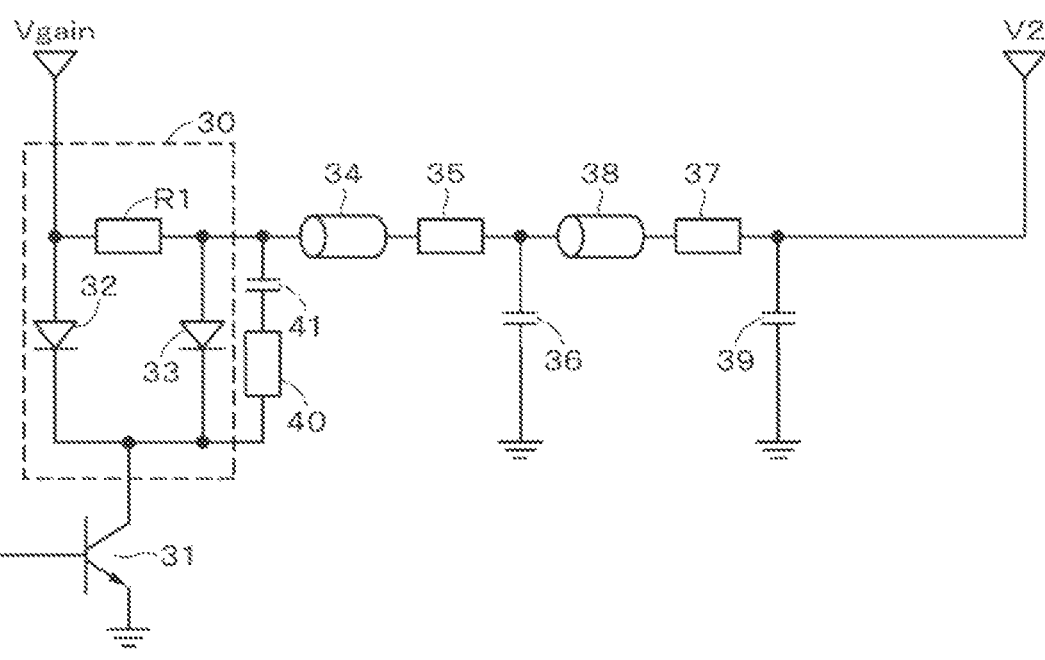
FIGS. 4A and 4B are each a diagram referred to when the light source unit according to the embodiment is described.
Figure 4:
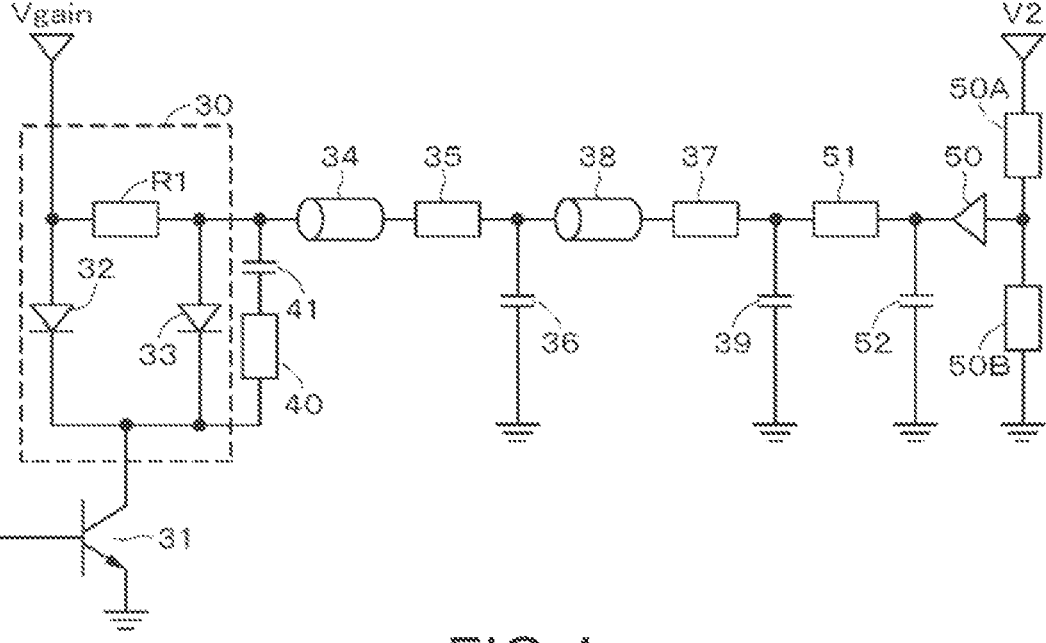

As shown in Part A of FIG. 4, in the semiconductor element 30 having a comb electrode structure is a low-side drive in which an NMOS (Negative-Channel Metal Oxide Semiconductor) 31 is disposed on the cathode side. A gain region 32 is connected to a constant-voltage source Vgain and the resistance between the drain and the source increases when the gate voltage of the NMOS is lower than the threshold value level, so that the drain voltage drops from Vgain by a pn-junction voltage difference Vpn. The anode electrode of a Q-switch region 33 is a constant-voltage source V2 lower than Vgain-Vpn or grounded, a reverse bias is applied to the Q-switch region 33. When the gate voltage is equal to or higher than the threshold value level, the resistance between the drain and the source rapidly reaches several mΩ to several ten mΩ and the drain voltage drops to the ground level. The cathode of the Q-switch region 33 is common to the cathode of the gain region and is affected by the modulation of the drain voltage. In the case where the impedance of the Q-switch region 33 on the anode side is sufficiently larger as compared with the resistance between the drain and the source (several mΩ to several ten mΩ), the voltage between the anode and the cathode of the Q-switch region 33 cannot follow the change in the drain voltage and the anode voltage is modulated following the drain voltage.

The pulse voltage generated in the anode electrode of the Q-switch region 33 due to this change in the drain voltage is, for example, 50Ω and passes through a delay line 34 whose impedance is controlled. Such a delay line 34 includes an inductor and a capacitor. The delay line 34 causes a delay of approximately sub-nanoseconds to 2 nanoseconds. A damping resistance 35 is connected to the output side of the delay line 34 and the output side of the damping resistance 35 is branched into two. One of them is connected to the ground via a capacitor 36 of several picofarads to several ten picofarads and the other is connected to the constant-voltage source or the ground via a matching resistance 37. There may be a transmission line whose impedance is controlled in front of (on the input side) of the matching resistance 37. Further, the constant-voltage source V2 may be one to which a decoupling capacitor 39 is connected. Note that as a power source, a positive power source or a negative power source is used.

With such a configuration, only the high-frequency band of the pulse voltage generated in the anode electrode of the Q-switch region 33 is reflected by the impedance mismatching via a capacitor. The reflected wave returns to the delay line 34 and reaches the anode electrode of the Q-switch region 33. Therefore, since the high-frequency component reciprocates on the delay line 34, the voltage of the anode electrode of the Q-switch region 33 is sharply increased with a delay of approximately sub-nanoseconds to 4 nanoseconds. As a result, the reverse bias that has been applied to the pn junction of the Q-switch region 33 is eliminated, and spontaneously emitted light generated from the gain region 32 propagates through an optical waveguide and the Super luminescent state or laser oscillation is instantly started.

The timing of Q-switching is synchronized with the operation of the NMOS by the fixed pulse self-generation circuit as mentioned above, and stable Q-switching can be performed by only one NMOS 31. The Q-switching signal is mixed into also the ground of the drive circuit, which causes a noise factor of the system forming a lidar. As a method of reducing the switching noise of the NMOS 31, connecting a snubber between the drain and the source of the NMOS 31 in parallel has been known. However, it is not desirable because the operation speed of the NMOS 31 becomes slow. In this regard, in this embodiment, the common mode noise is reduced by providing a damping resistance 40 and a capacitor 41 in series between the anode and the cathode of the Q-switch region 33 in parallel. With such a configuration, the long-period vibration noise of the ground or each constant-voltage source is attenuated, and a Q-switching operation can be achieved with high repetition.

When the Q-switch region 33 generates a photovoltaic current when entering the Super luminescent state or starting laser oscillation. A general positive constant-voltage source cannot draw a current, and the voltage rises by the photovoltaic current in some cases. In consideration of such a point, it is possible to compensate the photovoltaic current connecting a buffer 50 to the output of the constant-voltage source V2 (connection midpoint of voltage driving resistances 50A and 50B connected to the constant-voltage source V2) as shown in FIG. 4B. It is favorable that the buffer 50 is drive by ±power sources and the band is sufficiently lower than that used for Q-switching. When the band of the buffer 50 is high, the Q-switch operation is compensated and it enters the Super luminescent or the laser oscillation cannot be started in some cases. Alternately, it becomes an oscillation factor of a buffer circuit. In order to suppress these effects, as shown in FIG. 4B, a resistance 51 may be connected to the outlet of the buffer 50 and a decoupling capacitor 52 may be connected between connection midpoint between the buffer 50 and the resistance 51 and the ground.

The Q-switch region 33 generates a photovoltaic current when entering the Super luminescent state or starting laser oscillation. A general positive constant-voltage source cannot draw a current, and the voltage rises by the photovoltaic current in some cases. In order to eliminate the photovoltaic current with a simple configuration, a diode (not shown) may be connected to the damping resistance 40 and the capacitor 41 in parallel. The anode side of the diode is connected to the anode electrode of the Q-switch region 33, and the cathode side of the diode is connected to the cathode side of the Q-switch region 33.

The drive circuit of the semiconductor element 30 is favorably housed in a conductive package. The ground of the casing and the drive circuit has a floating structure electrically separated. As a result, generation of unnecessary radiation can be suppressed. In order to prevent common mode noise from mixing into the system forming a Lidar, it is favorable to cause a thin coaxial cable, an FPC, a power cable, or the like that connects the drive circuit and the system to each other to pass through the ferrite core.

"Light Pool Unit Comb Electrode Structure"

Figure 5:
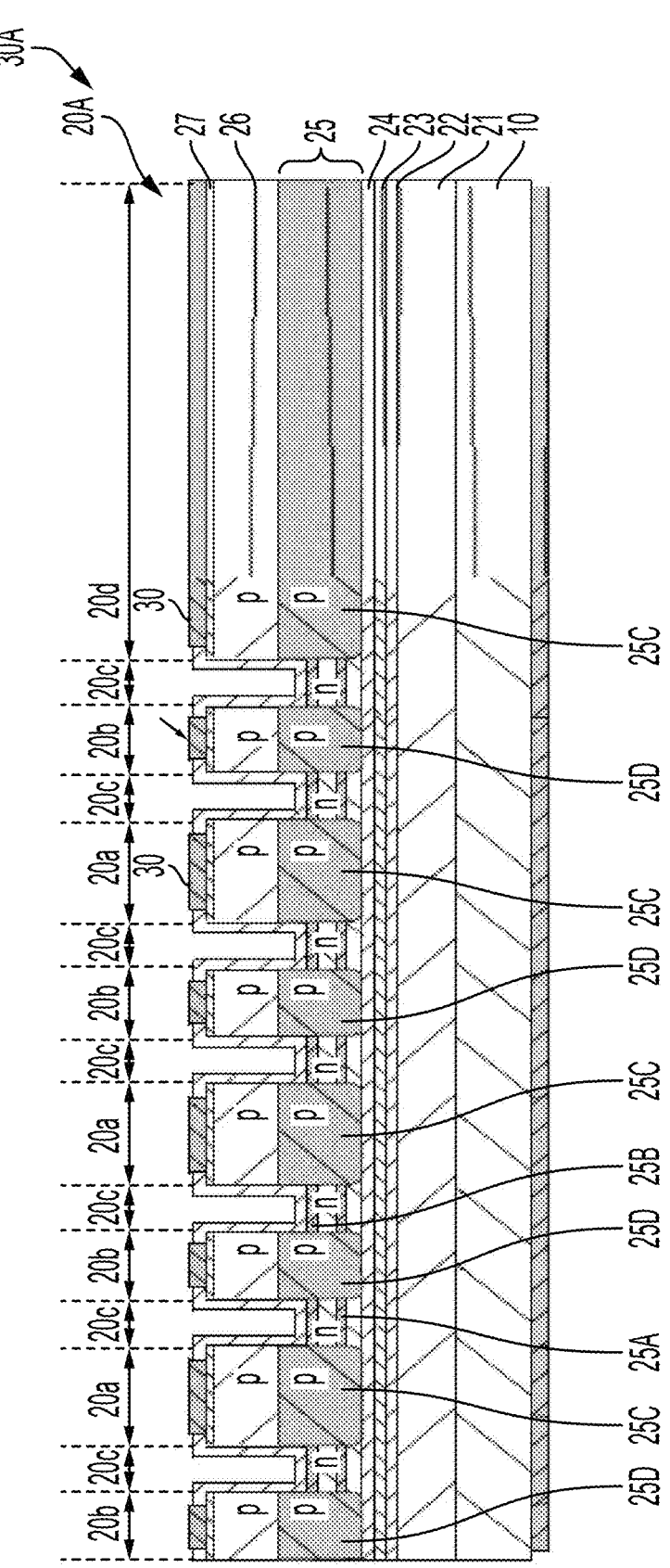
FIG. 5 is a diagram referred to when the light source unit according to the embodiment is described.

FIG. 5 shows another form of the Q-switched semiconductor light-emitting element. A Q-switched semiconductor light-emitting element 30A shown in FIG. 5 has no comb electrode structure in the vicinity of the rear end surface and includes a light pool unit 20d having a gain region, as compared with the structure shown in FIG. 3. As mentioned above, the Q-switched semiconductor light-emitting element according to this embodiment includes: a comb electrode that has at least two or more gain regions and two or more absorption regions, the regions including an active layer and being continuous on a semiconductor substrate, separation regions being provided between these regions, the longest region of the gain regions being located on a rear end surface side; and an optical waveguide that staddles these regions (gain regions, the absorption regions, and the separation regions). The optical waveguide has a two-dimensional light confinement structure formed by the difference between refractive index distribution in the vertical direction by a layered structure, refractive index distribution in the vertical direction under the ridge across the respective regions, and refractive index distribution in the vertical direction beside the ridge, and is shown to function as a continuous optical waveguide because the difference in the light confinement structure is small between the respective regions.

Figure 6:
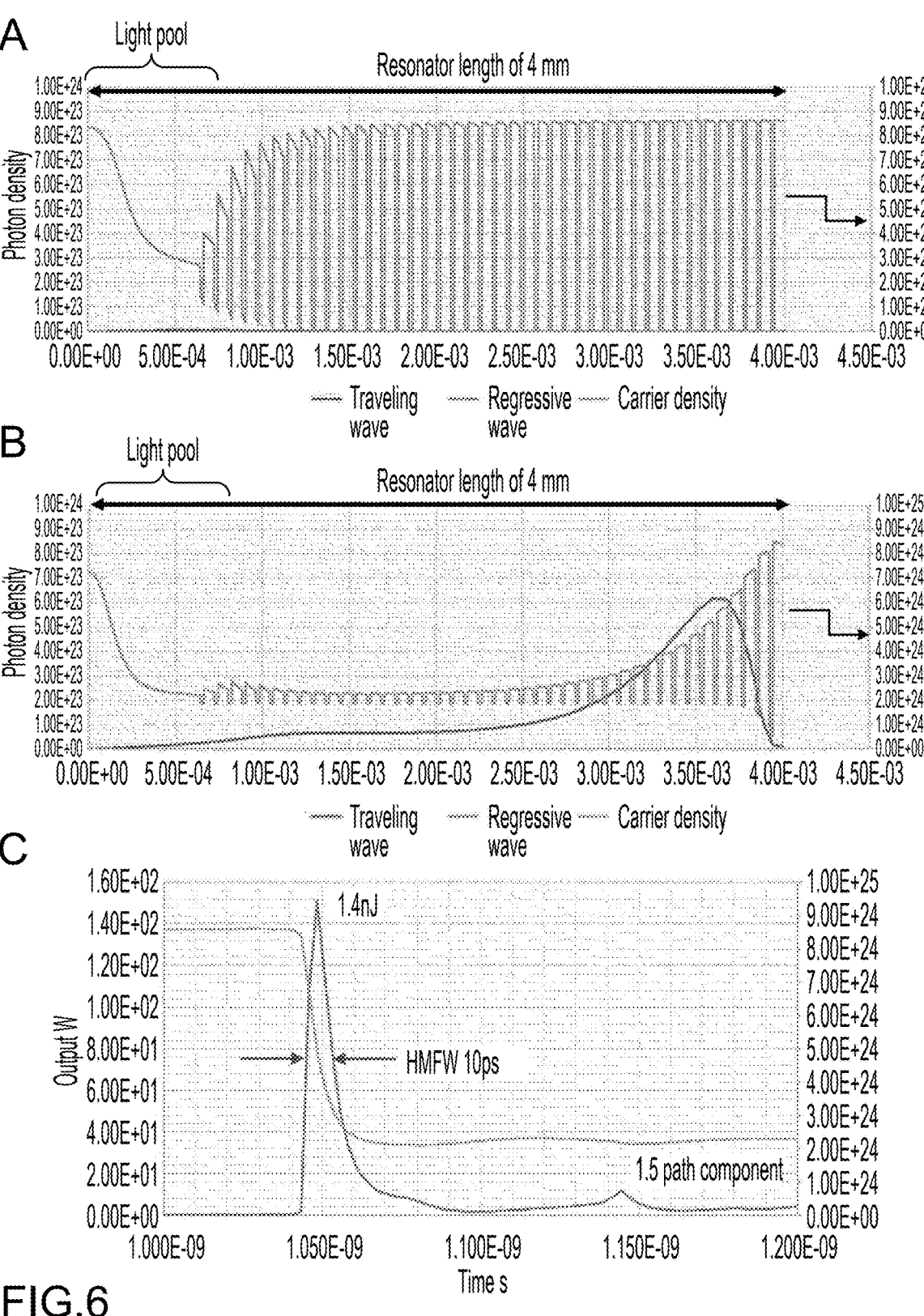
FIG. 6A to FIG. 6C are each a diagram showing simulation results, which is referred to when the light source unit according to the embodiment is described.

Part A of FIG. 6 to Part C of FIG. 6 each show the simulation result. In the Q-switched semiconductor light-emitting element 30A including the light pool unit 20d, the light distribution and the injection carrier distribution are biased due to ASE even before the Q-switch operation. As shown in Part A of FIG. 6, the light distribution is concentrated on the traveling wave (light propagating from the rear end surface in the front end surface direction) at the tip of the light pool unit 20d, and also the injection carrier density is reduced at the tip of the light pool unit 20d. This can be said to be a local Super luminescent state. The length of the light pool unit 20d is desirably several ten micrometers to several hundred micrometers. The bias of the light distribution is reduced at the several ten micrometers or less, and the Super luminescent state becomes stronger and the carrier density is reduced at the several hundred micrometers or more. As shown in Part B of FIG. 6, when the Q-switching operation occurs, the stimulated emission of the comb electrode structure region by seed light of the light pool unit 20d becomes dominant, and pulsed light of several picoseconds to several ten picoseconds is emitted from the front end surface. As in the simulation of Part A of FIG. 6 to Part C of FIG. 6, since the carriers that have been highly injected into the gain region of the comb electrode structure are substantially stimulated and emitted only once the seed light passes through, a very high pulse energy can be achieved even with a short pulse. As shown in Part C of FIG. 6, it can be seen that the pulse energy is concentrated in the period of approximately 10 picoseconds.

All the Q-switch regions 20b in the comb electrode structure other than the light pool unit 20d do not necessarily need to have the same length. In particular, by lengthening the Q-switch region 20b adjacent to or near the light pool unit 20d, it is possible to suppress the phenomenon that the carrier density is reduced due to the stimulated emission of the carriers in the gain region in the comb electrode structure by the light enhanced by the stimulated emission in the light pool unit 20d.

The resonator length of a general Q-switched semiconductor laser was approximately several hundred micrometers to one millimeter. This is because if the length is longer, the carrier saturation becomes dominant due to ASE and the pulse energy does not increase. Meanwhile, in the comb electrode structure including the light pool unit 20d, since the comb electrode region function as an amplification region, the resonator length of the Q-switched semiconductor laser may be several millimeters and the pulse energy increases as the resonator length increases. When the resonator length increases, waviness occurs during solder mounting, there is a concern that the properties deteriorate due to stress distribution or light scattering, and therefore, an appropriate resonator length is set in consideration of the mounting technology and yield.

[830 Nanometer Band]

In the near-infrared band, the light-receiving sensitivity of the SiPM is higher for shorter wavelengths, and the expansion of a distance range and improvement in the distance accuracy can be expected in the SP. The substrate is, for example, Si-doped n-type GaAs. The n-type buffer layer is Si-doped AlGaAs. The n-type first cladding layer is Si-doped AlGaAs. The n-type first guide layer is Si-doped AlGaAs. The SQW active layer is AlGaAs doped with a slight amount of Si. The second guide layer of the gain region and the Q-switch region is p-type dominant AlGaAs, which is doped with Zn and a small amount of slight Si. The second cladding layer is p-type AlGaAs doped with Zn and a slight amount of Si. The contact layer is GaAs doped with Zn. The second guide layer of the separation region is n-type AlGaAs doped with a slight amount of Si. The second cladding layer is n-type AlGaAs doped with a slight amount of Si. The second cladding layer of the separation region is thinner than those of the gain region and the Q-switch region. Further, the surface of the second cladding layer of the separation region is protected by an insulation film such as $SiO_2$. This is only an example, and the Q-switched semiconductor light-emitting element in the present disclosure may have another composition or may be formed of a semiconductor material.

[905 Nanometer and 940 Nanometer Band]

The 830 nanometer band has slight visibility and is of concern depending on the application of the SP. In such a case, the 905 nanometer band or 940 nanometer band, which has sensitivity to the SiPM, may be used.

(Optical-Path Branching Unit)

Subsequently, the optical-path branching 105 will be described. A beam splitter prism is typically used for the optical-path branching 105 in a coaxial optical system. In the case where scattering and absorption loss are not taken into consideration, the amount of measurement light is 50% of incident light at the maximum in the case of a half mirror, the efficiency of the detection light is also 50%, and therefore, the utilization efficiency of the accumulated light is 25%. In the case of a polarizing beam splitter, the amount of measurement light is approximately 95% of incident light at the maximum, the efficiency of the detection light is 45% including the efficiency of the $\lambda/4$ plate, and therefore, the efficiency of the accumulated light is approximately 43%. Since a dielectric multilayer film is used in these half mirror and polarizing beam splitter, there is scattering of approximately $10^{-4}$ to $10^{-3}$. There is a possibility that part of the scattered light turns into stray light and enters the SiPM to generate an erroneous signal. As described above, the existing beam splitter has had problems of low efficiency and occurrence of stray light. In this regard, in this embodiment, the optical-path branching 105 having high utilization efficiency of light is provided to expand the measurable distance range and improve the distance accuracy. Further, the optical-path branching 105 with less scattering to prevent false detection due to stray light.

"Obtuse Angle Incident Prism"

Figure 7:
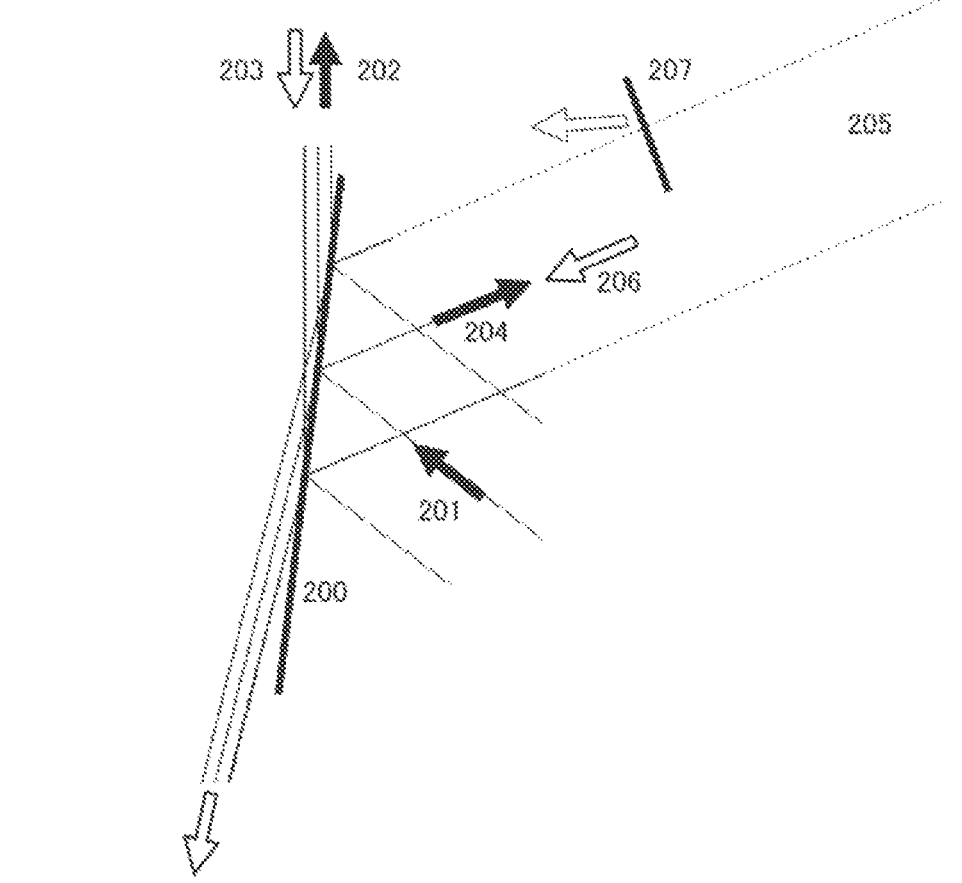
FIG. 7 is a diagram referred to when an optical-path branching unit according to the embodiment is described.

In most of the objects to be measured, when light is incident, the light slightly penetrates from the surface and is backscattered through multiple scattering within the object. This applies to many objects such as human skin, resins, paint surfaces, leaves, soil, paper, and cloth. In the process of multiple scattering, the polarization of the light source is eliminated and the backscattering is unpolarized. Meanwhile, the backscattering of metals, glass, and mirrors is kept polarized. In this embodiment, a beam splitter based on the reflection property of these objects is provided. FIG. 7 shows part of the beam splitter. There is a first glass surface 200 having an optically polished surface (optically-polished non-coated plane disposed on the surface of an object that is transparent to the wavelength of the light source) without a dielectric film or the like, and pulsed light 201 that has been emitted from the light source and collimated by the lens enters the first glass surface 200 with P polarization from the inside of the glass. The incident angle is larger than the Brewster's angle. Measurement light 202 that has been transmitted through the first glass surface 200 is refracted to have a desired beam width. Detection light 203 is coaxial with the measurement light 202 and enters the first glass surface 200 from the atmosphere side. Of the detection light 203, part of the P-polarized component and part of the S-polarized component are reflected by the first glass surface 200 to reach the second light-receiving unit 115. The first glass surface 200 has no scattering body such as a dielectric film and scattering is suppressed by optical polishing. Since the cause of slight scattering is pits formed on the glass surface during polishing, it is favorable to select a chemically stable glass material.

Light 204 reflected inside the first glass surface 200 needs to be absorbed as much as possible. Part 206 of the light scattered on an optical path 205 beyond that point returns to the optical path, overlaps with the optical path of the detection light 203 when being transmitted through the first glass surface 200, and reaches the second light-receiving unit 115. The pulsed light 201 needs to enter the glass from a second glass surface 207. For example, in the case where the second glass surface 207 spatially overlaps with the optical path 205, scattering by the pulsed light 201 on the second glass surface 207 turns into stray light. Further, the reflected light 204 is reflected in the glass on the second glass surface 207 and turns into stray light in some cases. In the case where the first glass surface 200 and the second glass surface 207 are parallel to each other, since pulsed light with a time delay is applied onto the same optical path as that of the measurement light 202, the distance accuracy of the SP deteriorates. Therefore, the second glass surface 207 is required to have no spatial overlap with the region corresponding to the optical path 205.

Figure 8:
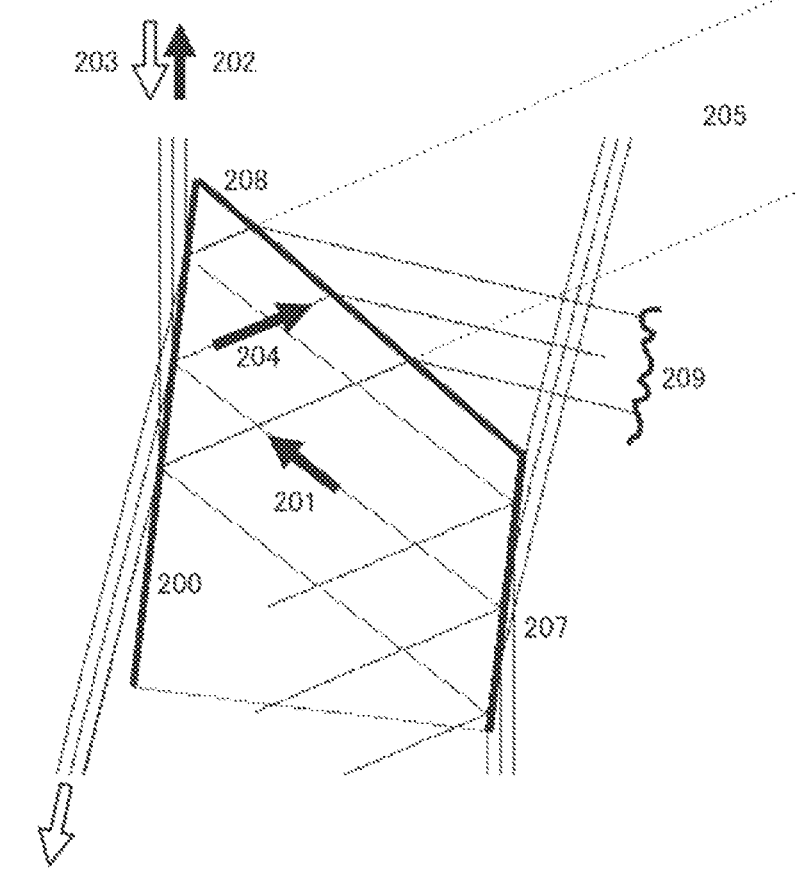
FIG. 8 is a diagram referred to when the optical-path branching unit according to the embodiment is described.

For example, as shown in FIG. 8, the second glass surface 207 is provided at a position that is parallel to the first glass surface 200 and has no spatial overlap with the region of the optical path 205. In order for the light scattered on the second glass surface 207 to reach the second light-receiving unit 115, the light needs to be multiple-scattered by something in the region of the optical path 205, and as a result, stray light is reduced. Therefore, it is favorable to provide an AR (Anti-reflection) film on the second glass surface 207 in order to increase the transmittance. The AR film includes a dielectric multilayer film or the like. The light 204 reflected inside the first glass surface 200 is transmitted through a third glass surface 208 disposed at the Brewster's angle and is absorbed by an absorber 209 as much as possible. As such an absorber 209, a nanoscale random structure having a low filing rate, a metal having a nanoscale unevenness, a carbon nanotube, a resin having a nanoscale unevenness, or the like can be applied. In the present disclosure, these materials can be unlimitedly used. The third glass surface 208 has an optically polished surface without a dielectric film or the like.

Figure 9:
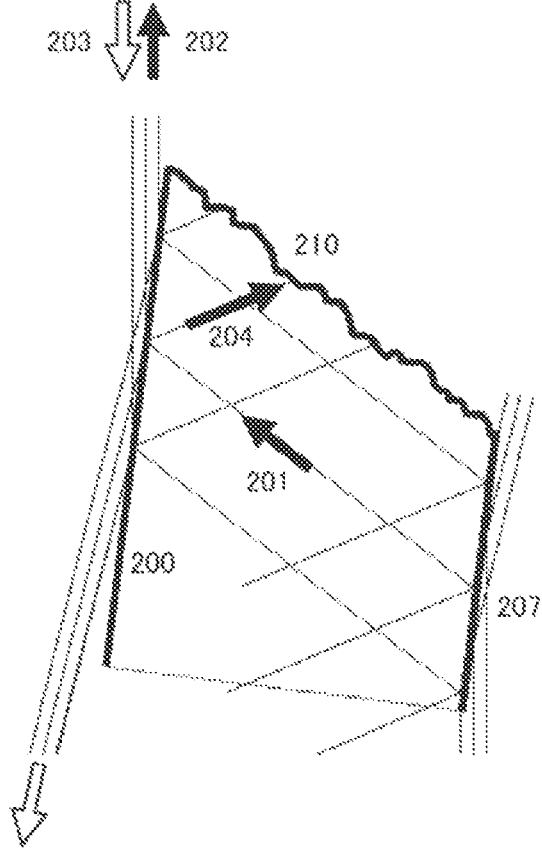
FIG. 9 is a diagram referred to when the optical-path branching unit according to the embodiment is described.

Further, as shown in FIG. 9, an absorption region 210 may be provided in the glass body having the first glass surface 200 and the second glass surface 207. The absorption region is, for example, one in which the glass surface is covered by a metal, a carbon nanotube, a resin, or the like, which has a nanoscale unevenness and absorbency.

Figure 10:
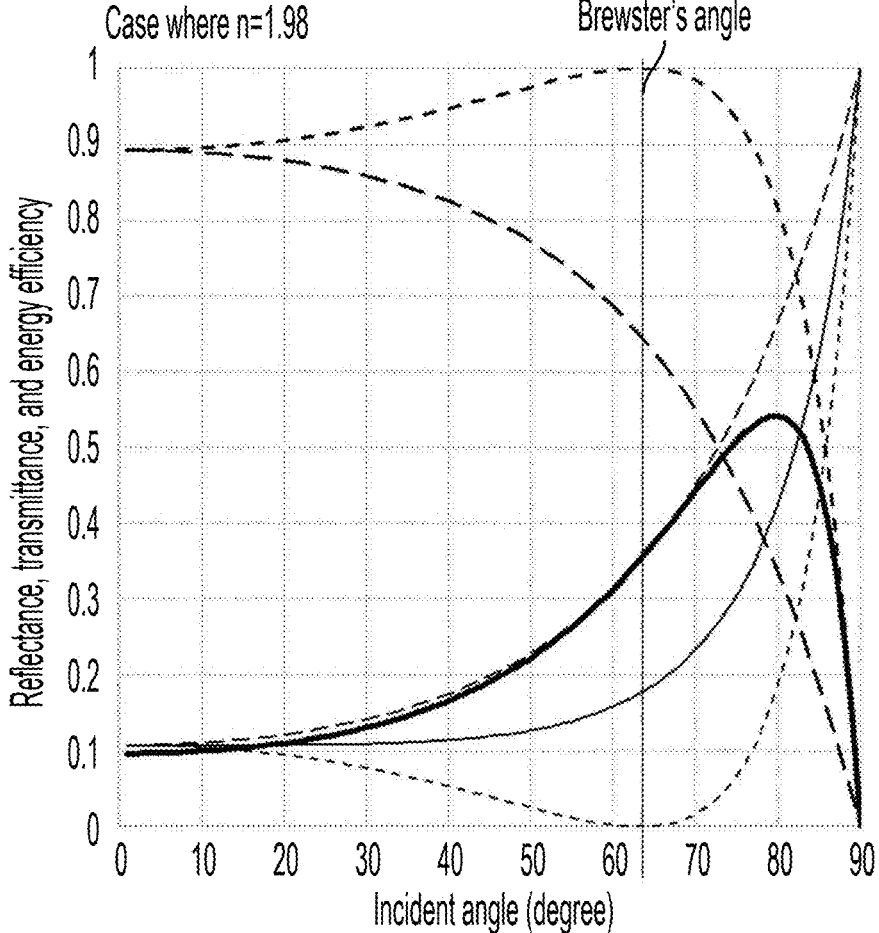
FIG. 10 is a diagram referred to when the optical-path branching unit according to the embodiment is described.

FIG. 10 shows the reflectance and transmittance of P polarization and S polarization and the utilization efficiency of accumulated light in the case where the refractive index is 1.98. The Brewster's angle is 63 degrees, and the energy utilization efficiency of light is 54% at 80 degrees that is larger than the Brewster's angle.

(Second Signal Molding Unit)

Subsequently, the second signal molding unit 116 will be described in detail. Note that part of the configuration described below may be the configuration of the second light-receiving unit 115.

The SiPM includes several hundred to several thousand cells and each of the cells has an optical response similar to that of the SPAD. The electric crosstalk and optical crosstalk are reduced by a guide ring and a trench structure. The quenching resistance of several tens of kiloohms provided in each cell is capable of converging the avalanche amplification, but the recharge time becomes long due to the CR time constant of the SiPM. Since the charges generated by the avalanche amplification are output via the quenching resistance and the parasitic capacitance, a steep rise property can be achieved. In the case where the quenching resistance and the parasitic capacitance are connected to the same electrode, the SiPM is connected to a transimpedance amplifier or an operational amplifier with a read resistance via a capacitor cut filter. Further, in the case where the quenching resistance and the parasitic capacitance are connected to different electrodes, the output of the latter is connected to a transimpedance amplifier or an operational amplifier with a read resistance. As a result, the tail of the output waveform caused by the CR time constant is removed and the measurement rate can be increased.

In the case of using the SiPM for the SP, it is important to reduce the jitter. The jitter in a read path is dominated by the decrease in S/N due to mixing of common mode noise into the signal line and S/N of the first-stage amplifier. In particular, in a small SP, it is difficult to remove noise generated from a pulse light source drive circuit, a DCDC converter, or the like, and the common mode noise increases. Since the above-mentioned connection between the SiPM and the amplifier is a single-ended input, a phase difference occurs between the common mode noise mixed into the signal line and the common mode noise of the amplifier via the ground. For this reason, the high-frequency component of the common mode noise cannot be removed.

In the case of using the SP at a short distance, it is necessary to prevent false detection due to stray light. In the SiPM, electrons or holes trapped in semiconductor defects are released during the process of avalanche amplification, and after-pulses that cause avalanche amplification again are randomly generated. After-pulses are generated also during the measurement period, and thus cannot be separated from the signal in the subsequent stage.

In the case of using the SP over a long distance, it is necessary to prevent false detection due to dark count. Dark count and after-pulses caused by dark count are randomly generated, and thus cannot be separated from the signal in the subsequent stage.

In this embodiment, the SiPM and the replica thereof are connected to the primary side of the isolate balun transformer to remove the common mode noise mixed into the signal line. By connecting the SiPM and the replica to a voltage modulator circuit via resistances, the multiplication factor of the SiPM is modulated at high speed and the avalanche amplification is switched. As a result, false detection due to stray light noise or dark count is prevented. By slightly changing the resistance value and the properties of the replica, a dip is formed in the base waveform of the signal line and false detection of common mode noise, stray light noise, and the like is prevented. Hereinafter, the second signal molding unit 116 will be described in detail. Note that in the following description, the same configurations, portions, and the like will be denoted by the same reference symbols, and duplicate description will be omitted as appropriate.

[Balun-Type Isolation Transfer and Replica]

An example of the second signal molding unit 116 will be described with reference to Part A of FIG. 11. In an SiPM 300 in the second light-receiving unit 115, a quenching resistance and a parasitic capacitance are connected to the same terminal 301, and the quenching resistance is on the cathode electrode side. The terminal 301 is connected to a first terminal 312 of a primary-side coil 311 of a balun transformer 310 and is further connected to a drive power source 330 via a resistance 320. A terminal 341 of a replica 340 is connected to a second terminal 313 on the primary side of the balun transformer 310 and is further connected to the drive power source 330 via a resistance 321. A first terminal 316 of a secondary-side coil 314 of the balun transformer 310 is input to a first terminal 361 of a fully differential amplifier 360. A second terminal 317 of the secondary-side coil 314 is input to a second terminal 362 of the fully differential amplifier 360. The fully differential amplifier 360 includes a third terminal 318 and a fourth terminal 319 and outputs a differential signal.

The replica 340 is electrically equivalent to the SiPM 300 and does not have a light-receiving function. Therefore, as the replica 340, the same element as the SiPM 300 that is completely shielded or the equivalent circuit of the SiPM can be used. The equivalent circuit of the SiPM may be divided into cell units or may be synthesized to the smallest element.

Since the primary side and the secondary side in the balun transformer 310 are insulated, the base voltage on the primary side is the same as the drive power source 330 of the SiPM, and the secondary side is DC-connected to the first terminal 361 and the second terminal 362 of the fully differential amplifier 360 and thus is equal to the offset voltage of the fully differential amplifier. It is favorable that the resistance values of the resistance 320 and the resistance 321 are equal to each other and the wiring from the drive power source 330 to the first terminal 312 of the balun transformer 310 and the wiring from the drive power source 330 to the second terminal 313 are mirror symmetry.

With such a configuration, since the common mode noise mixed into the output of the drive power source 330 is transmitted equally to the first terminal 312 and the second terminal 313 of the balun transformer 310, no potential difference is generated between the first terminal 312 and the second terminal 313 and is transmitted to the secondary side of the balun transformer 310. The common mode noise of the SiPM 300 mixed from the ground is transmitted to the first terminal 312 and the drive power source 330 of the balun transformer 310. Meanwhile, the common mode noise of the replica 340 mixed from the ground is transmitted to the second terminal 313 and the drive power source 330 of the balun transformer 310. Since the SiPM 300 and the replica 340 are electrically equivalent to each other, the common mode noise that has passed therethrough has the same phase. Therefore, no potential difference is generated between the first terminal 312 and the second terminal 313 and is transmitted to the secondary side of the balun transformer 310.

Next, the transmission of the light-receiving signal of the SiPM 300 will be described. The light-receiving element and the replica are connected to a power source or grounded, and the combined impedance of the balun transformer seen from the light-receiving element and the replica is smaller than the combined impedance between the light-receiving element and the power source or ground and the combined impedance between the replica and the power source or ground in the signal band. For example, the combined impedance of the high-frequency band seen from the terminal 301 of the SiPM 300 is smaller in the balun transformer 310 than the resistance 320. The input impedance of the fully differential amplifier 360 is several ten ohms to several thousand ohms. When the number of turns of the primary-side coil of the balun transformer 310 is smaller than the number of turns of the secondary-side coil, for example, when the number of turns of the secondary-side coil is four times the number of turns of the primary-side coil, the input impedance of the fully differential amplifier 360 seen from the primary side is $\frac{1}{16}$. In a millimeter-sized balun transformer using a ferrite core, the inductance of one turn is as large as several hundred nanohenries to several microhenries. However, the ferrite core increases the coupling ratio between the primary side and the secondary side to 99% or more and the effective inductance between the terminals on the primary side is as small as several nanohenries to ten and several nanohenries. Therefore, in the band of several ten megahertz to several gigahertz corresponding to the high-frequency component of the SiPM 300, the combined impedance of the balun transformer 310 is approximately several ohms to several ten ohms. For example, when the resistance value of the resistance 320 is set to 50 ohms, most of the high-frequency component passes through the primary-side coil of the balun transformer 310 and flows to the capacitor of the replica 340. Then, the potential difference between the SiPM 300 and the replica 340 gradually disappears, and they are recharged from the drive power source 330 via the resistance 320 and the resistance 321, respectively.

In the balun transformer using a ferrite core, the reliability is improved by using a three-layer insulating wire on the primary side or the secondary side. Further, the balun transformer can be formed on a substrate using a patterning technology, laminated using a CMOS technology, or made monolithic with an amplifier circuit in the subsequent stage. With such a configuration, since the coupling ratio between the primary side and the secondary side is as small as appropriately 50%, the inductance of the primary side alone is set to several ten nanohenries.

Note that resistances having the same resistance values may be inserted between the SiPM 300 and the primary side of the balun transformer and between the replica 340 and the primary side of the balun transformer. Further, a resistance may be provided between the secondary side of the balun transformer and the fully differential amplifier 360, and the same resistances are inserted between the first terminal 316 and the first terminal 361 and between the second terminal 317 and the second terminal 362. As a result, the band can be adjusted.

Figure 12:
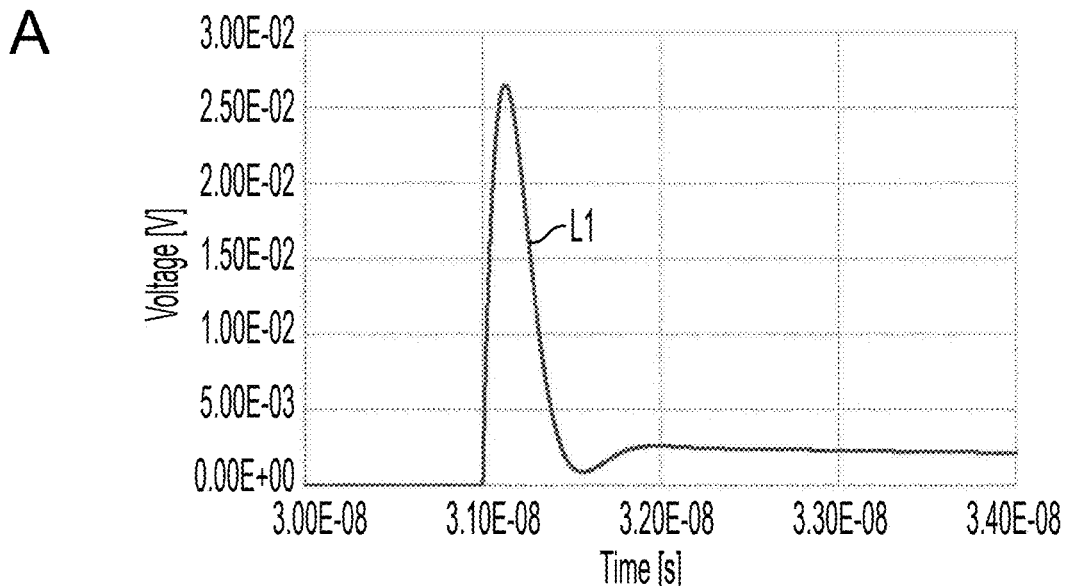
FIG. 12 are each a diagram showing simulation results, which is referred to when the second light-receiving unit according to the embodiment is described.
Figure 12:
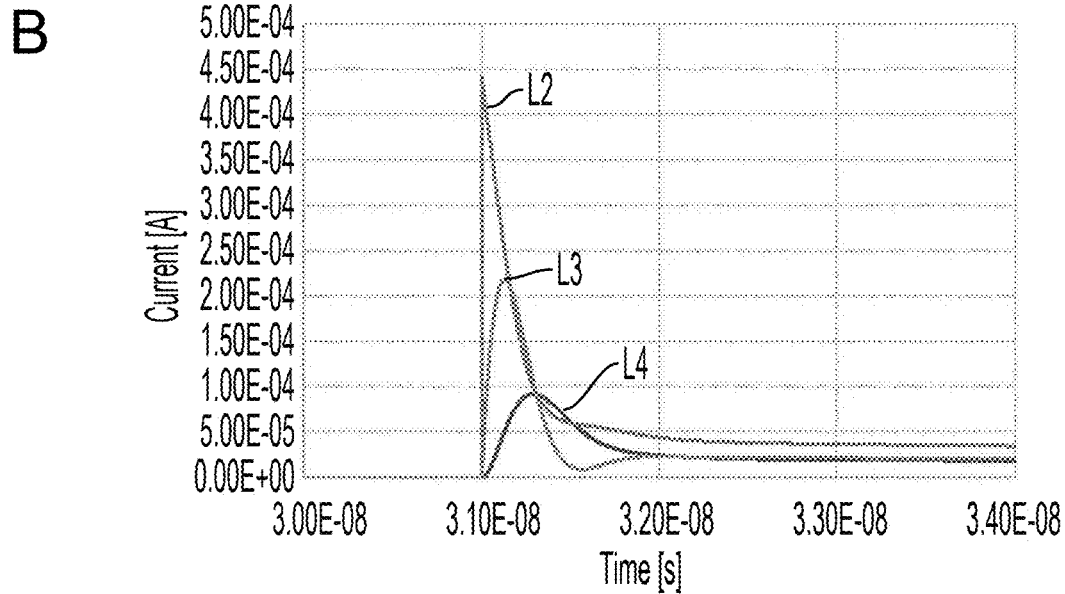

Part A of FIG. 12 and Part B of FIG. 12 each show the simulation result of the output signal of the fully differential amplifier 360 when the SiPM 300 has received light. An output voltage L1 is a steep pulse from sub-nanoseconds to several nanoseconds with a few tails having a large time constant. Since the SiPM 300 includes several hundred to several thousand cells, charges generated by the avalanche amplification in the cell that has received light are first recharged from the cell that has not received light via the parasitic capacitance. After that, due to the charges charged in the replica 340, the current passes through the primary-side coil of the balun transformer 310 and has such an output signal because the SiPM 300 is recharged and the time change of the current at that time is transmitted to the secondary side. As shown in Part B of FIG. 12, such behavior appears in an output current L2 passing through the resistance 320, an output current L3 passing through the primary-side coil 311 of the balun transformer 310, and an output current L4 passing through the resistance 321.

Figure 11:
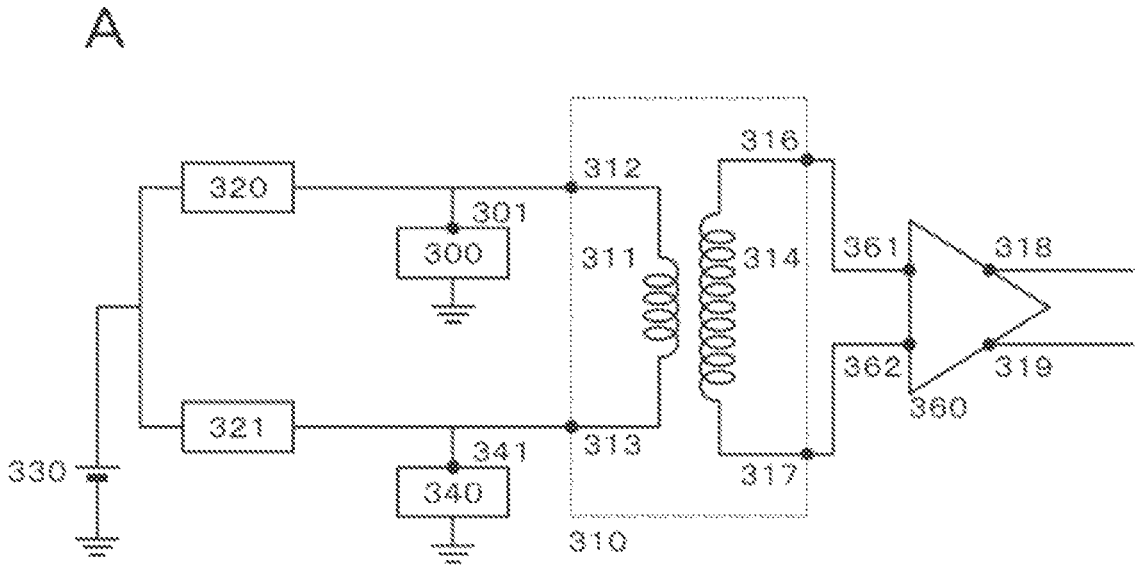
FIG. 11A and FIG. 11B are each a diagram referred to when a plurality of configuration examples of a second light-receiving unit according to the embodiment is described.
Figure 11:
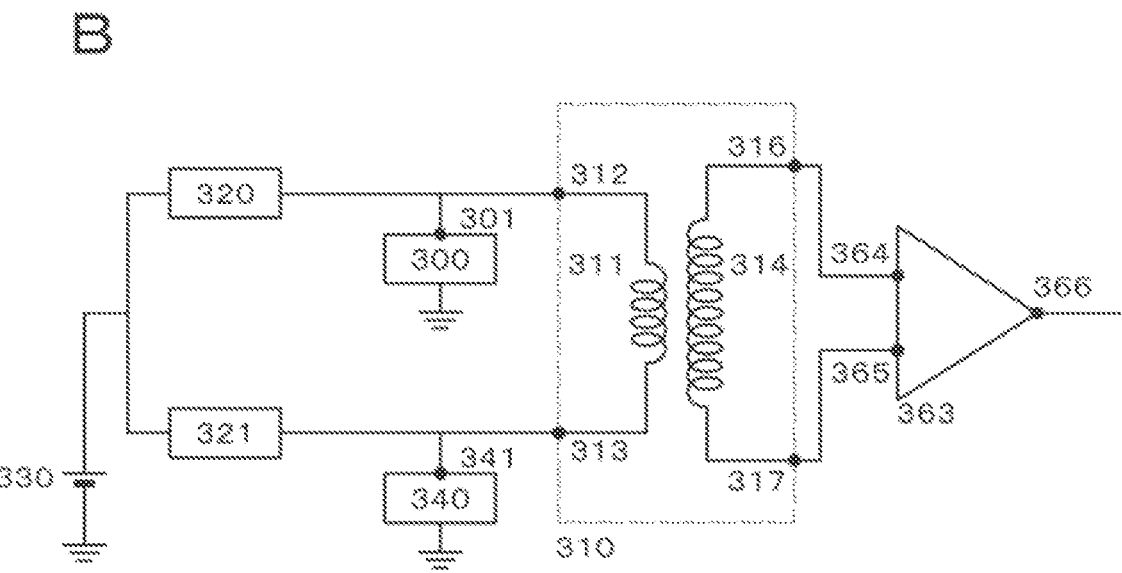

Part B of FIG. 11 is a diagram showing another example of the second signal molding unit 116. Hereinafter, the difference from the second signal molding unit 116 shown in Part A of FIG. 11 will be mainly described. In the SiPM 300, a quenching resistance and a parasitic capacitance are connected to the same terminal 301 and the quenching resistance is on the cathode electrode side. The terminal 301 is connected to the first terminal 312 of the primary-side coil 311 of the balun transformer 310 and is further connected to the drive power source 330 via the resistance 320. The terminal 341 of the replica 340 is connected to the second terminal 313 on the primary side of the balun transformer 310 and is further connected to the drive power source 330 via the resistance 321. The first terminal 316 of the secondary-side coil 314 of the balun transformer 310 is input to a first terminal 364 of a differential amplifier 363. The second terminal 317 is input to a second terminal 365 of the differential amplifier 363. The differential amplifier 363 includes a third terminal 366 and outputs a signal from the third terminal 366. Since such a single output is easily affected by the common mode noise, it is more suitable for incorporation into an ASIC (application specific integrated circuit) than a barrack circuit.

Figure 13:
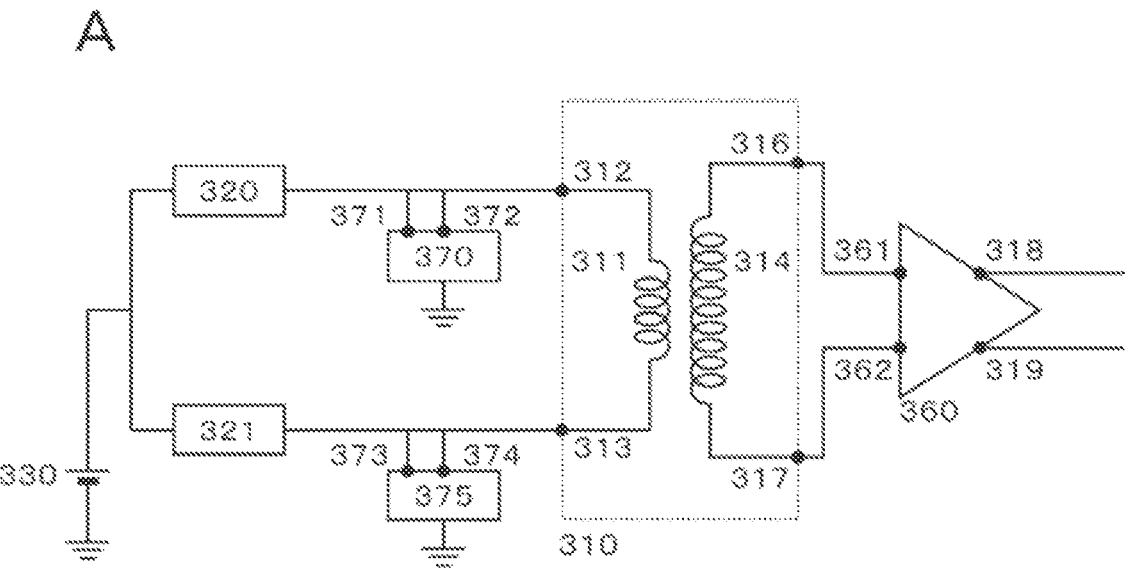
FIG. 13A and FIG. 13B are each a diagram referred to when a plurality of configuration examples of the second light-receiving unit according to the embodiment is described.
Figure 13:
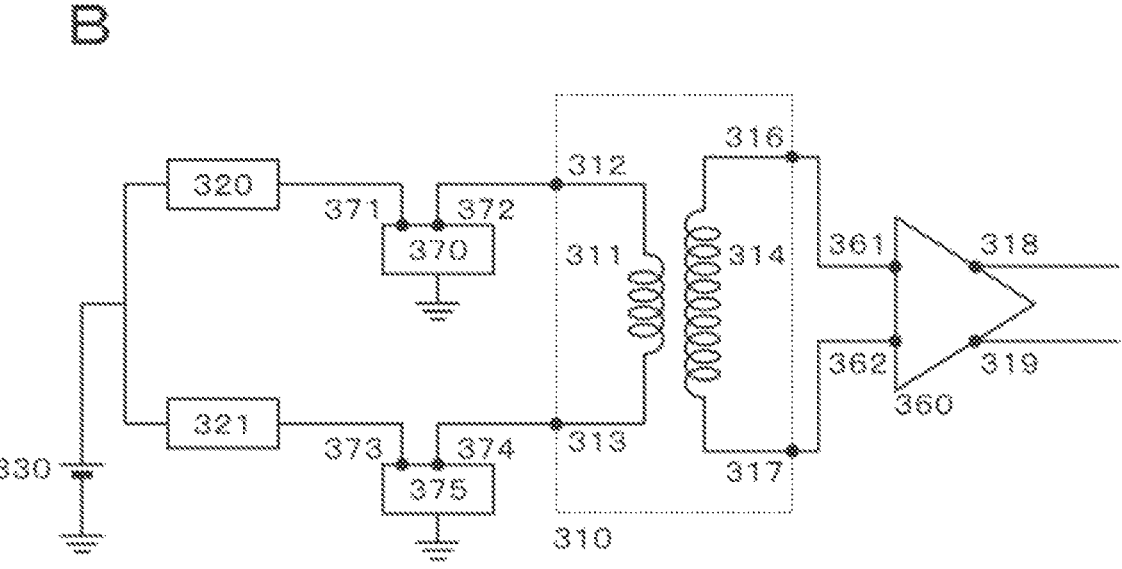

Part A of FIG. 13 and Part B of 13 are each a diagram showing another example of the second signal molding unit 116. In Part A of FIG. 13, a SiPM 370 is an example in which a quenching resistance and a parasitic capacitance are respectively connected to a terminal 371 and a terminal 372. As shown in Part A of FIG. 13, the terminal 371 and the terminal 372 are connected to each other to form a circuit similar to that in Part A of FIG. 11. Alternatively, as shown in Part B of FIG. 13, the terminal 371 may be connected to the drive power source 330 via the resistance 320 and the terminal 372 may be connected to the first terminal 312 of the primary-side coil of the balun transformer 310. Similarly, a replica 375 may include terminals 373 and 374. The fully differential amplifier 360 may be replaced with a differential amplifier as in the configuration shown in Part B of FIG. 11, for example.

Figure 14:
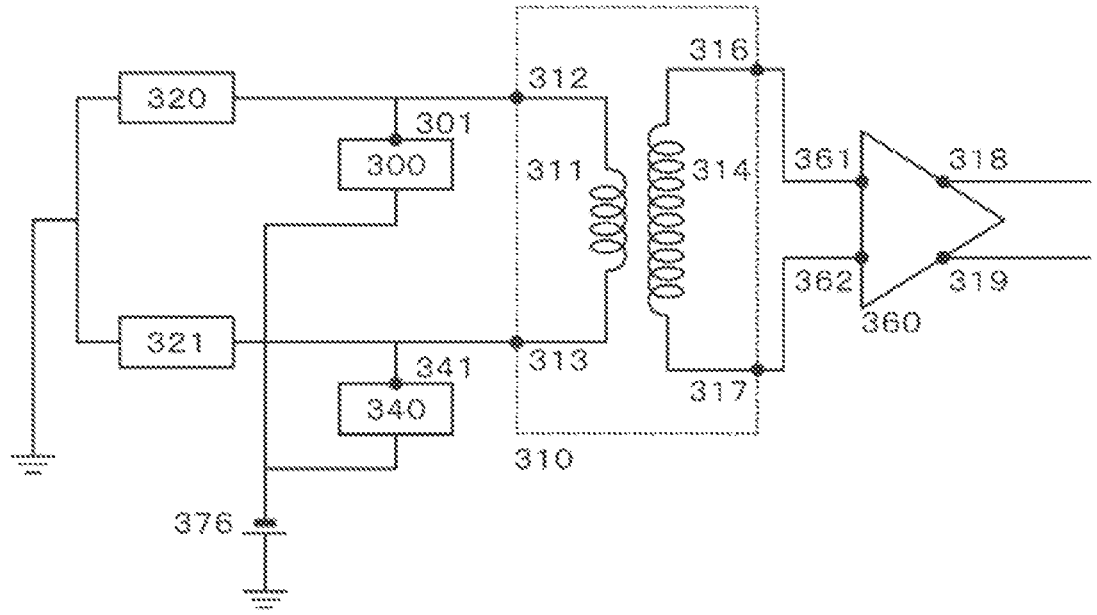
FIG. 14 is a diagram referred to when a plurality of configuration examples of the second light-receiving unit according to the embodiment is described.

FIG. 14 is a diagram showing another example of the second signal molding unit 116. The example shown in FIG. 14 is an example in which the SiPM 300 and the replica 340 are connected to a negative power source 376. The common mode noise is not transmitted to the secondary side of the balun transformer 310 similarly to the case shown in Part A of FIG. 11, and only the light-receiving signal of the SiPM 300 is transmitted.

Figure 15:
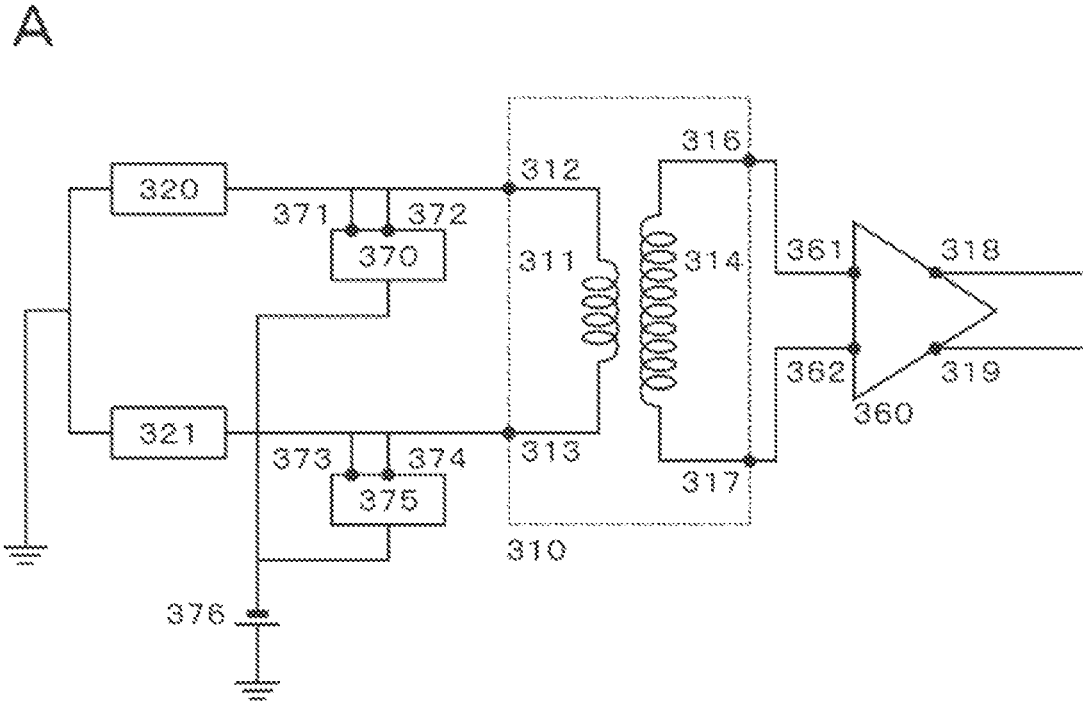
FIG. 15A and FIG. 15B are each a diagram referred to when a plurality of configuration examples of the second light-receiving unit according to the embodiment is described.
Figure 15:
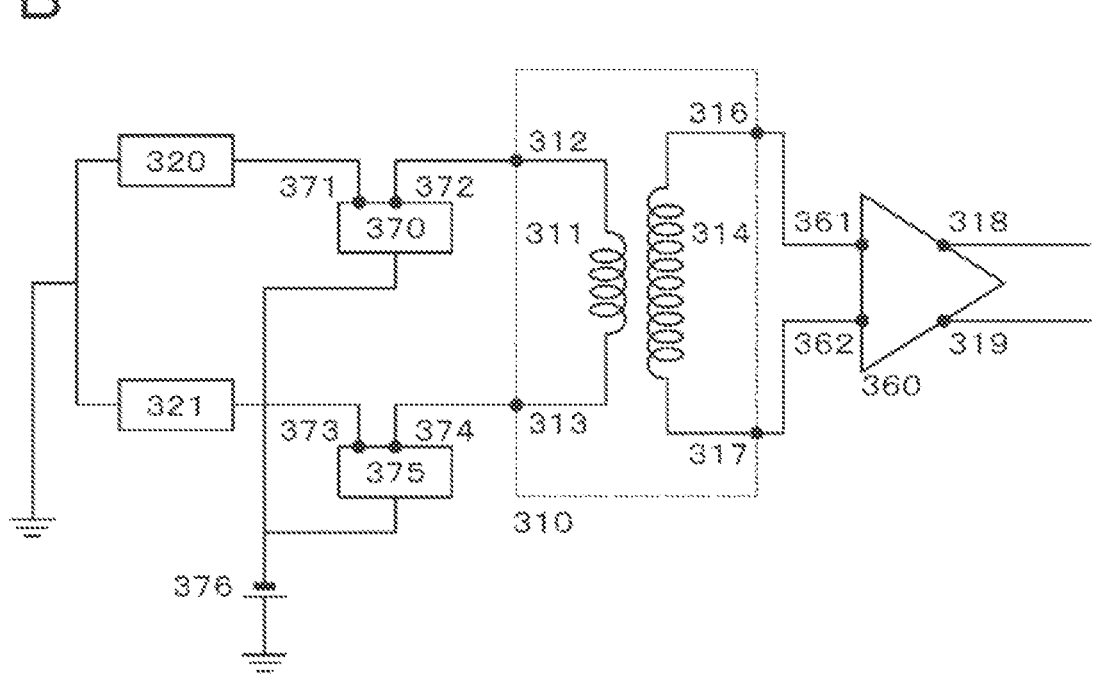

Part A of FIG. 15 and Part B of FIG. 15 are each a diagram showing another example of the second signal molding unit 116. The example shown in Part A of FIG. 15 and Part B of FIG. 15 is an example in which the SiPM 370 and the replica 375 are connected to the negative power source 376. The common mode noise is not transmitted to the secondary side of the balun transformer 310 similarly to the case of Part A of FIG. 13, and only the light-receiving signal of the SiPM 370 is transmitted.

Figure 16:
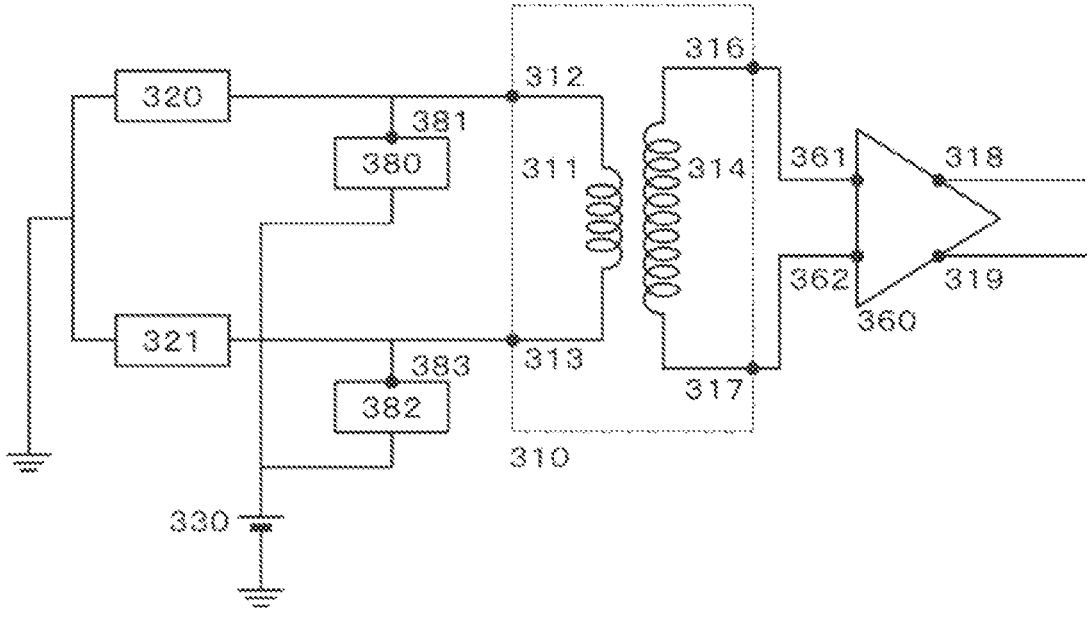
FIG. 16 is a diagram referred to when a plurality of configuration examples of the second light-receiving unit according to the embodiment is described.

FIG. 16 is a diagram showing another example of the second signal molding unit 116. The example shown in FIG. 16 is an example in which, in a SiPM 380, a quenching resistance and a parasitic capacitance are connected to the same terminal 381 and the quenching resistance is on the anode electrode side. The common mode noise is not transmitted to the secondary side of the balun transformer 310 similarly to the case shown in Part A of FIG. 11, and only the light-receiving signal of the SiPM 380 is transmitted. The same applies to a replica 382 and a terminal 383 connected to the replica 382.

Figure 17:
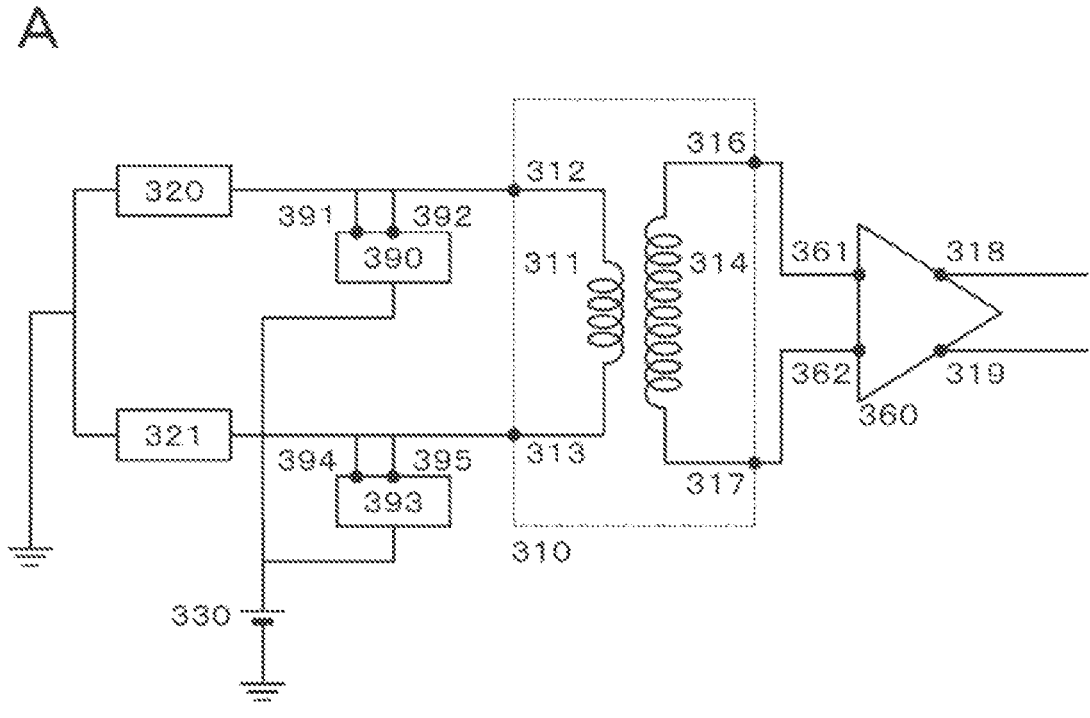
FIG. 17A and FIG. 17B are each a diagram referred to when a plurality of configuration examples of the second light-receiving unit according to the embodiment is described.
Figure 17:
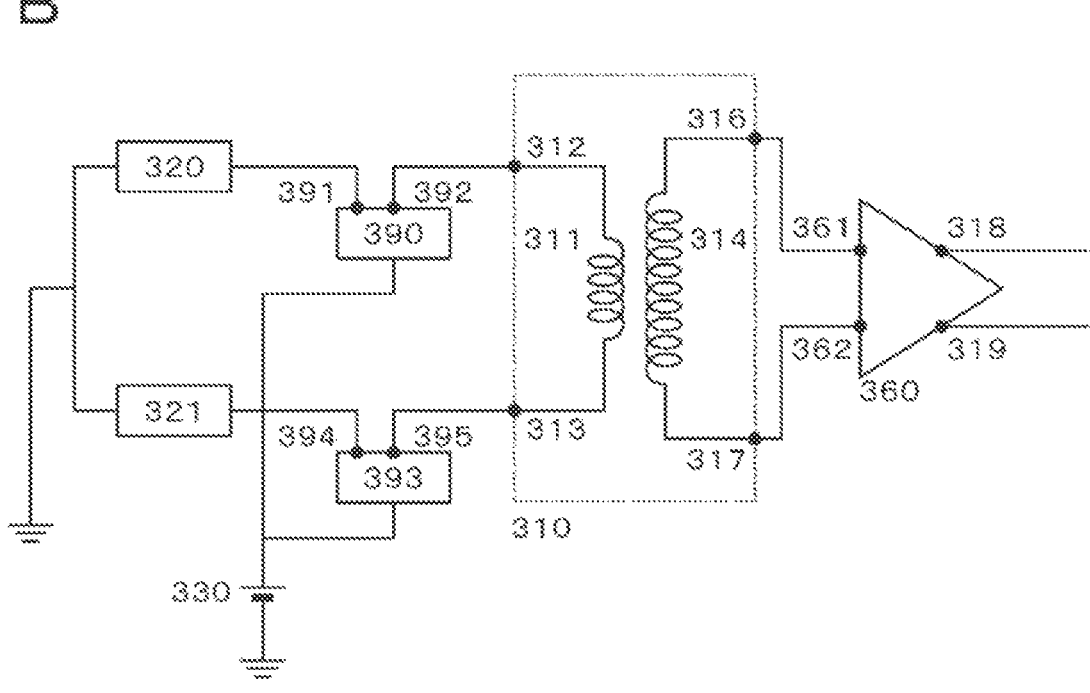

Part A of FIG. 17 and Part B of FIG. 17 are each a diagram showing another example of the second signal molding unit 116. The example shown in Part A of FIG. 17 and Part B of FIG. 17 is an example in which a quenching resistance and a parasitic capacitance of a SiPM 390 are respectively connected to a terminal 391 and a terminal 392. The common mode noise is not transmitted to the secondary side of the balun transformer 310 similarly to the case of Part A of FIG. 11, and only the light-receiving signal of the SiPM 390 is transmitted. The same applies also to a replica 393 and a terminal 394 and a terminal 395 of the replica 393.

The above-mentioned SiPM 380 or SiPM 390 may be connected to a negative power source as in FIG. 14 and the like. The above-mentioned SiPM may be a light-receiving element such as an SPAD and an APD.

Figure 18:
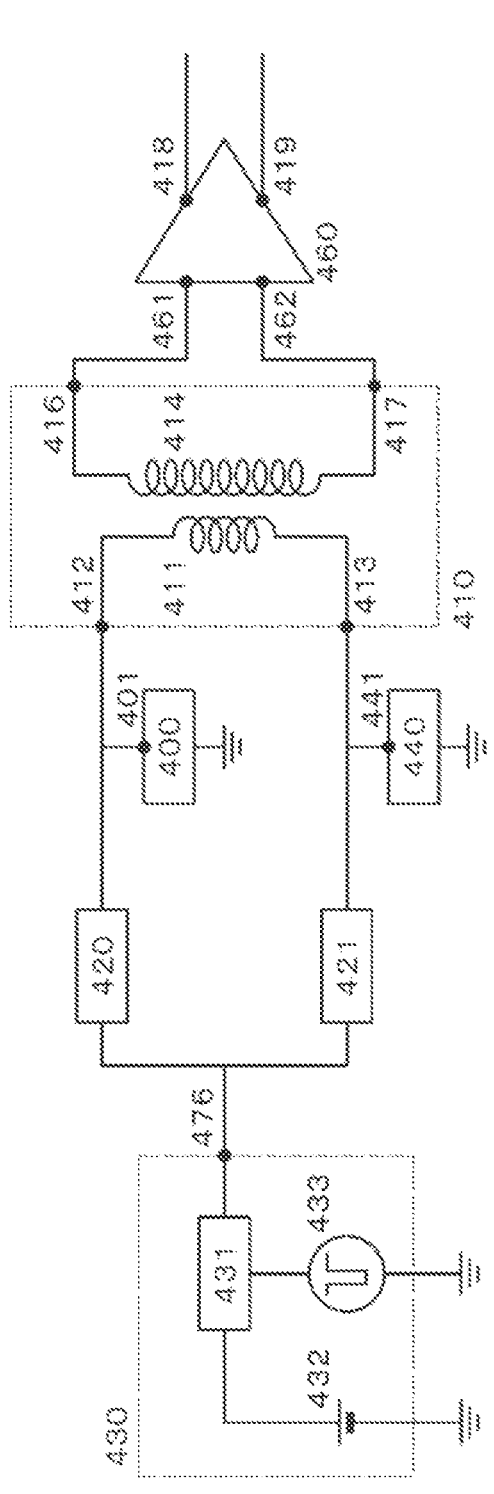
FIG. 18A and FIG. 18B are each a diagram referred to when a plurality of configuration examples of the second light-receiving unit according to the embodiment is described.
Figure 18:
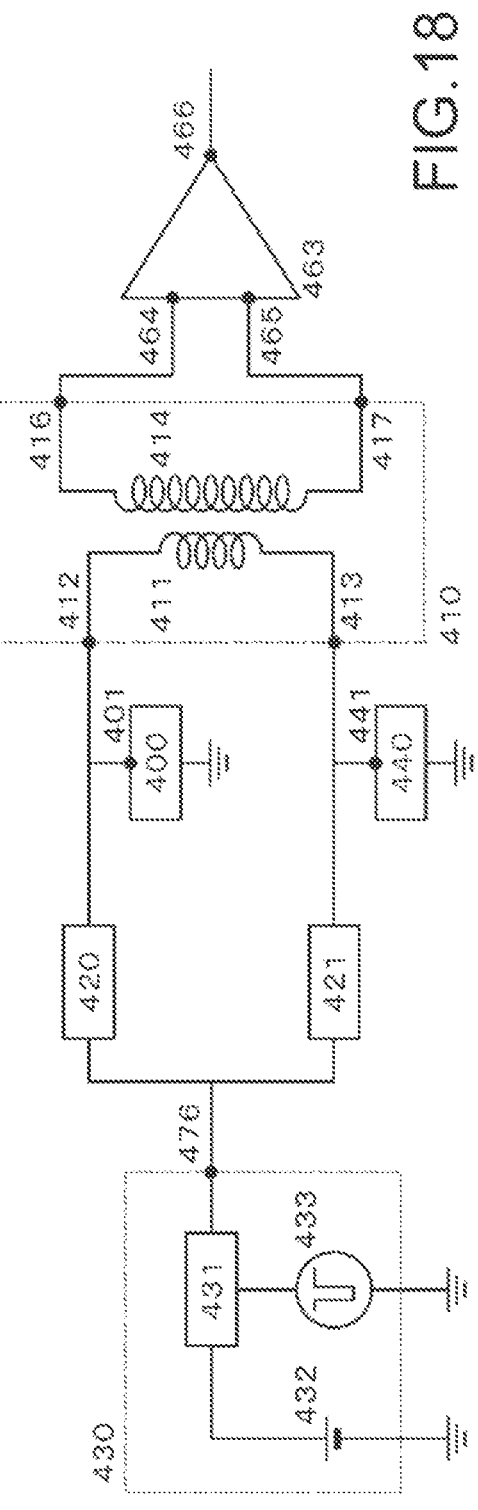

Part A of FIG. 18 and Part B of FIG. 18 are each a diagram showing another example of the second signal molding unit 116. In part A of FIG. 18, in a SiPM 400, a quenching resistance and a parasitic capacitance are connected to the same terminal 401 and the quenching resistance is on the cathode electrode side. The terminal 401 is connected to a first terminal 412 of a primary-side coil 411 of a balun transformer 410 and is further connected to a drive power source 430 via a resistance 420. The drive power source 430 includes a constant-voltage source 432 and a modulator circuit 433 via a bias T431. A terminal 441 of a replica 440 is connected to a second terminal 413 on the primary side of the balun transformer 410 and is further connected to the drive power source 430 via a resistance 421. A first terminal 416 of a secondary-side coil 414 of the balun transformer 410 is input to a first terminal 461 of a fully differential amplifier 460. A second terminal 417 is input to a second terminal 462 of the fully differential amplifier 460. The fully differential amplifier 460 includes a third terminal 418 and a fourth terminal 419 and outputs a differential signal.

Part B of FIG. 18 is an example in which a quenching resistance and a parasitic capacitance of the SiPM 400 in the second signal molding unit 116 are connected to the same terminal 401 and the quenching resistance is on the cathode electrode side. The terminal 401 is connected to the first terminal 412 of the primary-side coil 411 of the balun transformer 410 and is further connected to the drive power source 430 via the resistance 420. The drive power source 430 includes the constant-voltage source 432 and the modulator circuit 433 via the bias T431. The terminal 441 of the replica 440 is connected to the second terminal 413 on the primary side of the balun transformer 410 and is further connected to the drive power source 430 via the resistance 421. The first terminal 416 of the secondary-side coil 414 of the balun transformer 410 is input to a first terminal 464 of a differential amplifier 463. The second terminal 417 is input to a second terminal 465 of the differential amplifier 463. The differential amplifier 463 includes a third terminal 466 and outputs a signal from the third terminal 466. Such a single output is easily affected by the common mode noise, it is more suitable for incorporation into an ASIC (application specific integrated circuit) than a barrack circuit. The fully differential amplifier may be replaced with a differential amplifier.

Figures 19, 20:
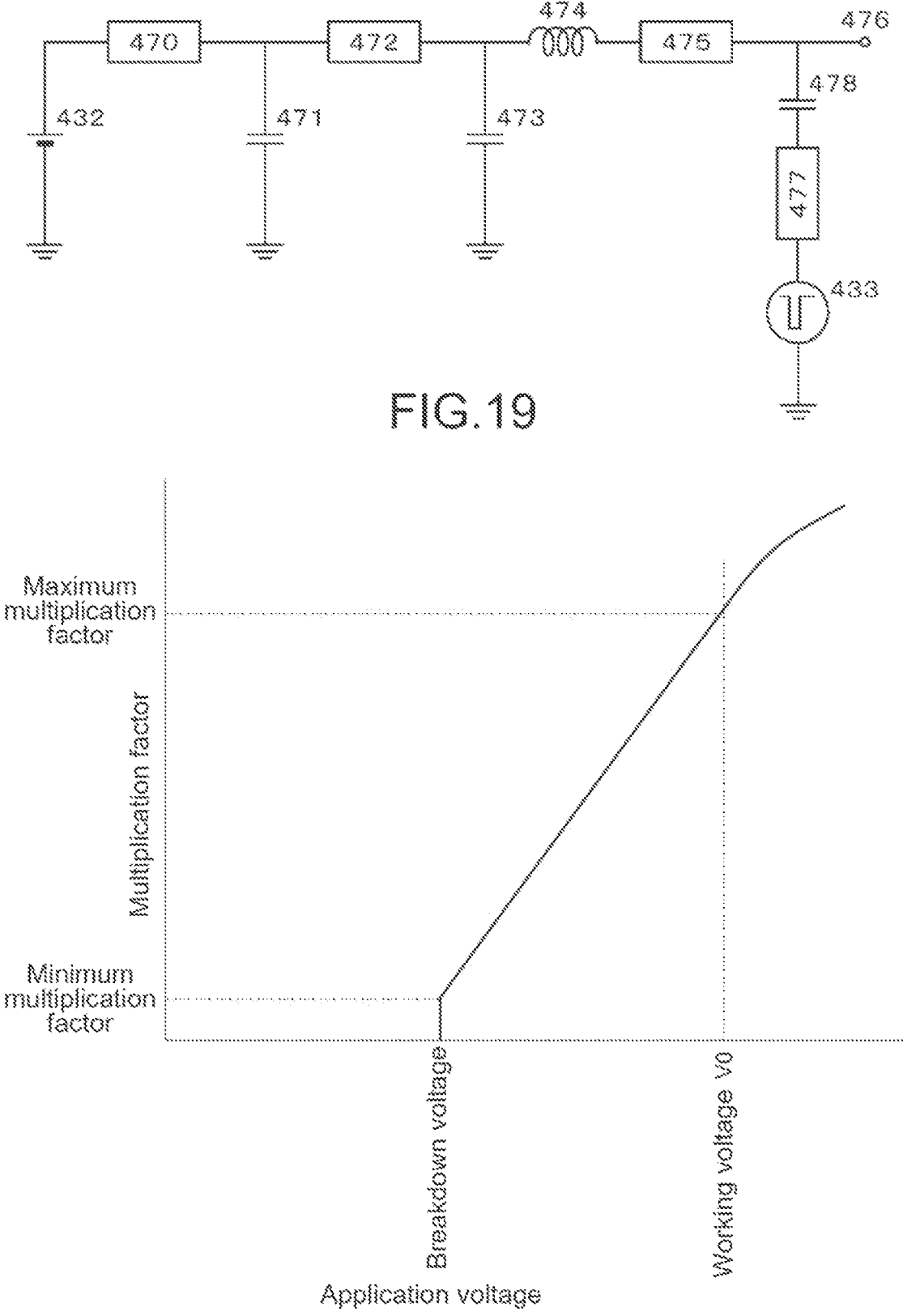
FIG. 19 is a diagram showing a detailed configuration example of a drive power source according to the embodiment.
FIG. 20 is a diagram showing a relationship between an application voltage and a multiplication factor.
Figures 19, 20:
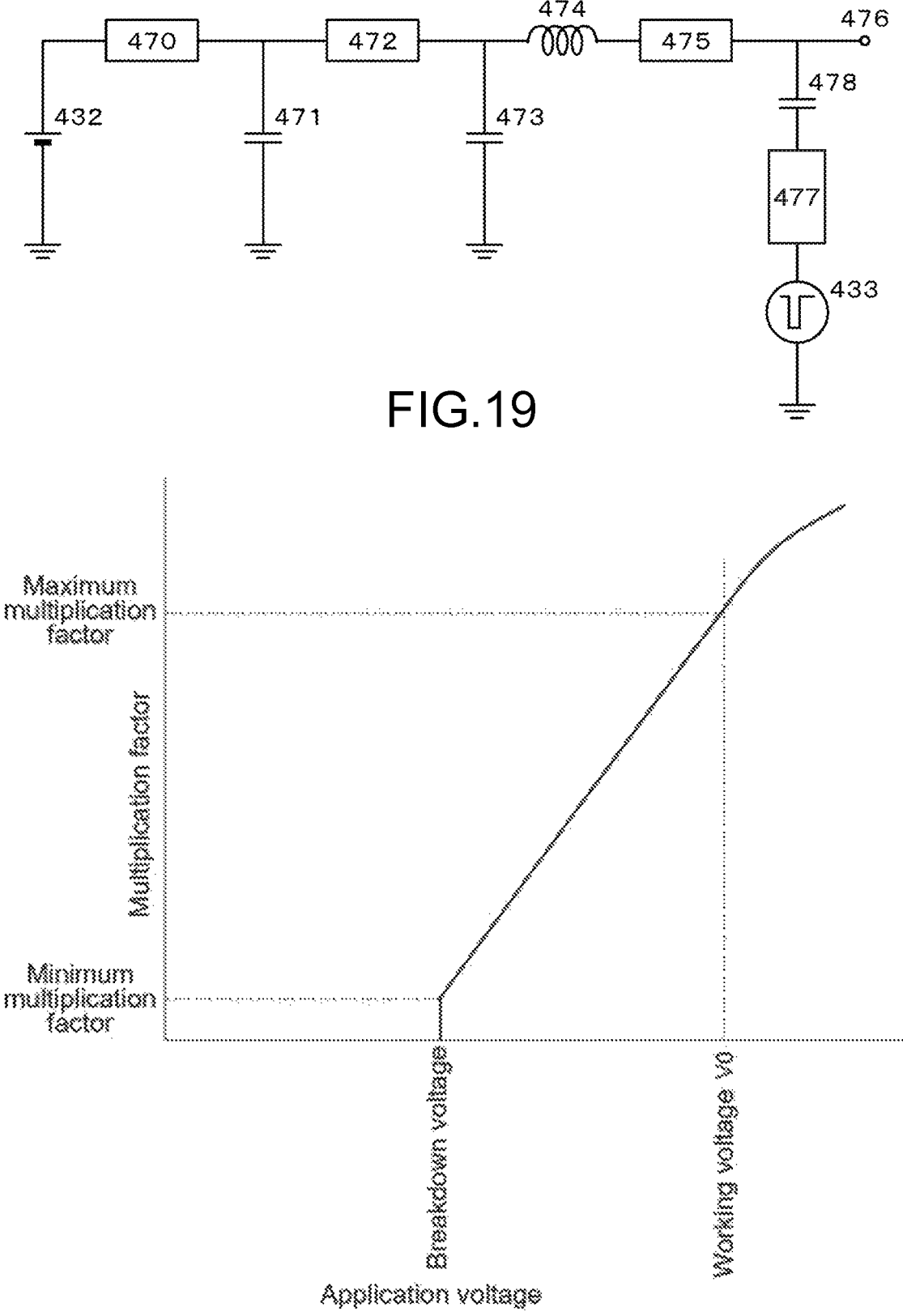

FIG. 19 is a diagram showing a detailed configuration example of the drive power source 430. The output of the constant-voltage source 432 is connected to a resistance 470. The output side of the resistance 470 is branched and connected to each of a first decoupling capacitor 471 and a resistance 472. The output side of the resistance 472 is branched and connected to each of a second decoupling capacitor 473 and an inductor 474. The output side of the inductor 474 is connected to one end side of a resistance 475, and the other end side of the resistance 475 is connected to an output terminal 476. The modulator circuit 433 includes an operational amplifier or the like, and the output of the modulator circuit 433 is connected to the output terminal 476 via a resistance 477 and a capacitor 478. Since the SP operates at a repetition frequency of several hundred kilohertz to ten and several megahertz, the constant-voltage source 432 needs feedback corresponding to this frequency. Meanwhile, since the modulator circuit 433 also operates at the same repetition frequency, an operation in which the modulation voltage by the modulator circuit 433 is compensated by the constant-voltage source is performed in a general combination of a bias T and a decoupling capacitor. Since the SiPM side of the capacitor 478 is a closed circuit, no leakage current is generated in the modulator circuit unless the constant-voltage source compensates. By providing the resistance 472 of approximately 5 ohms, a modulation voltage that has slightly passed through the inductor 474 is compensated by the second decoupling capacitor 473 and the influence on the constant-voltage source 432 can be suppressed as much as possible. In order to suppress the oscillation of the modulator circuit 433, the resistance 477 of approximately 5 ohms and the resistance 475 of approximately 20 ohms are provided. The output terminal 476 includes the capacitor 478 of approximately 0.01 microfarad. These constants are not limited thereto and are optimized for the system.

FIG. 20 shows the relationship between the application voltage of the SiPM and the multiplication factor. When reaching the breakdown voltage, a multiplication factor steeply rises and the multiplication factor rises substantially linearly within the range of several volts from the breakdown voltage. After that, the multiplication factor is saturated. The multiplication factor of the avalanche amplification is approximately 102, and the multiplication factor of the avalanche breakdown is 105 to 106. Since the dark count of the SiPM increases as the application voltage increases, a working voltage V0 is set within the range of 5 volts to 7 volts from the breakdown voltage.

The modulation voltage by the modulator circuit 433 will be described. Since the modulation voltage is transmitted equally to the first terminal 412 and the second terminal 413 of the balun transformer 410 similarly to the above-mentioned common mode noise, no potential difference is generated between the first terminal 412 and the second terminal 413 and is transmitted to the secondary side of the balun transformer 410. Therefore, the modulation voltage is not mixed into the signal line and only the light-receiving signal of the SiPM 400 is transmitted. Since the modulation voltage and the light-receiving signal are capable of sharing a frequency band, the light-receiving signal can be taken out while modulating the application voltage of the SiPM 400 using the steep rising and falling properties of the modulation voltage.

The total capacity of the pn junction that contributes to the light reception of the SiPM 400 and the avalanche amplification region and the parasitic capacitance are approximately 10:1. Therefore, when a voltage difference ΔV is instantly applied to the terminal 401, the voltage applied to the pn junction and the avalanche amplification region instantly changes by 0.1 ΔV. After that, it gradually changes by ΔV in accordance with the time constant.

Figure 21:
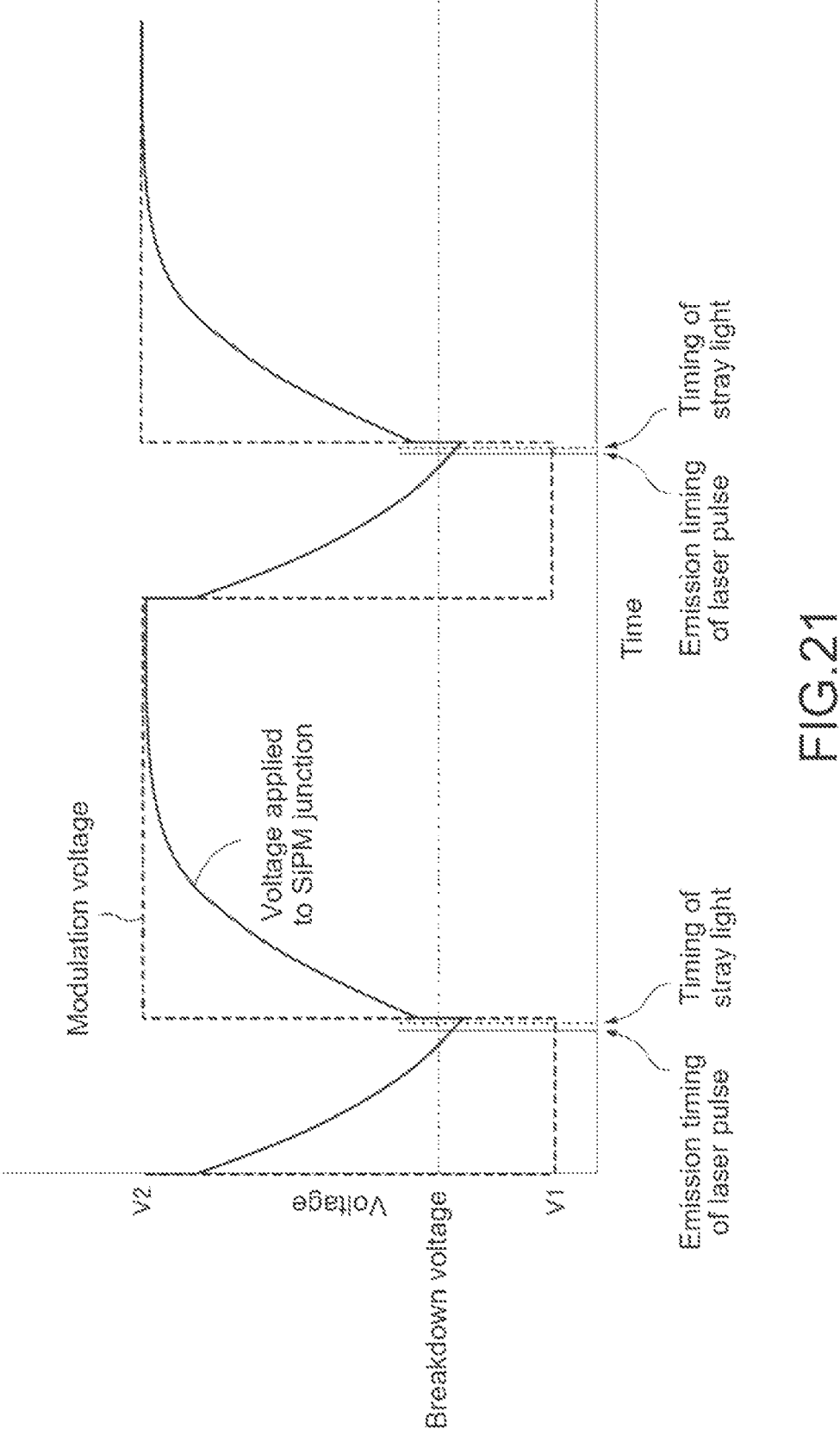
FIG. 21 is a diagram showing a relationship between a modulation voltage and an application voltage.

FIG. 21 shows the relationship between the modulation voltage of the SiPM and the application voltage of the SiPM 400. The modulation voltage combined with a constant voltage is a square wave including a low voltage V1 and a high voltage V2, and the application voltage of the SiPM 40 reaches V2 in the case where the holding time of V2 is longer than the time constant of the SiPM 400. V1 is adjusted such that the voltage to be applied to the junction of the SiPM 400 is slightly lower than the breakdown voltage by several hundred millivolts, and V2 is set to 5 volts to 7 volts higher than the breakdown voltage corresponding to the working voltage. When the modulation voltage is switched from V1 to V2, the application voltage instantly increases by 500 millivolts to 700 millivolts via the parasitic capacitance of the SiPM 400, switching from the avalanche amplification to the avalanche breakdown. When the modulation voltage is switched from V2 to V1, the application voltage instantly drops by 500 millivolts to 700 millivolts via the parasitic capacitance of the SiPM 400, switching from the avalanche breakdown to the avalanche amplification.

By instantly switching such avalanche amplification and avalanche breakdown, it is possible to prevent false detection due to stray light noise. The pulsed light emitted from a light source unit is branched into reference light heading toward the light-receiving unit 1 and measurement light heading toward the optical scanning unit by the optical-path branching unit. Since the output of the pulsed light is very strong, stray light generated by being scattered in the optical path in the device is stronger than the detection light in some cases. Further, light scattering due to dust or the like adhered to the emission window of the device generates stray light in some cases. The modulation voltage whose timing has been controlled by the modulator circuit 433 is capable of making the level of an erroneous signal due to the stray light lower than a detection threshold value by setting the voltage of the period in which the stray light reaches the SiPM 400 to V1 and the voltage of the measurement region to V2.

In the case where the modulation voltage is a square wave including the low voltage V1 and the high voltage V2 and the holding time of V2 is shorter than the time constant of the SiPM 400, the application voltage of the SiPM 400 does not reach V2, and therefore, V2 can be set higher than the working voltage V0 within the range in which the reaching voltage is V0 or less.

Since the application voltage of the SiPM 400 gradually increases in the measurement region, also the multiplication factor gradually increases. The shorter the distance to an object, the stronger the detection light, and the farther the distance, the weaker the detection light. Therefore, the detection light is stronger in the section where the multiplication factor is low, and the detection light is weaker in the section where the multiplication factor is high. Therefore, it is possible to suppress the saturation of the dynamic range in the second signal molding unit 116 in the case where the distance is short.

In the case where the stray light is small, the voltage V1 may be set to be equal to or higher than the breakdown voltage. Further, for long-distance applications, the modulation voltage may be gradually changed from V1 to V2. As a result, the dark count is reduced, and therefore, the frequency of false detection can be reduced. In particular, in the case where a threshold value is set such that a single photon can be detected and also the stray light is at a single photon level, it is effective even if the voltage difference between V1 and V2 is small.

Figure 22:
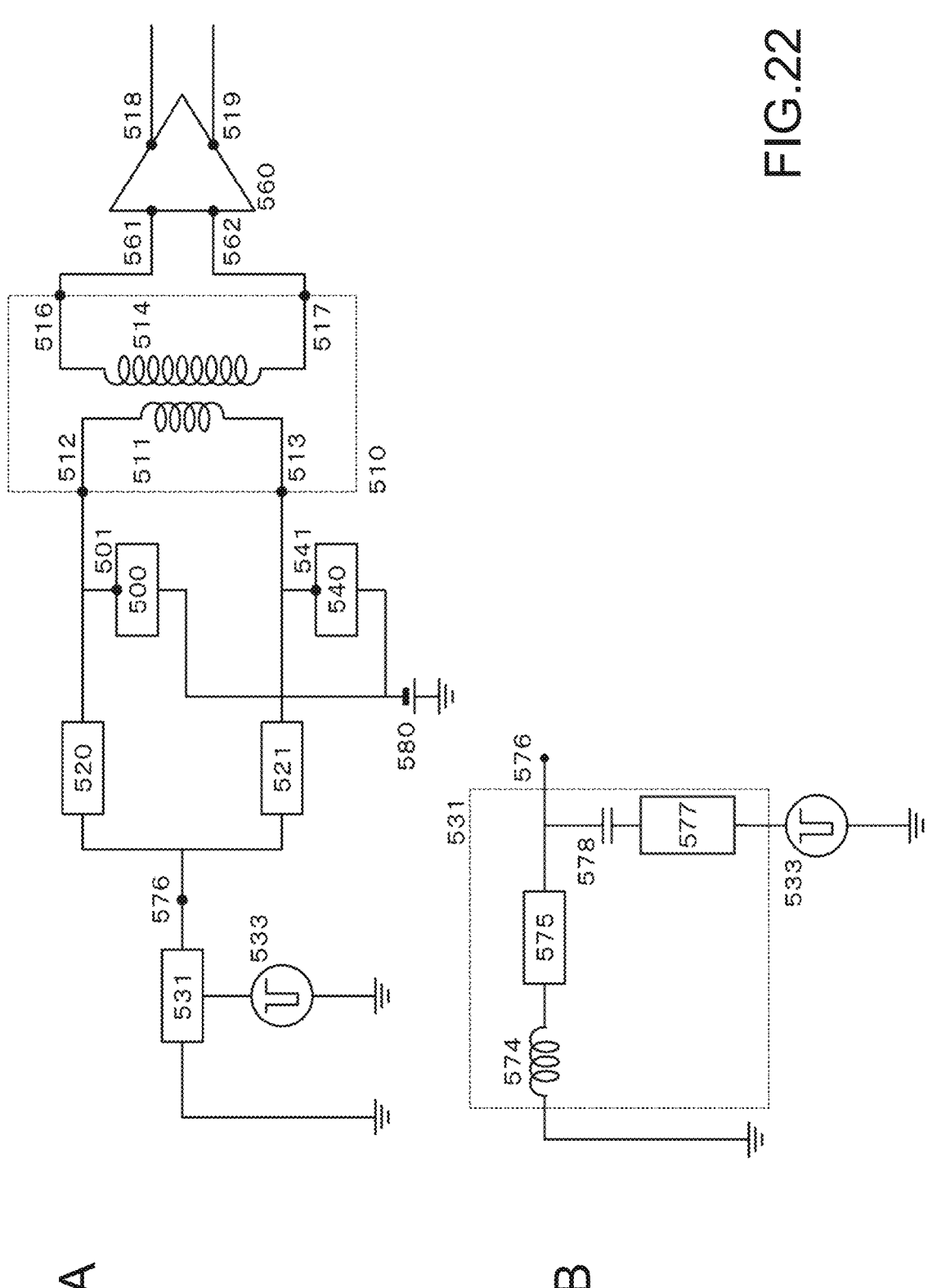
FIG. 22A and FIG. 22B are each a diagram referred to when a plurality of configuration examples of the second light-receiving unit according to the embodiment is described.

Part A of FIG. 22 is a diagram showing another configuration example of the second signal molding unit 116. Part B of FIG. 22 is a diagram showing a detailed configuration example of the bias T in the second signal molding unit 116 shown in Part A of FIG. 22. As shown in Part A of FIG. 22, in a SiPM 500 in the second signal molding unit 116, a quenching resistance and a parasitic capacitance are connected to the same terminal 501 and the quenching resistance is on the cathode electrode side. The terminal 501 is connected to a first terminal 512 of a primary-side coil 511 of a balun transformer 510 and is further connected to a bias T 531 via a resistance 520, the branched one is grounded, and the other is connected to a modulator circuit 533. As shown in Part B of FIG. 22, the bias T 531 includes an inductor 574 whose one end side is grounded, and the other end side of the inductor 574 is connected to an output terminal 576 via a resistance 575. The modulator circuit 533 includes an operational amplifier and the like. The output of the modulator circuit 533 is connected to the output terminal 576 via a resistance 577 and a capacitor 578. The anode of the SiPM 500 is connected to a negative power source 580.

A terminal 541 of a replica 540 is connected to a second terminal 513 on the primary side of the balun transformer 510 and is further connected to the output terminal 576, i.e., the bias T 531 via a resistance 521. A first terminal 516 of a secondary-side coil 514 of the balun transformer 510 is input to a first terminal 561 of a fully differential amplifier 560. A second terminal 517 is input to a second terminal 562 of the fully differential amplifier 560. The fully differential amplifier 560 includes a third terminal 518 and a fourth terminal 519 and outputs a differential signal. The anode of the replica 540 is connected to the negative power source 580.

In order to suppress the oscillation of the modulator circuit 533, the resistance 577 of approximately 5 ohms and the resistance 575 of approximately 20 ohms are provided. The output terminal 576 includes the capacitor 578 of approximately 0.01 microfarad. These constants are not limited thereto and are optimized for the system.

The modulation voltage is a square wave with a voltage difference of 5 volts to 7 volts, and the voltage differences from the negative power source are V1 and V2. The driving method is similar to that in the case of using the positive power source described in FIG. 18 to FIG. 21.

Figure 23:
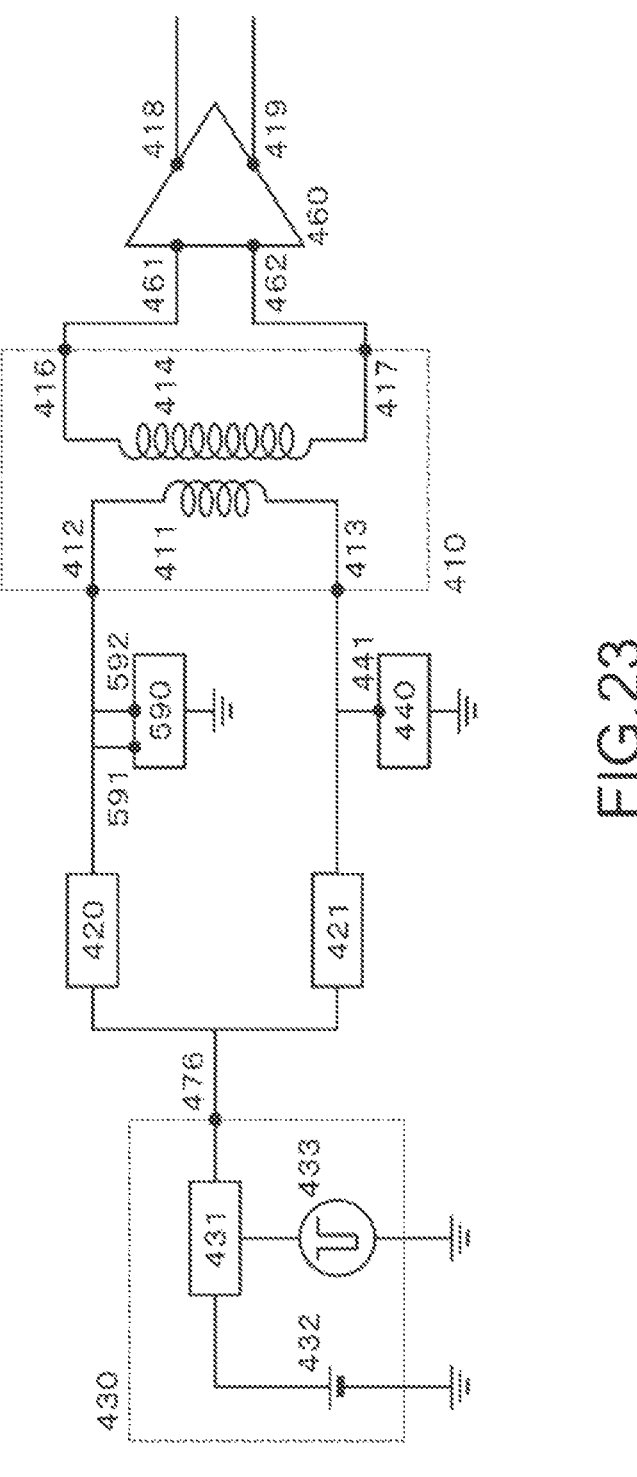
FIG. 23 is a diagram referred to when a plurality of configuration examples of the second light-receiving unit according to the embodiment is described.

FIG. 23 is a diagram showing another configuration example of the second signal molding unit 116. The example shown in FIG. 23 is an example in which in a SiPM 590, a quenching resistance and a parasitic capacitance are respectively connected to a terminal 591 and a terminal 592. The driving method of the circuit shown in Part A of FIG. 18 can be applied to the second signal molding unit 116 shown in FIG. 23.

Figure 24:
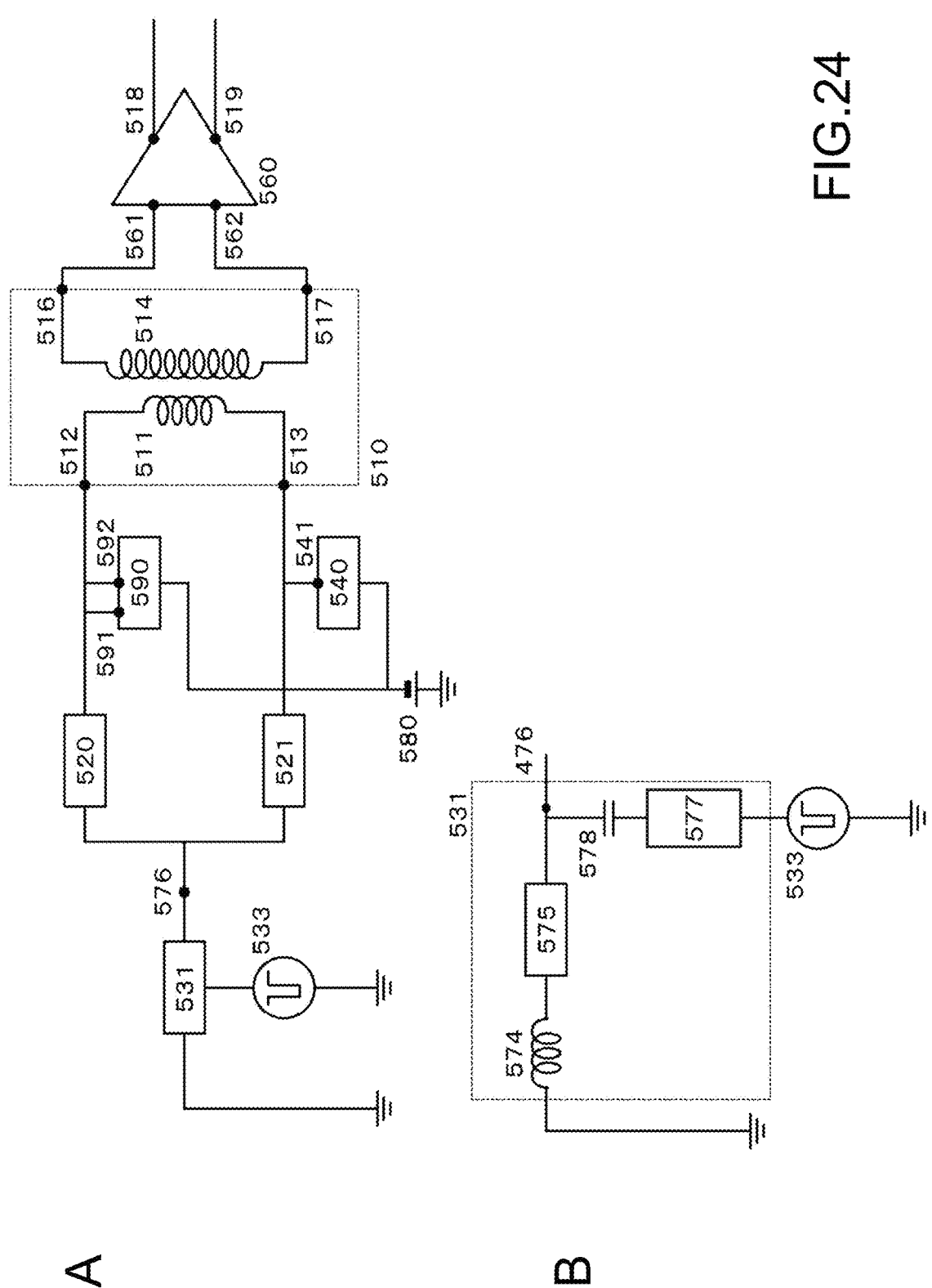
FIG. 24A and FIG. 24B are each a diagram referred to when a plurality of configuration examples of the second light-receiving unit according to the embodiment is described.

Part A of FIG. 24 and Part B of FIG. 24 are each a diagram showing another configuration example of the second signal molding unit 116. The difference from the configuration of the second signal molding unit 116 shown in FIG. 22 is that the SiPM 500 is replaced with the SiPM 590 and a quenching resistance and a parasitic capacitance of the SiPM 590 are respectively connected to the terminal 591 and the terminal 592. As the driving method, the driving method of the second signal molding unit 116 shown in FIG. 22 can be applied.

Figure 25:
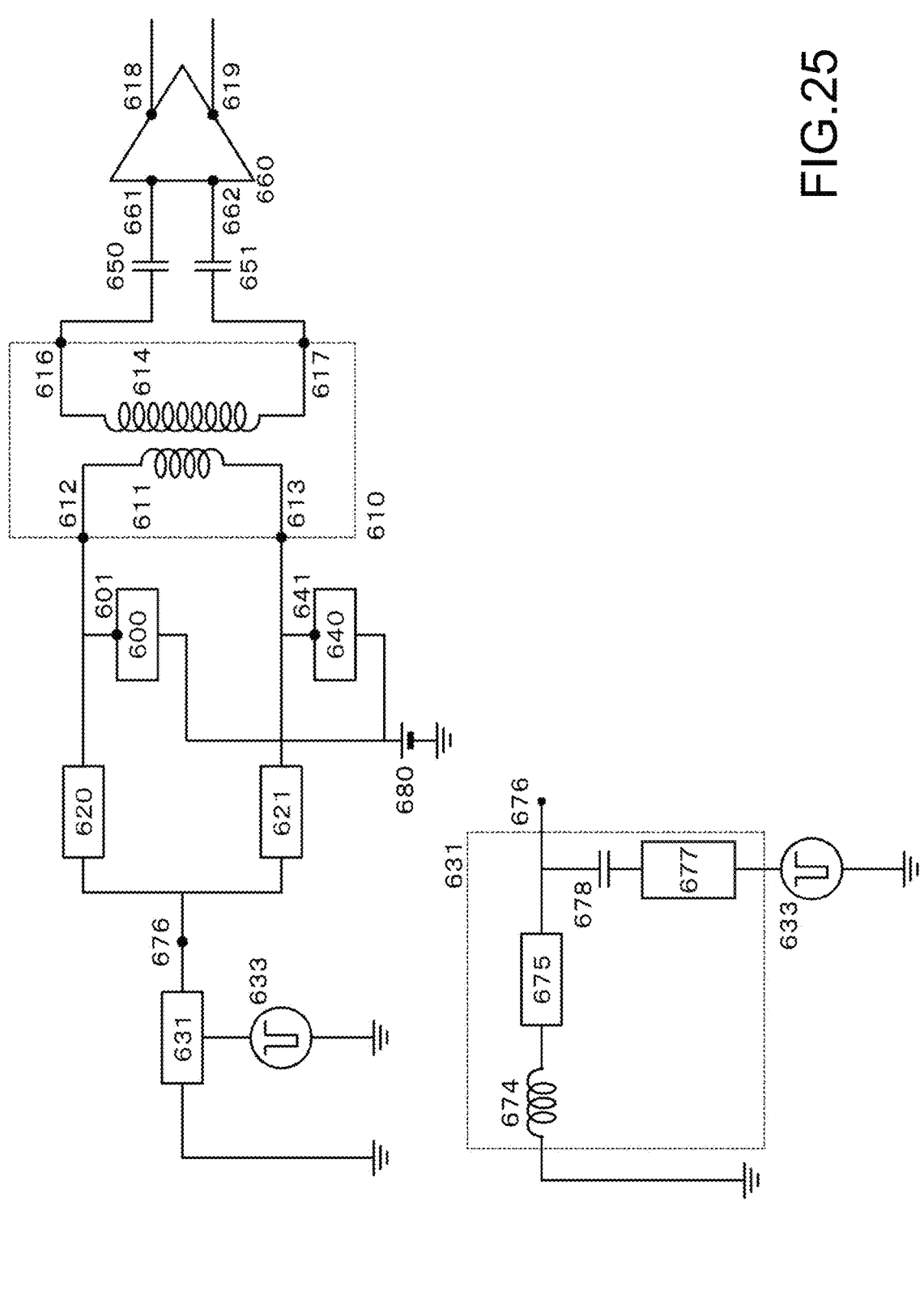
FIG. 25A and FIG. 25B are each a diagram referred to when a plurality of configuration examples of the second light-receiving unit according to the embodiment is described.

Part A of FIG. 25 is a diagram showing another configuration example of the second signal molding unit 116. Part B of FIG. 25 is a diagram showing a detailed configuration example of the bias T in the second signal molding unit 116 shown in Part A of FIG. 25. Part A of FIG. 25 and Part B of FIG. 25 are each a diagram showing another configuration example of the second signal molding unit 116. In a SiPM 600 in the second signal molding unit 116, a quenching resistance and a parasitic capacitance are connected to the same terminal 601 and the quenching resistance is on the anode electrode side. The terminal 601 is connected to a first terminal 612 of a primary-side coil 611 of a balun transformer 610 and is further connected to a bias T631 via a resistance 620. As shown in Part B of FIG. 25, the bias T631 includes an inductor 674 whose one end side is grounded, and the other end side of the inductor 674 is connected to an output terminal 676 via a resistance 675. A modulator circuit 633 includes an operational amplifier and the like. The output of the modulator circuit 633 is connected to the output terminal 676 via a resistance 677 and a capacitor 678. The cathode of the SiPM 600 is connected to a drive power source 680.

A terminal 641 of a replica 640 is connected to a second terminal 613 on the primary side of the balun transformer 610 and is further connected to the bias T631 via a resistance 621. A first terminal 616 of a secondary-side coil 614 of the balun transformer 610 is input to a first terminal 661 of a fully differential amplifier 660 via a capacitor 650. A second terminal 617 of the secondary-side coil 614 is input to a second terminal 662 of the fully differential amplifier 660 via a capacitor 651. The fully differential amplifier 660 includes a third terminal 618 and a fourth terminal 619 and outputs a differential signal. The cathode of the replica 640 is connected to the drive power source 680.

In order to suppress the oscillation of the modulator circuit 633, the resistance 677 of approximately 5 ohms and the resistance 675 of approximately 20 ohms are provided. The output terminal 676 includes the capacitor 678 of approximately 0.01 microfarad. These constants are not limited thereto and are optimized for the system.

The modulation voltage is a square wave with a voltage difference of 5 volts to 7 volts, and the voltage differences from the drive power source is are V1 and V2. As the driving method, the above-mentioned driving method can be applied.

Figure 26:
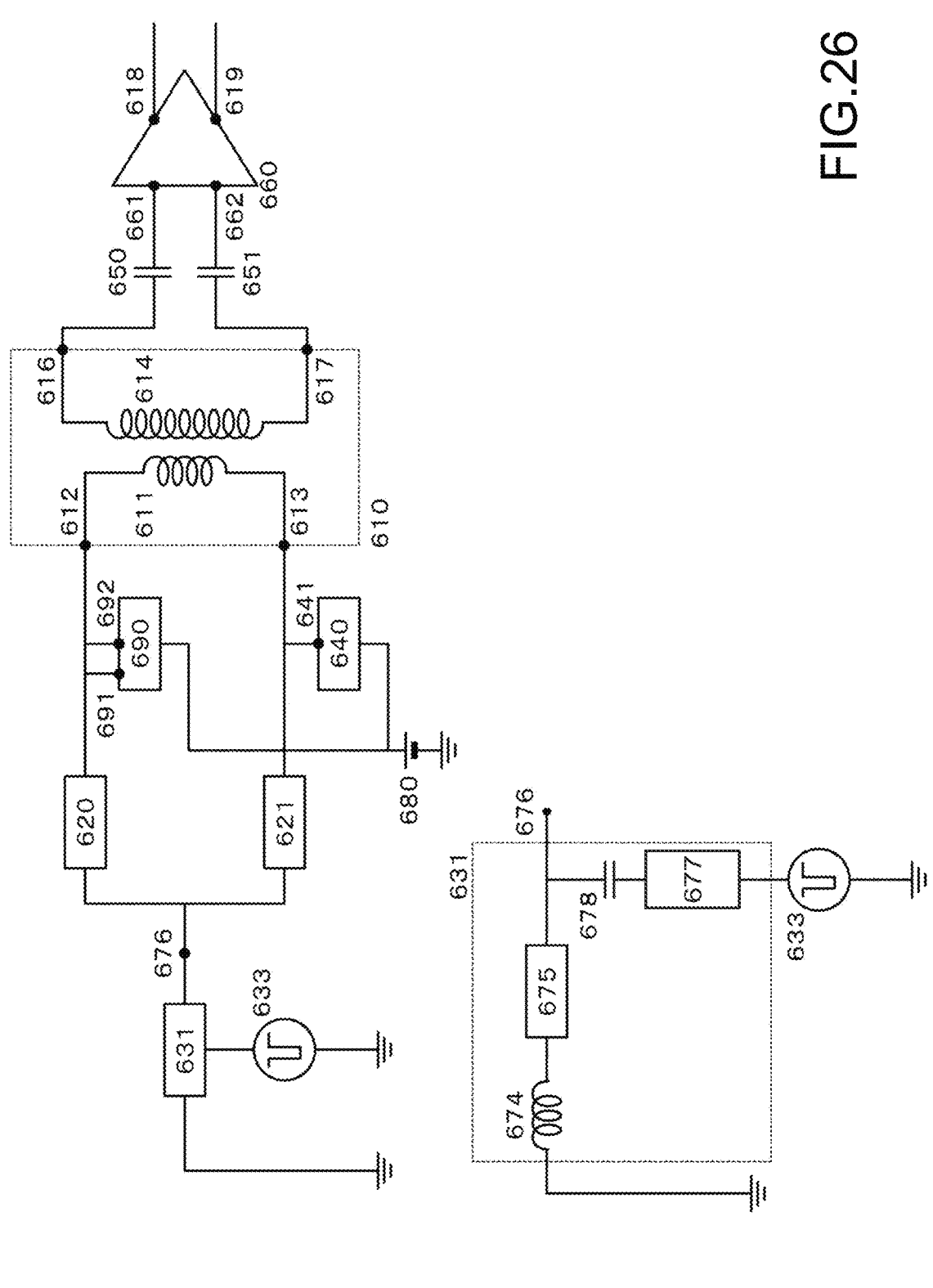
FIG. 26A and FIG. 26B are each a diagram referred to when a plurality of configuration examples of the second light-receiving unit according to the embodiment is described.

Part A of FIG. 26 and Part B of FIG. 26 are each a diagram showing another configuration example of the second signal molding unit 116. The difference from the second signal molding unit 116 shown in Part A of FIG. 25 is that the SiPM 600 is replaced with a SiPM 690 and a quenching resistance and a parasitic capacitance of the SiPM 690 are respectively connected to a terminal 691 and a terminal 692. As for the other configurations and the driving method, configurations and a driving method similar to those of the second signal molding unit 116 shown in FIG. 25 can be applied.

Note that the SiPM 600 and the SiPM 690 may be connected to the negative power source.

Figure 27:
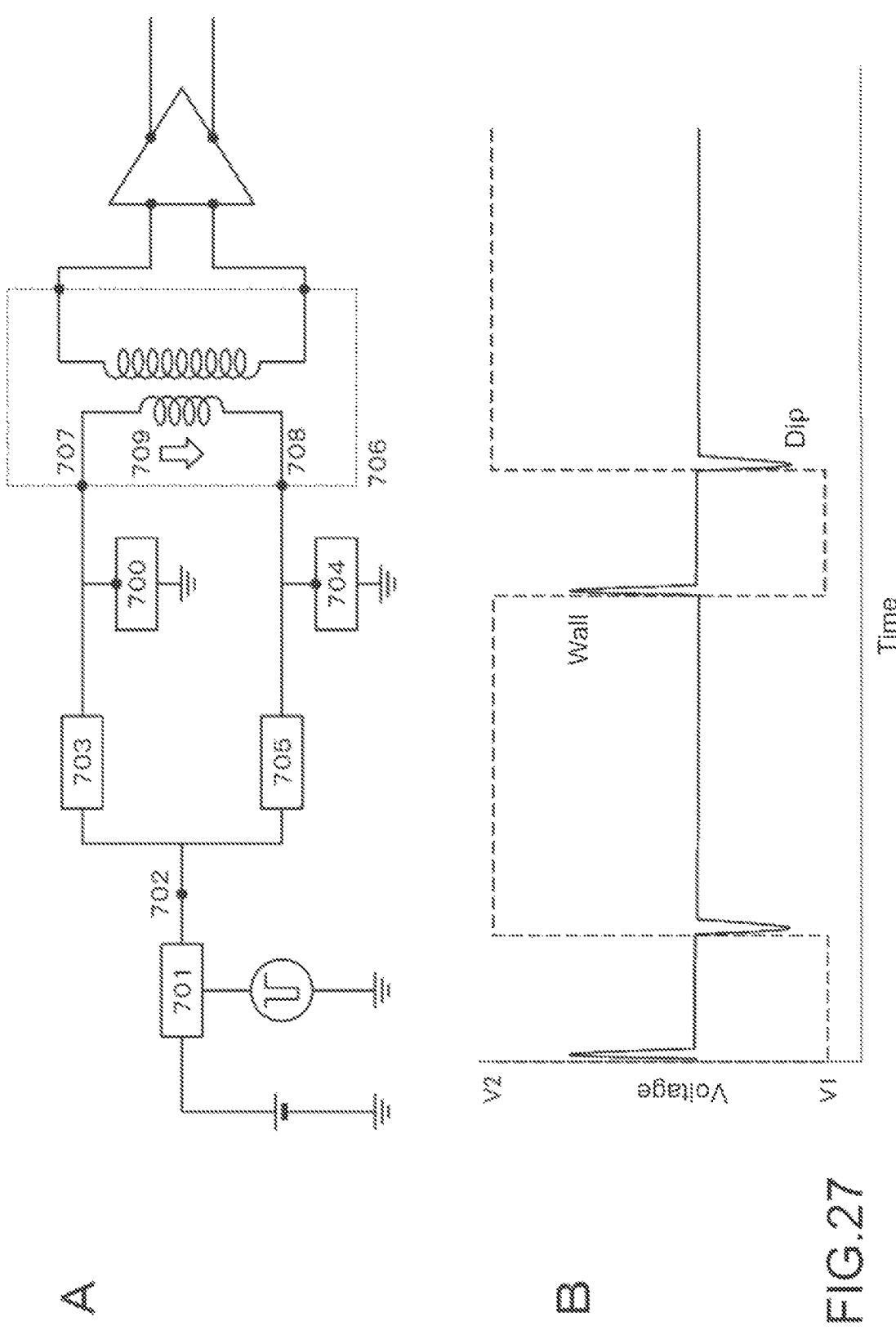
FIG. 27A and FIG. 27B are each a diagram referred to when describing that a dip occurs in a base waveform.

Here, formation of a dip of a base waveform will be described with reference to Part A of FIG. 27 and Part B of FIG. 27. The circuit configuration of the second signal molding unit 116 shown in Part A of FIG. 27 is a configuration similar to the circuit configuration shown in Part A of FIG. 18 (however, the reference symbols have been changed for convenience of description).

Resistance values of a resistance 703 provided between a SiPM 700 and an output terminal 702 of a bias T701 and a resistance 705 provided between a replica 704 and the output terminal 702 of the bias T701 are slightly changed. When the resistance value of the resistance 705 is slightly larger than that of the resistance 703, the phase in a first terminal 707 of a balun transformer 706 of a modulation voltage is slightly faster than that of a second terminal 708. As a result, in the case where the modulation voltage rises, the potential of the first terminal 707 momentarily becomes higher than that of the second terminal 708 and a current 709 flows from the first terminal 707 to the second terminal 708. Since this is in the opposite orientation to the current of the light-receiving signal of the SiPM 700, a dip occurs in the base waveform as shown in Part B of FIG. 27. The orientation of the dip and the orientation of the light-receiving signal of the SiPM are opposed to each other with respect to the baseline.

Alternatively, the parasitic capacitance of the replica 704 may be slightly larger than the parasitic capacitance of the SiPM 700. As a result, the phase in the first terminal 707 of the balun transformer 706 of a modulation voltage is slightly faster than that of the second terminal 708. As a result, in the case where the modulation voltage rises, the potential of the first terminal 707 momentarily becomes higher than that of the second terminal 708 and a current flows from the first terminal 707 to the second terminal 708. Since this is in the opposite orientation to the current of the light-receiving signal of the SiPM 700, a dip occurs in the base waveform.

Figure 28:
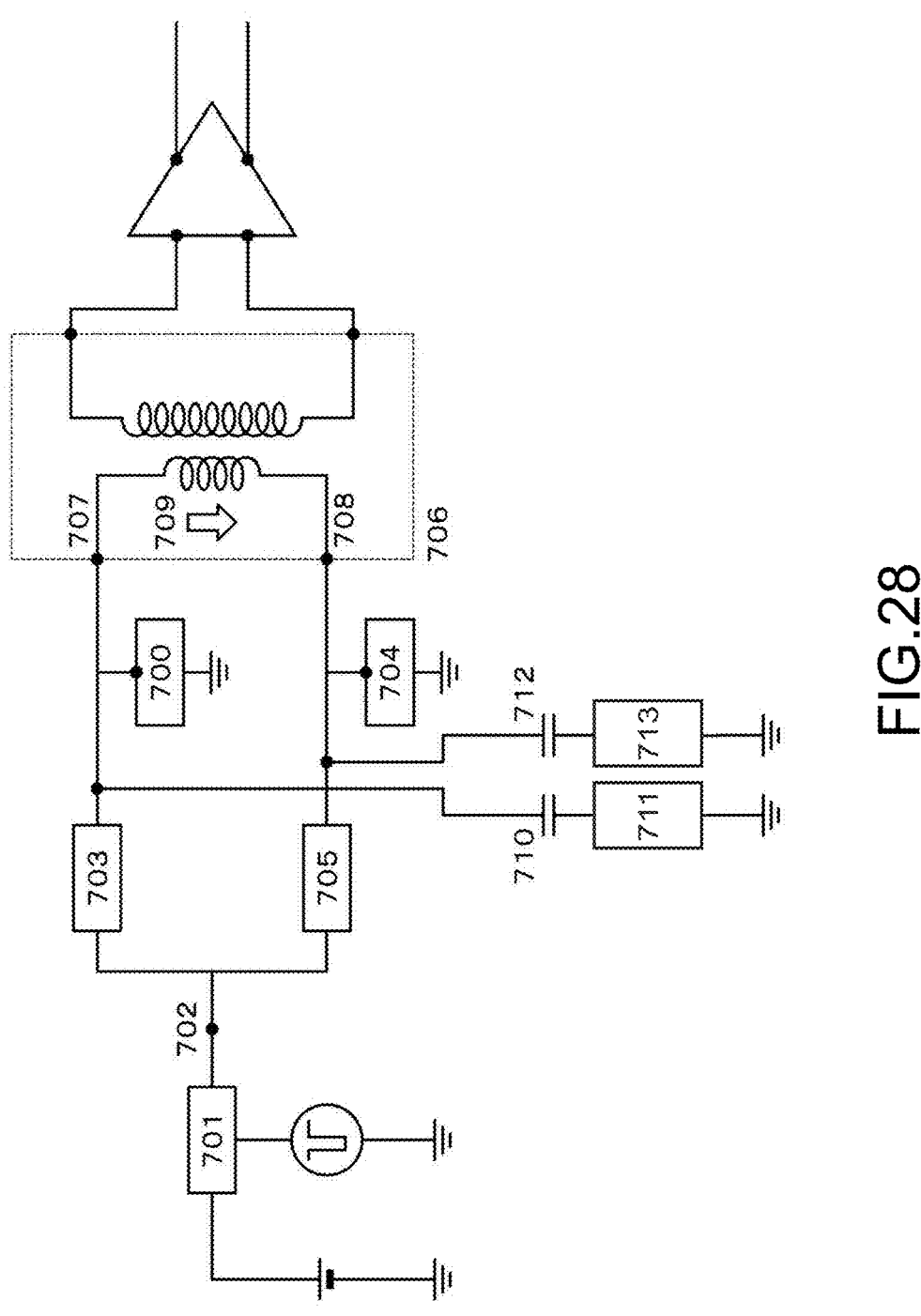
FIG. 28 is a diagram showing an example of a circuit that adjusts the dip.

In this regard, as shown in FIG. 28, for example, a circuit in which a capacitor 710 and a resistance 711 are connected in series and a circuit in which a capacitor 712 and a resistance 713 are connected in series may be added. The circuit in which the capacitor 710 and the resistance 711 are connected in series is connected between the resistance 703 and the first terminal 707. The circuit in which the capacitor 712 and the resistance 713 are connected in series is connected between the resistance 705 and the second terminal 708. By appropriately adjusting these capacitances and resistances, it is possible to adjust the CR time constant and adjust the depth of the dip and the mitigation time.

Note that by changing the circuit constants of the resistance 703, the resistance 705, and the replica 704, the phase in the first terminal 707 of the balun transformer 706 of a modulation voltage can be slightly faster than that of the second terminal 708.

Note that in the case where the modulation voltage drops, a wall occurs in the base waveform (see Part B of FIG. 27). Since the wall is in the same orientation as the current of the light-receiving signal of the SiPM 700, it is detected by TDC in the subsequent stage. However, this timing does not matter because it is outside the measurement region. Further, TDC may be set to inactive, which makes it possible to prevent a wall from being detected.

Next, the effect achieved by forming a dip in a base waveform will be described. As mentioned above, since a dip is formed at the timing when a modulation voltage rose, switching electrical noise associated with emission of pulsed light can be included. In general, since switching between operation/non-operation of the detection system takes several nanoseconds, it cannot be operated immediately before measurement. Therefore, by forming a dip deeper than the switching noise appearing in the signal, the switching noise level becomes equal to or lower than a measurement threshold value and false detection is prevented. In the case where the stray light is strong, it is slightly output in some cases even if the multiplication factor of the SiPM is reduced by the modulator circuit. By forming a dip deeper than the stray light noise, the stray light noise level becomes equal to or lower than the measurement threshold value and false detection is prevented. In the case where the stray light is weak, it does not necessarily need to set the drive voltage to the breakdown voltage or less and the drive voltage may be modulated to be the breakdown voltage or more. Since the timing of the modulation voltage does not change and rises immediately after stray light was generated, by forming a dip deeper than the stray light noise, the straight noise level becomes equal to or lower than the measurement threshold value and false detection is prevented.

Figure 29:
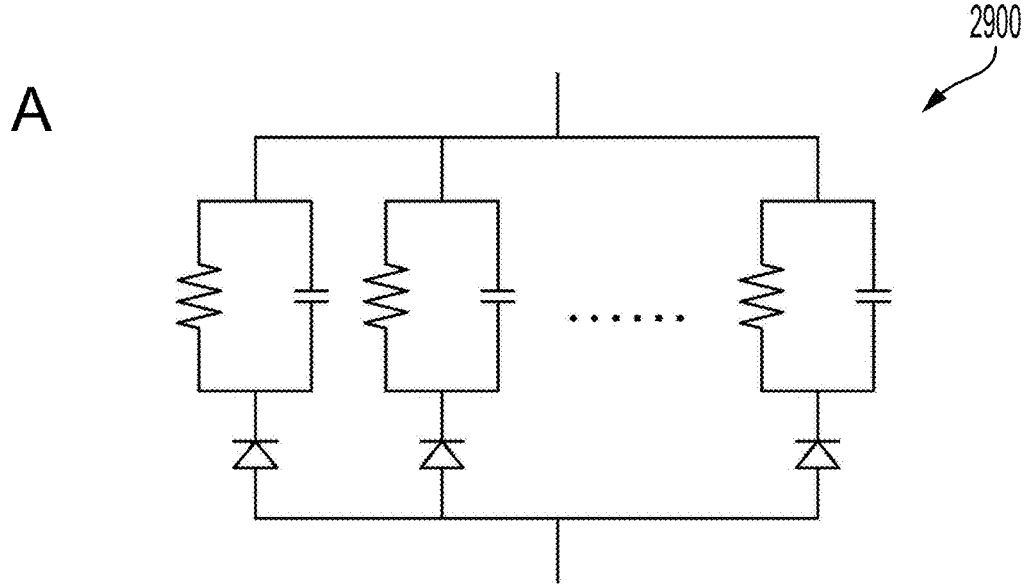
FIG. 29A and FIG. 29B are each a diagram showing a specific circuit configuration example in the case where a quenching resistance and a parasitic capacitance are on an anode side.
Figure 29:
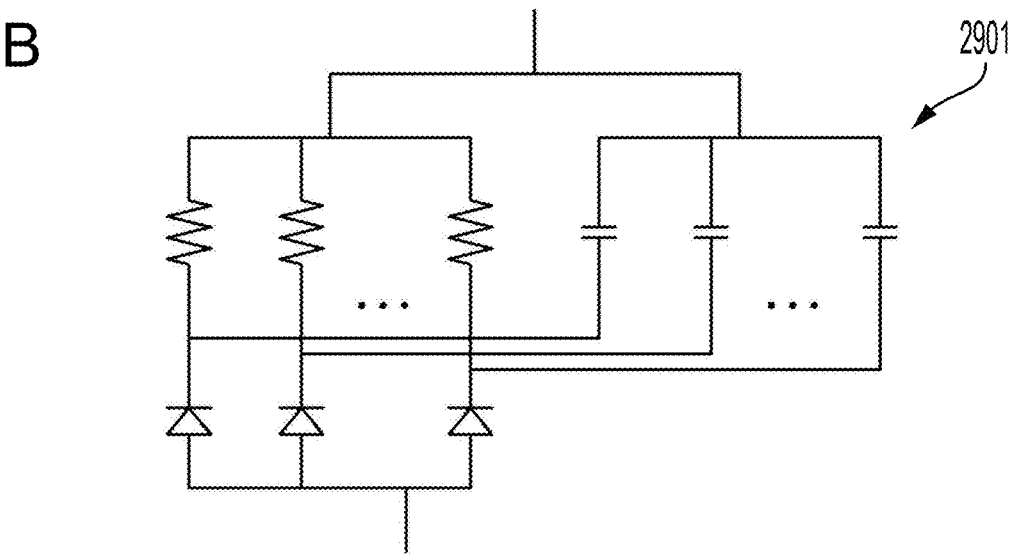
Figure 30:
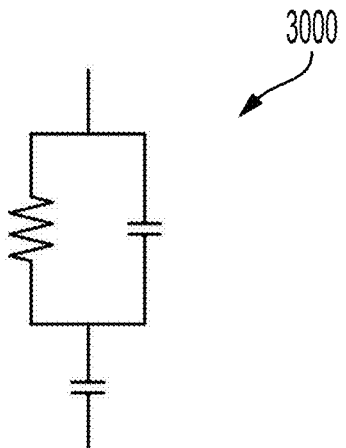
FIG. 30 is a diagram showing the simplest circuit configuration example of a replica.

Note that a specific circuit configuration example in the case where a quenching resistance and a parasitic capacitance are on the anode side in the above-mentioned circuit configuration is shown in Part A, circuit 2900 of FIG. 29 and Part B, circuit 2901 of FIG. 29. Further, the simplest circuit configuration example of a replica is shown in FIG. 30, circuit 3000.

Further, another circuit configuration of the second signal molding unit 116 will be described with reference to FIG. 31 to FIG. 44. Note that in the following description, the difference from the above-mentioned circuit configuration will be mainly described.

Figure 31:
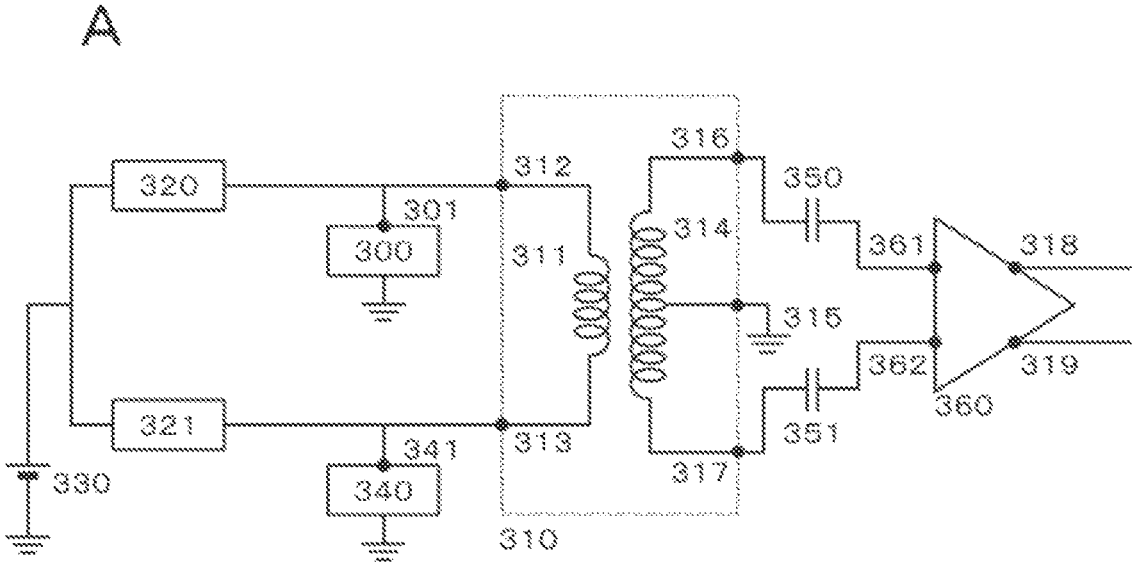
FIG. 31A and FIG. 31B are each a diagram referred to when a plurality of configuration examples of the second light-receiving unit according to the embodiment is described.
Figure 31:
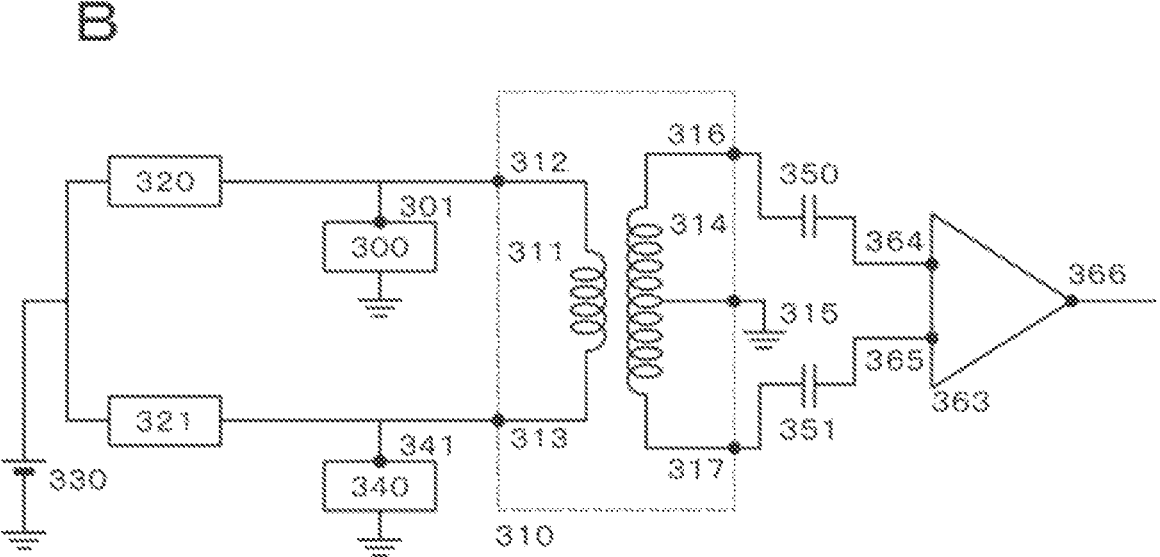

As shown in Part A of FIG. 31, the second signal molding unit 116 may have a configuration obtained by adding a capacitor 350 and a capacitor 351 to the circuit configuration shown in Part A of FIG. 11 and pulling out a center tap 315 from the secondary-side coil 314. The capacitor 350 is provided between the first terminal 316 of the secondary-side coil 314 and the first terminal 361 of the fully differential amplifier 360. The capacitor 351 is provided between the second terminal 317 of the secondary-side coil 314 and the second terminal 362 of the fully differential amplifier 360. Further, as shown in Part B of FIG. 31, the second signal molding unit 116 may have a configuration obtained by adding the capacitor 350 and the capacitor 351 to the circuit configuration shown in Part B of FIG. 11 and pulling out the center tap 315 from the secondary-side coil 314.

Figure 32:
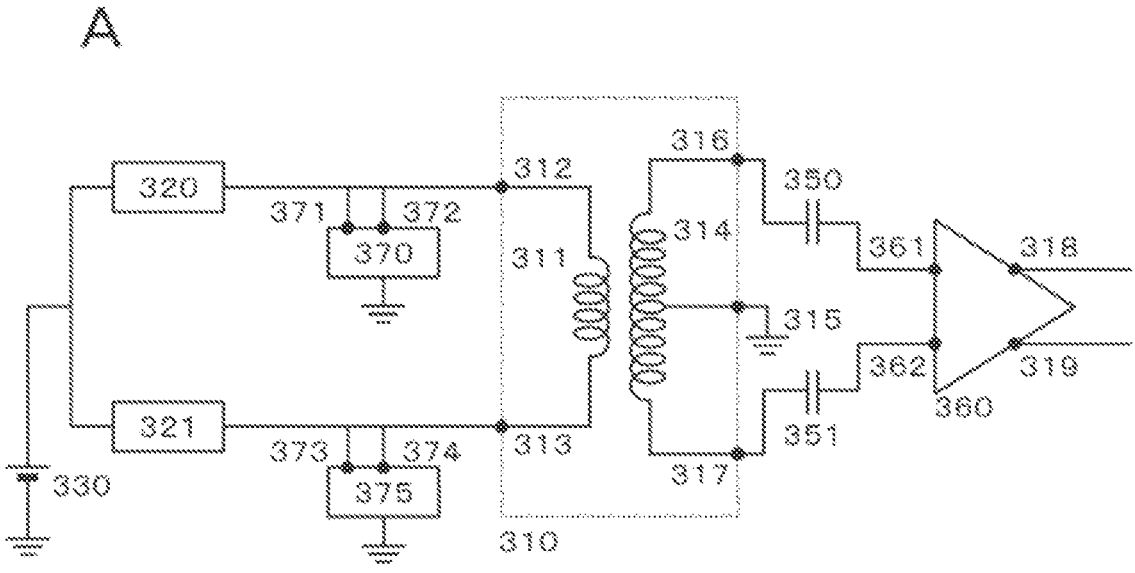
FIG. 32A and FIG. 32B are each a diagram referred to when a plurality of configuration examples of the second light-receiving unit according to the embodiment is described.
Figure 32:
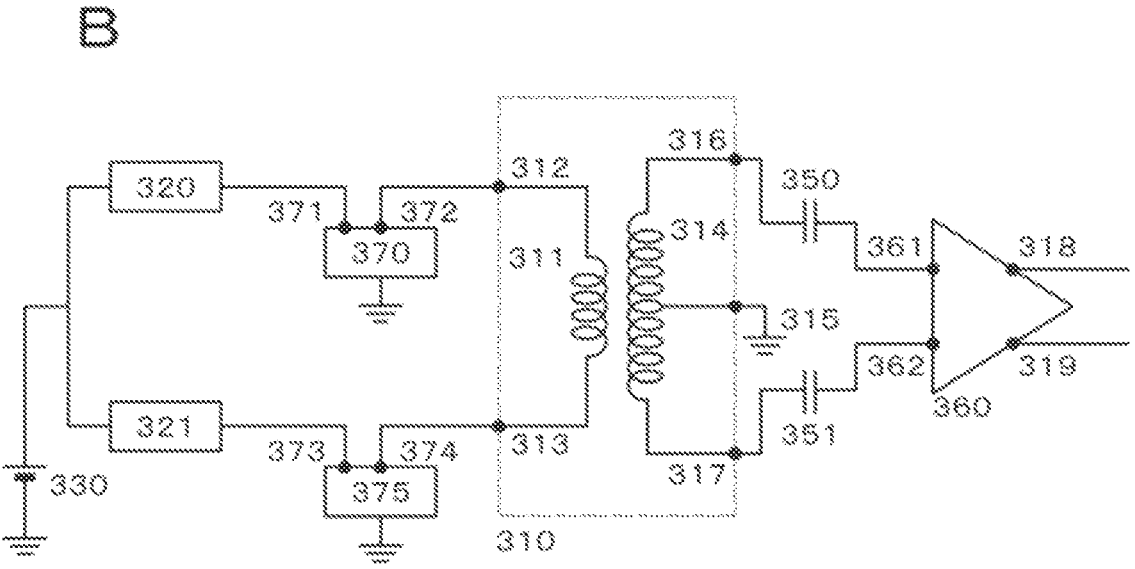

As shown in Part A of FIG. 32, the second signal molding unit 116 may have a configuration obtained by adding the capacitor 350 and the capacitor 351 to the circuit configuration shown in Part A of FIG. 13 and pulling out the center tap 315 from the secondary-side coil 314. Further, as shown in Part B of FIG. 32, the second signal molding unit 116 may have a configuration obtained by adding the capacitor 350 and the capacitor 351 to the circuit configuration shown in Part B of FIG. 13 and pulling out the center tap 315 from the secondary-side coil 314.

Figure 33:
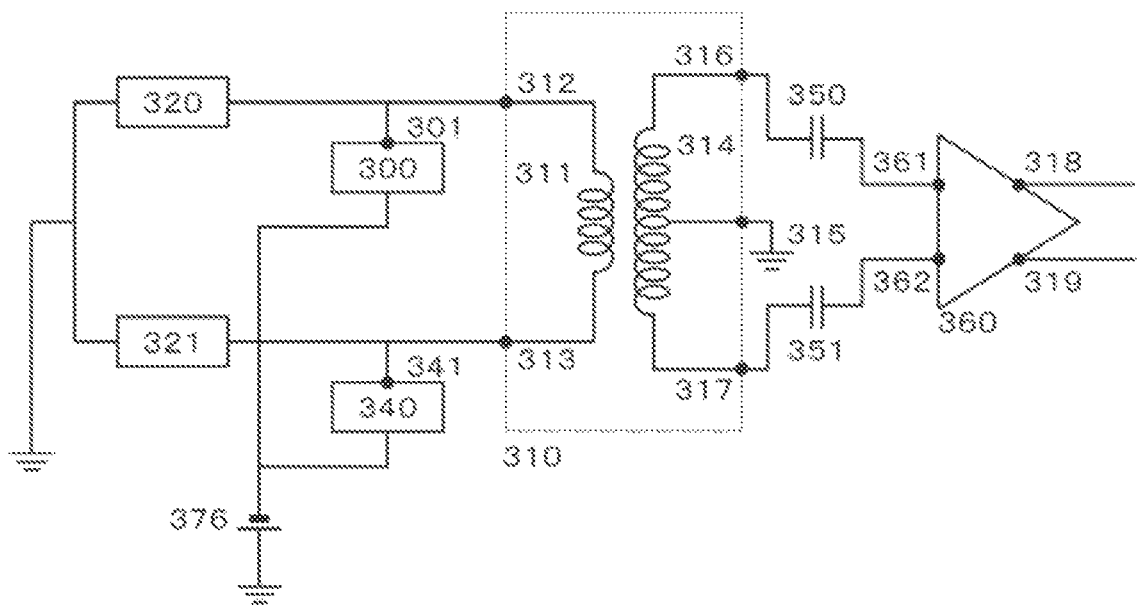
FIG. 33 is a diagram referred to when a plurality of configuration examples of the second light-receiving unit according to the embodiment is described.

As shown in FIG. 33, the second signal molding unit 116 may have a configuration obtained by adding the capacitor 350 and the capacitor 351 to the circuit configuration shown in FIG. 14 and pulling out the center tap 315 from the secondary-side coil 314.

Figure 34:
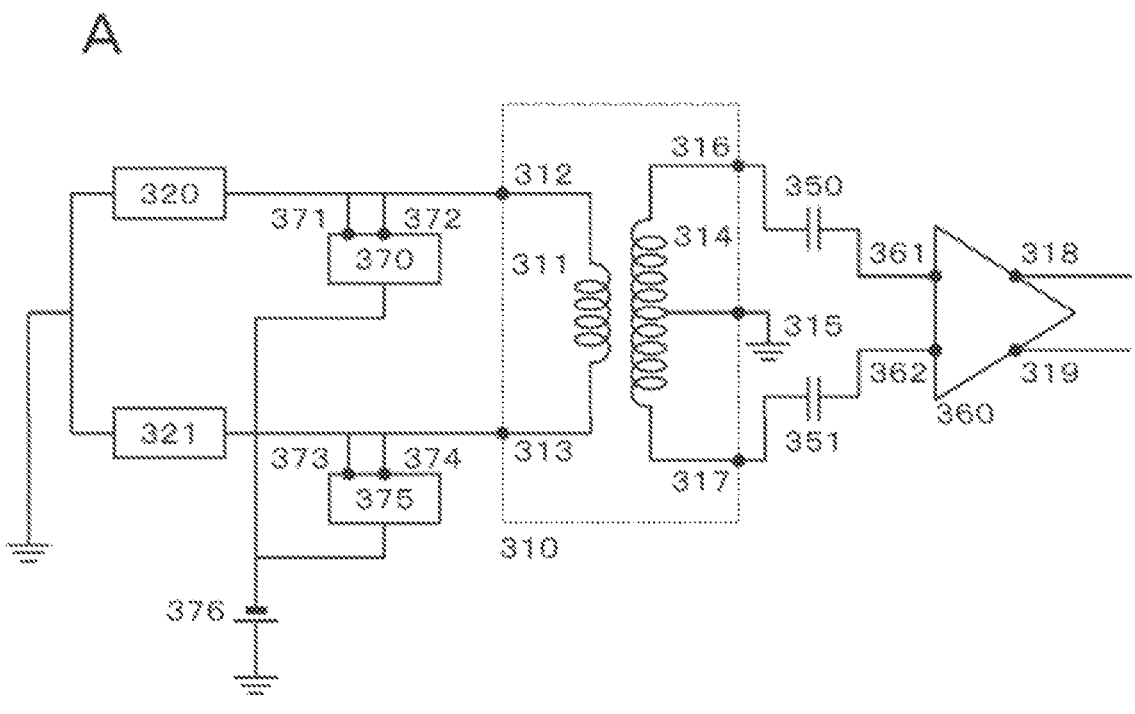
FIG. 34A and FIG. 34B are each a diagram referred to when a plurality of configuration examples of the second light-receiving unit according to the embodiment is described.
Figure 34:
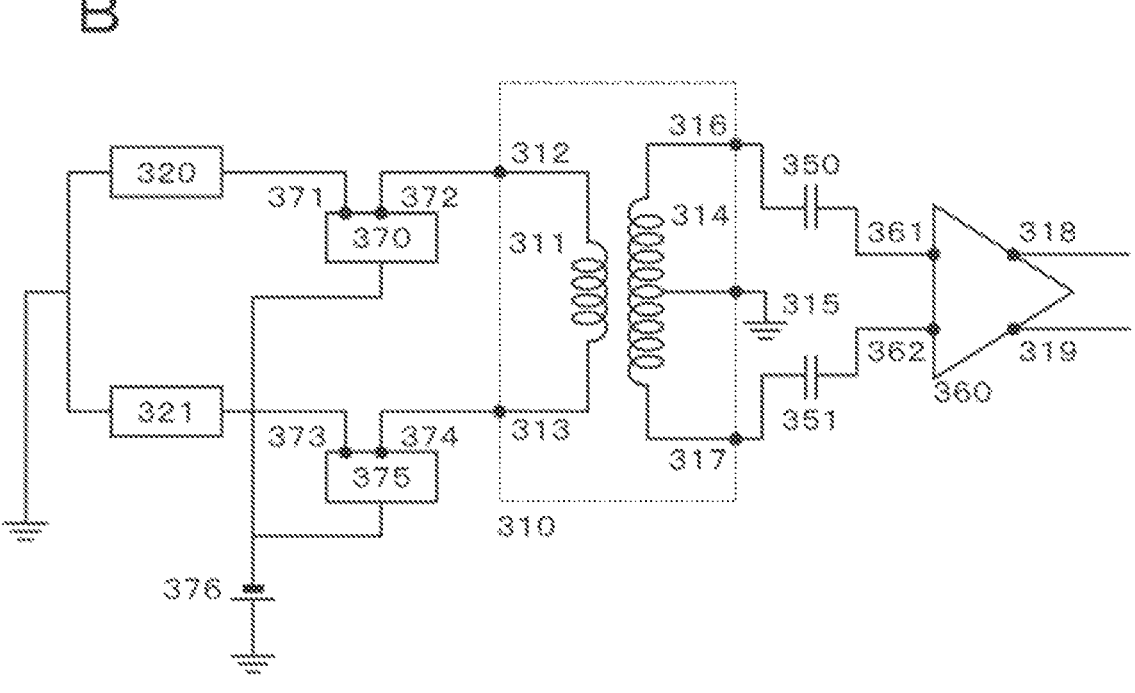

As shown in Part A of FIG. 34, the second signal molding unit 116 may have a configuration obtained by adding the capacitor 350 and the capacitor 351 to the circuit configuration shown in Part A of FIG. 15 and pulling out the center tap 315 from the secondary-side coil 314. Further, as shown in Part B of FIG. 34, the second signal molding unit 116 may have a configuration obtained by adding the capacitor 350 and the capacitor 351 to the circuit configuration shown in Part B of FIG. 15 and pulling out the center tap 315 from the secondary-side coil 314.

Figure 35:
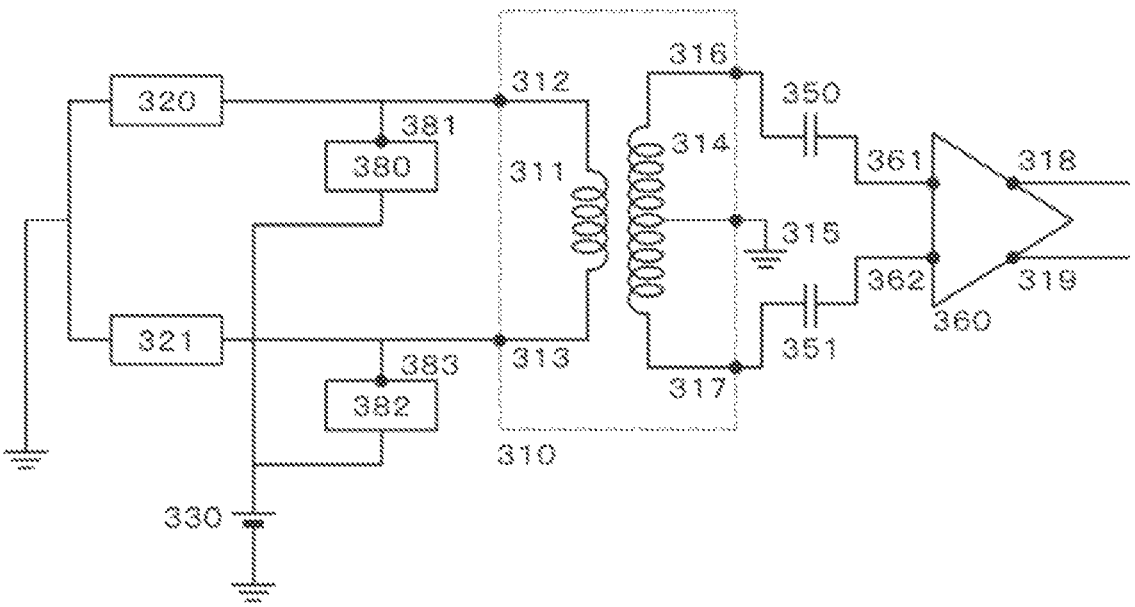
FIG. 35 is a diagram referred to when a plurality of configuration examples of the second light-receiving unit according to the embodiment is described.

As shown in FIG. 35, the second signal molding unit 116 may have a configuration obtained by adding the capacitor 350 and the capacitor 351 to the circuit configuration shown in FIG. 16 and pulling out the center tap 315 from the secondary-side coil 314.

Figure 36:
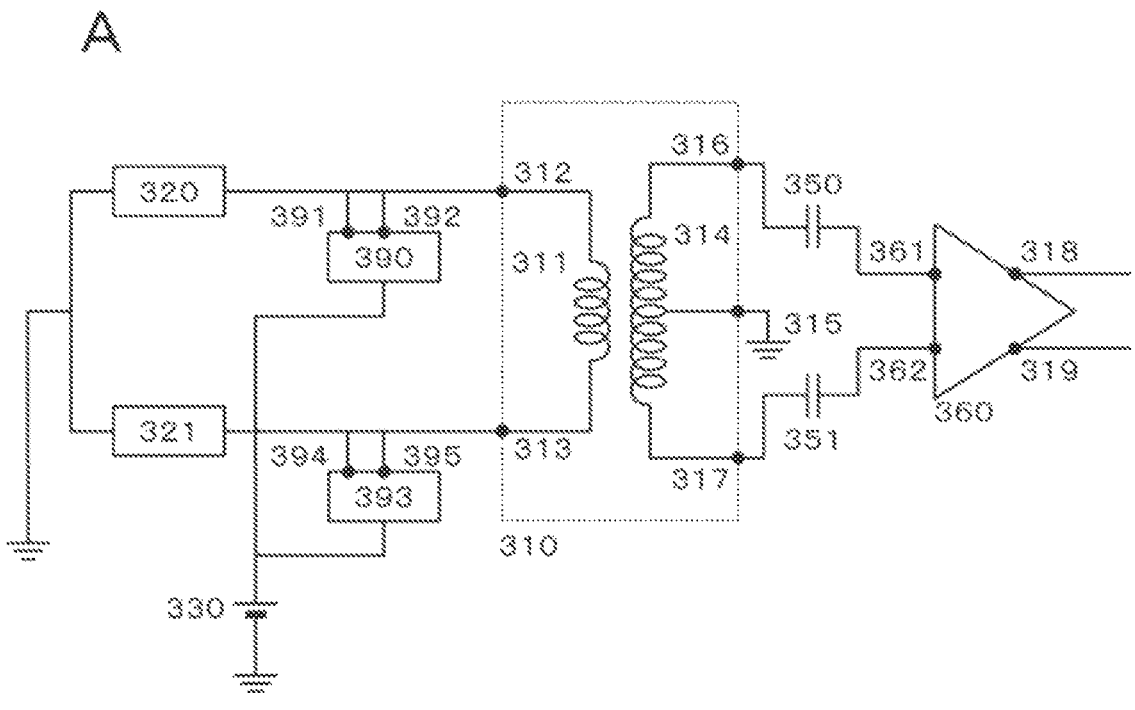
FIG. 36A and FIG. 36B are each a diagram referred to when a plurality of configuration examples of the second light-receiving unit according to the embodiment is described.
Figure 36:
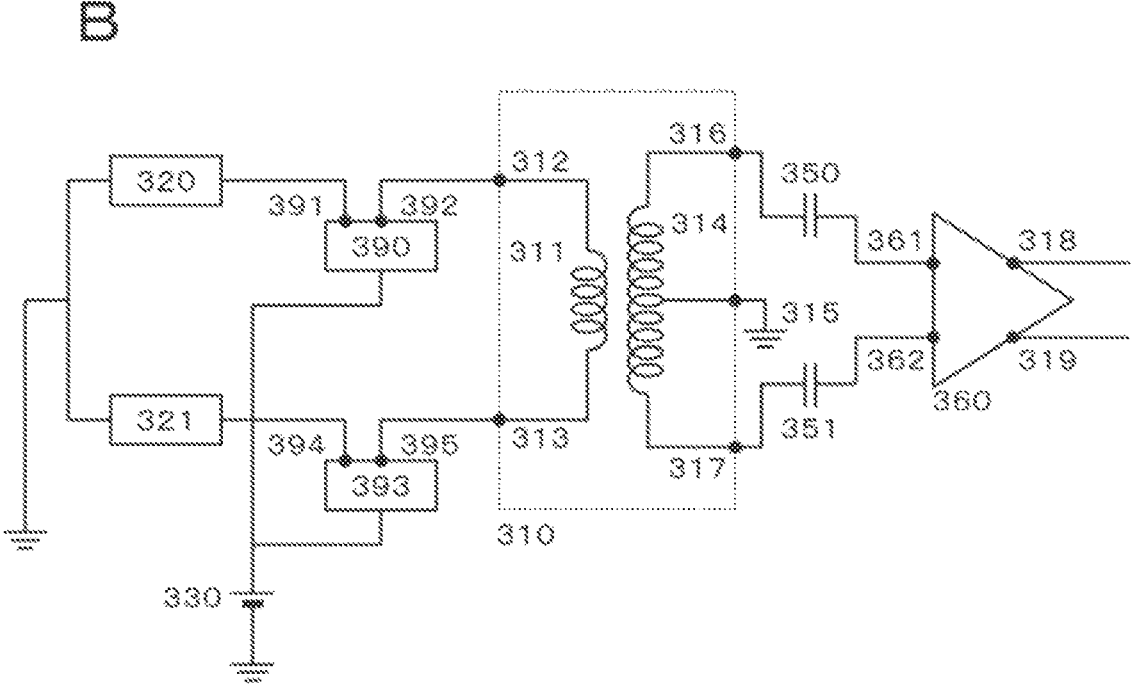

As shown in Part A of FIG. 36, the second signal molding unit 116 may have a configuration obtained by adding the capacitor 350 and the capacitor 351 to the circuit configuration shown in Part A of FIG. 17 and pulling out the center tap 315 of the secondary-side coil 314. Further, as shown in Part B of FIG. 36, the second signal molding unit 116 may have a configuration obtained by adding the capacitor 350 and the capacitor 351 to the circuit configuration shown in Part B of FIG. 17 and pulling out the center tap 315 from the secondary-side coil 314.

Figure 37:
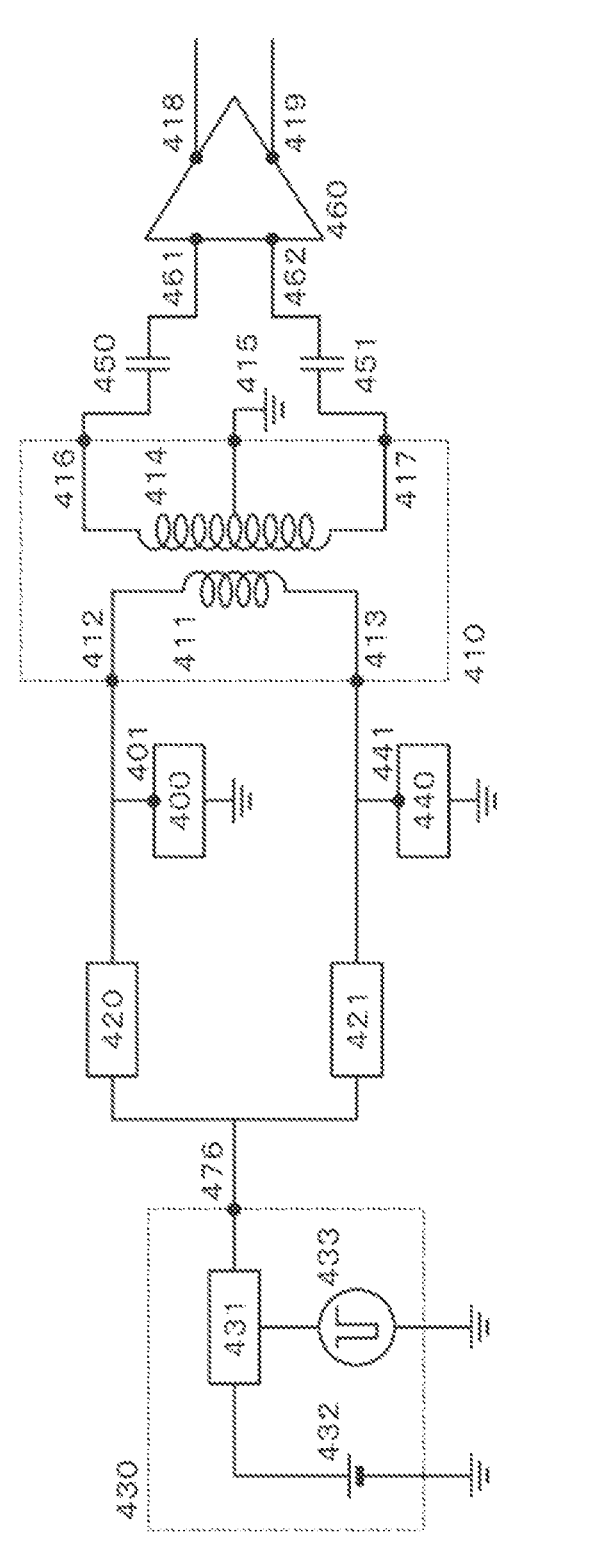
FIG. 37A and FIG. 37B are each a diagram referred to when a plurality of configuration examples of the second light-receiving unit according to the embodiment is described.
Figure 37:
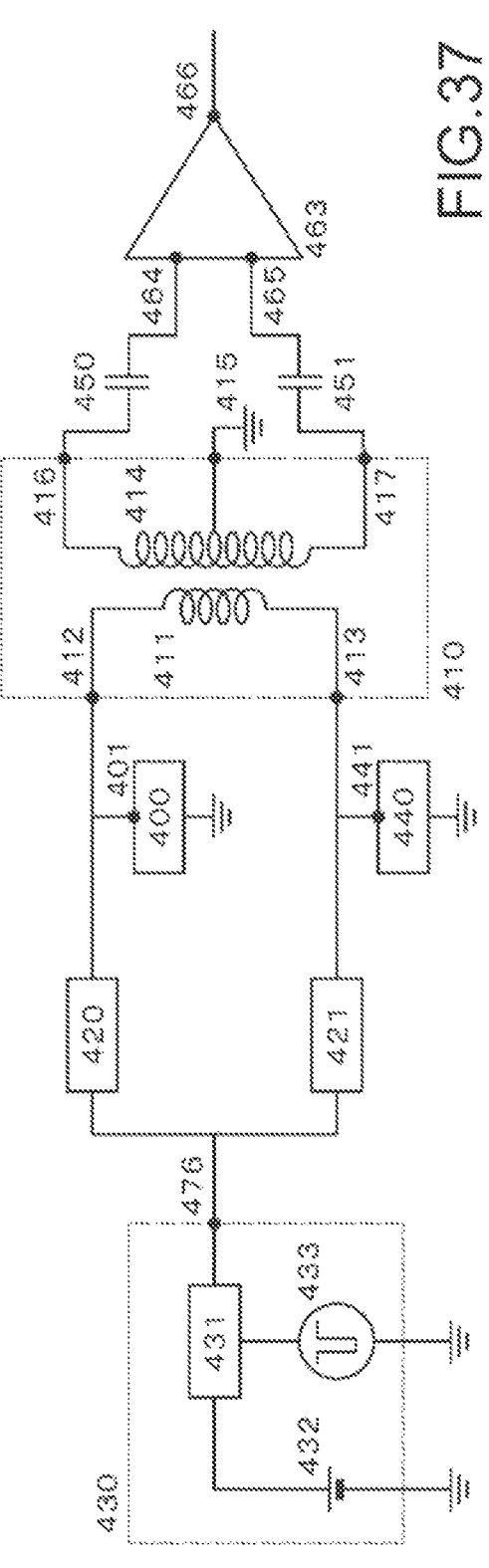

As shown in Part A of FIG. 37, the second signal molding unit 116 may have a configuration obtained by adding a capacitor 450 and a capacitor 451 to the circuit configuration shown in Part A of FIG. 18 and pulling out a center tap 415 from the secondary-side coil 414. The capacitor 450 is provided between the first terminal 416 of the secondary-side coil 414 and the first terminal 461 of the fully differential amplifier 460. The capacitor 451 is provided between the second terminal 417 of the secondary-side coil 414 and the second terminal 462 of the fully differential amplifier 460. Further, as shown in Part B of FIG. 37, the second signal molding unit 116 may have a configuration obtained by adding the capacitor 450 and the capacitor 451 to the circuit configuration shown in Part B of FIG. 18 and pulling out the center tap 415 from the secondary-side coil 414.

Figure 38:
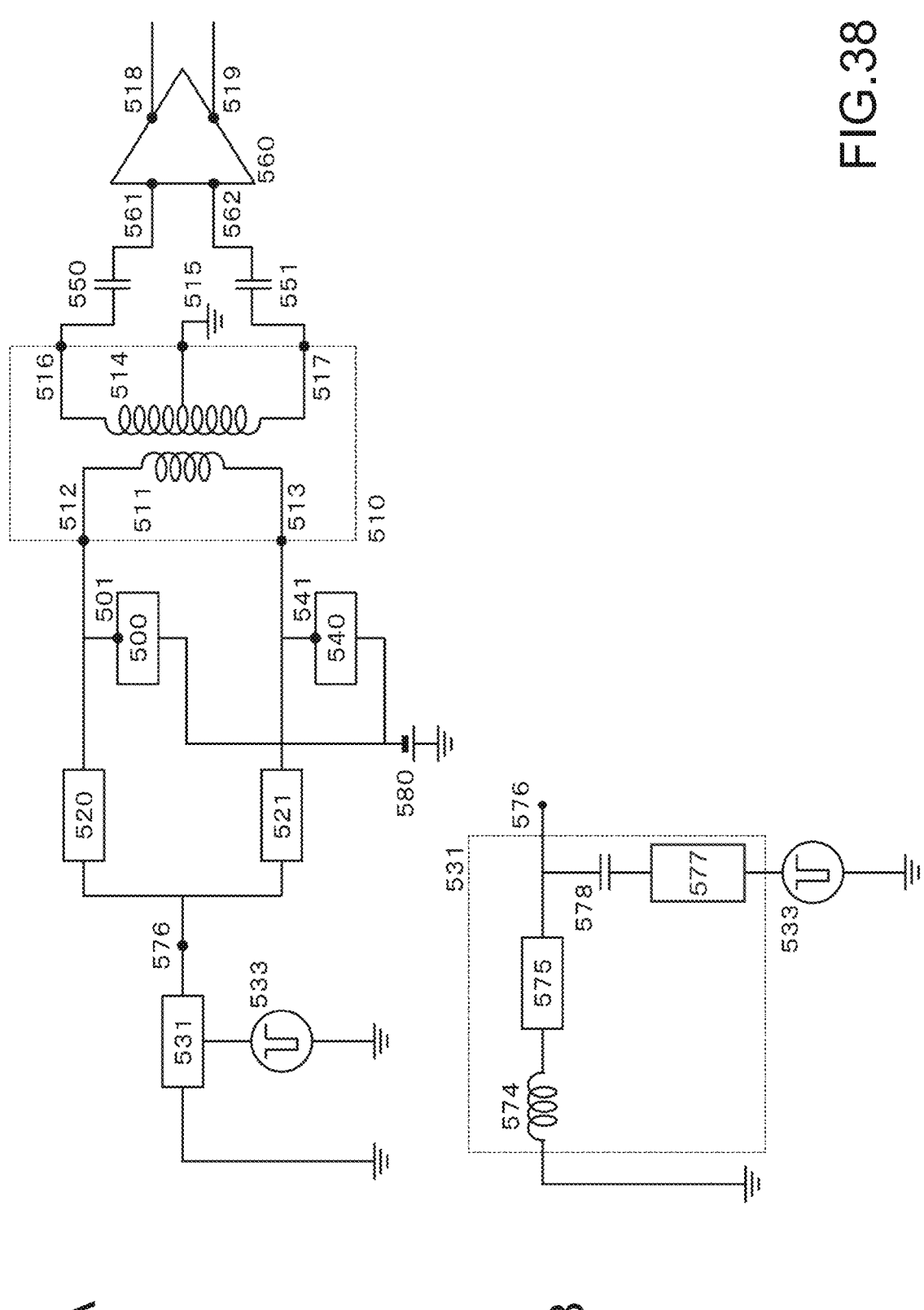
FIG. 38A and FIG. 38B are each a diagram referred to when a plurality of configuration examples of the second light-receiving unit according to the embodiment is described.

As shown in Part A of FIG. 38, the second signal molding unit 116 may have a configuration obtained by adding a capacitor 550 and a capacitor 551 to the circuit configuration shown in Part A of FIG. 22 and pulling out a center tap 515 from the secondary-side coil 514. The capacitor 550 is provided between the first terminal 516 of the secondary-side coil 514 and the first terminal 561 of the fully differential amplifier 560. The capacitor 551 is provided between the second terminal 517 of the secondary-side coil 514 and the second terminal 562 of the fully differential amplifier 560. Note that the configuration of Part B of FIG. 38 is the same configuration as that of Part B of FIG. 22.

Figure 39:
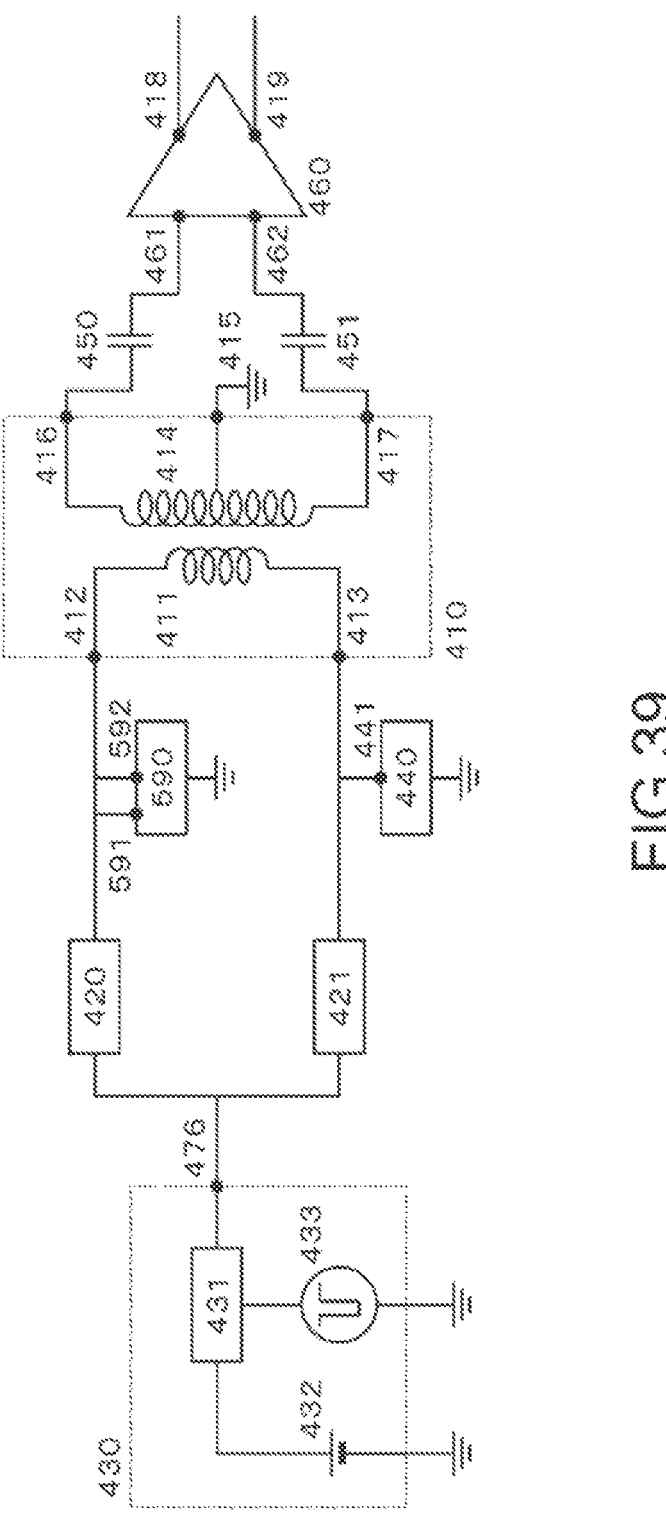
FIG. 39 is a diagram referred to when a plurality of configuration examples of the second light-receiving unit according to the embodiment is described.

As shown in FIG. 39, the second signal molding unit 116 may have a configuration obtained by adding the capacitor 450 and the capacitor 451 to the circuit configuration shown in FIG. 23 and pulling out the center tap 415 from the secondary-side coil 414.

Figure 40:
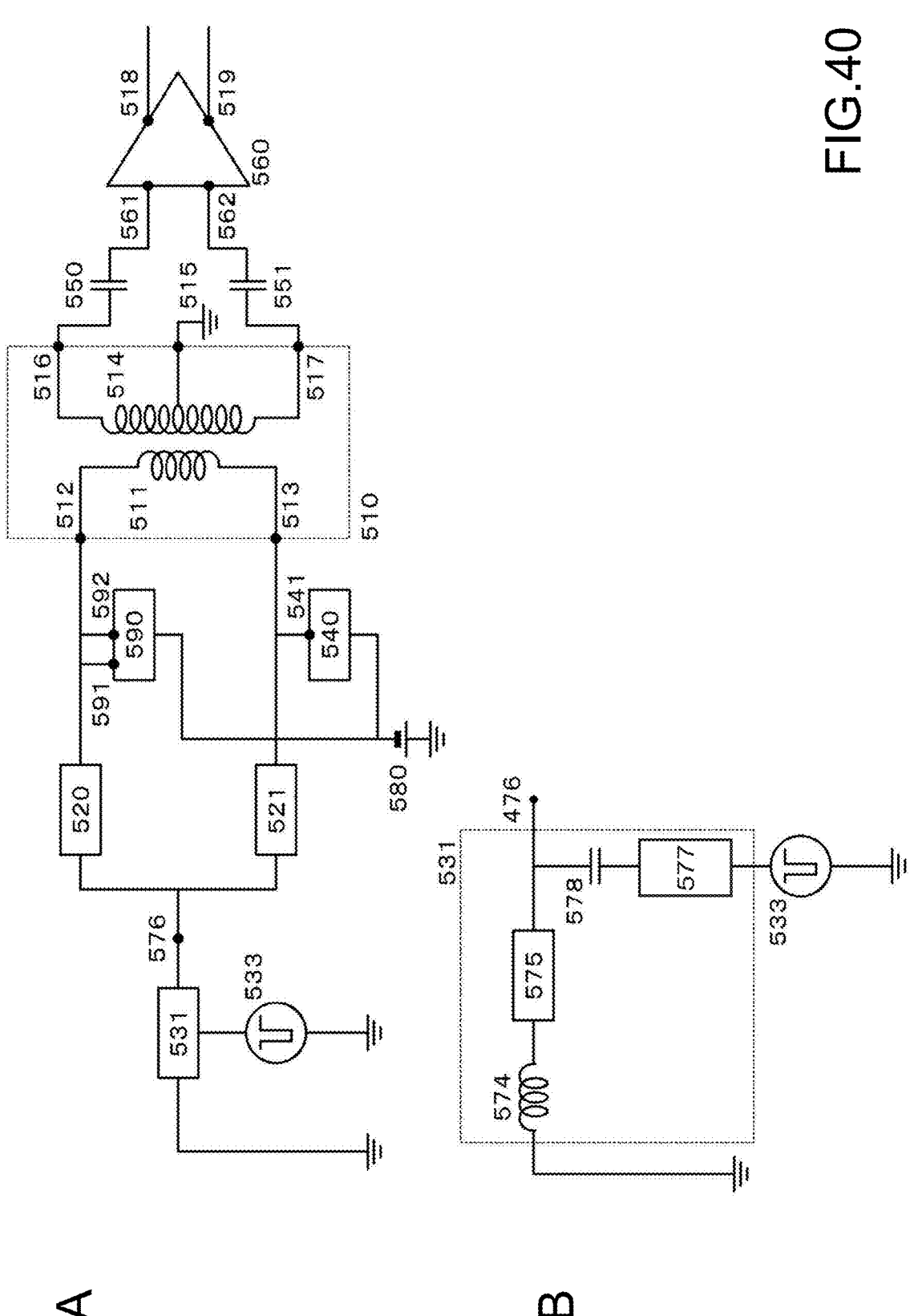
FIG. 40A and FIG. 40B are each a diagram referred to when a plurality of configuration examples of the second light-receiving unit according to the embodiment is described.

As shown in Part A of FIG. 40, the second signal molding unit 116 may have a configuration obtained by adding the capacitor 550 and the capacitor 551 to the circuit configuration shown in Part A of FIG. 24 and pulling out the center tap 515 from the secondary-side coil 514. Note that the configuration of Part B of FIG. 40 is the same configuration as that of Part B of FIG. 24.

Figure 41:
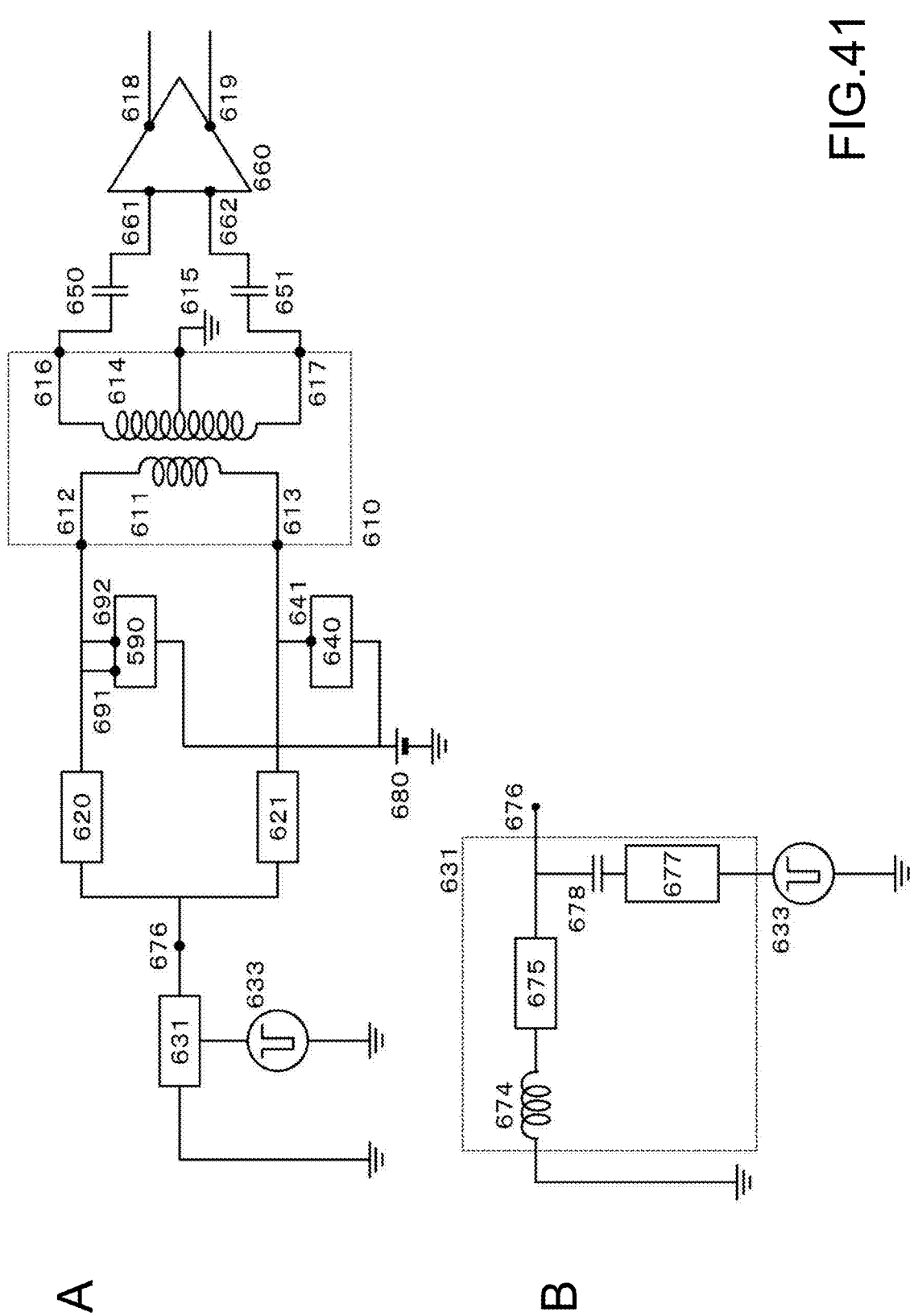
FIG. 41A and FIG. 41B are each a diagram referred to when a plurality of configuration examples of the second light-receiving unit according to the embodiment is described.

As shown in Part A of FIG. 41, the second signal molding unit 116 may have a configuration obtained by adding the capacitor 650 and the capacitor 651 to the circuit configuration shown in Part A of FIG. 25 and pulling out a center tap 615 from the secondary-side coil 614. The capacitor 650 is provided between the first terminal 616 of the secondary-side coil 614 and the first terminal 661 of the fully differential amplifier 660. The capacitor 651 is provided between the second terminal 617 of the secondary-side coil 614 and the second terminal 662 of the fully differential amplifier 660. Note that the configuration of Part B of FIG. 41 is the same configuration as that of Part B of FIG. 25.

Figure 42:
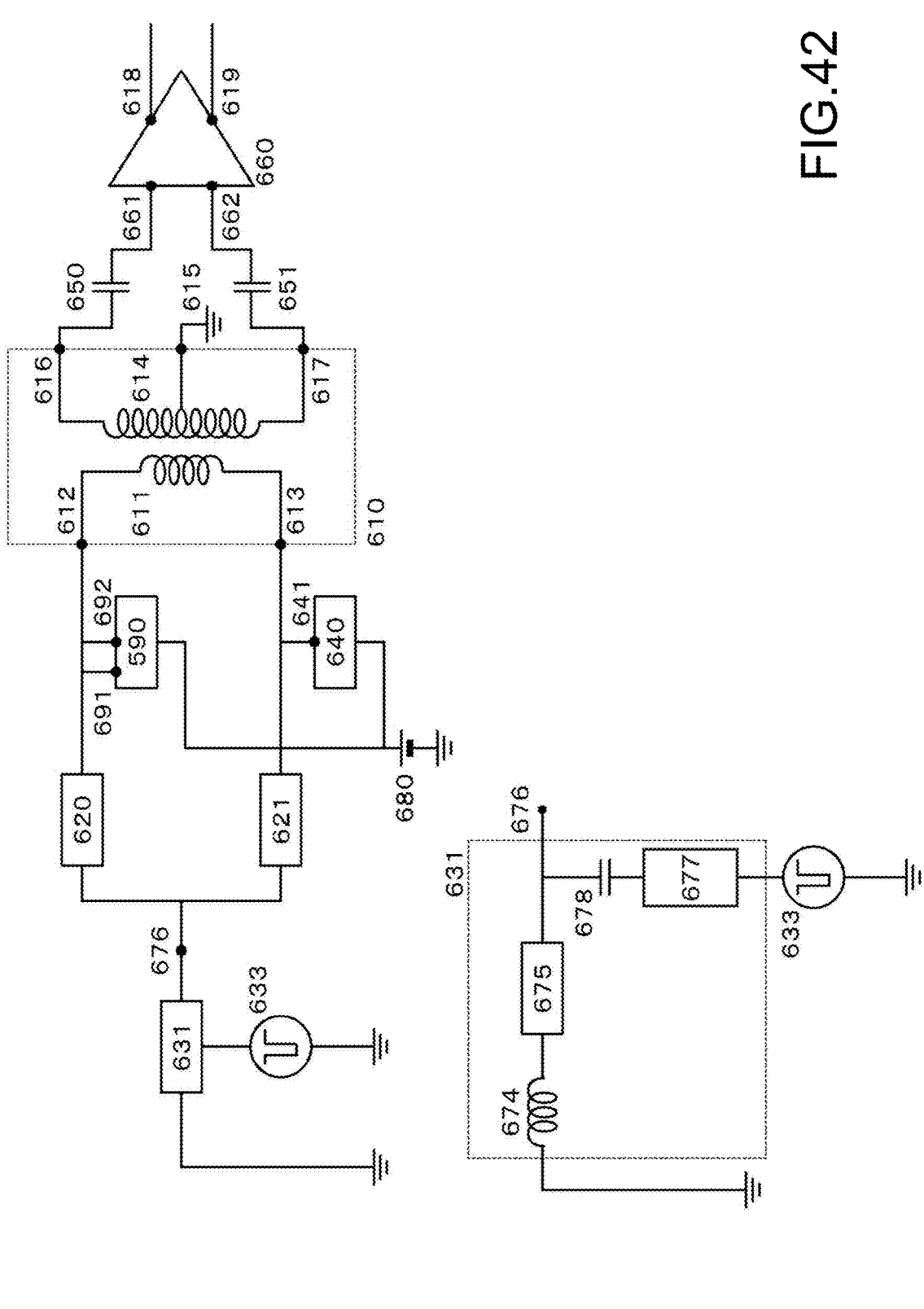
FIG. 42A and FIG. 42B are each a diagram referred to when a plurality of configuration examples of the second light-receiving unit according to the embodiment is described.

As shown Part A of FIG. 42, the second signal molding unit 116 may have a configuration obtained by adding the capacitor 650 and the capacitor 651 to the circuit configuration shown in Part A of FIG. 26 and pulling out the center tap 615 from the secondary-side coil 614. Note that the configuration of Part B of FIG. 42 is the same configuration as that of Part B of FIG. 26.

Figure 43:
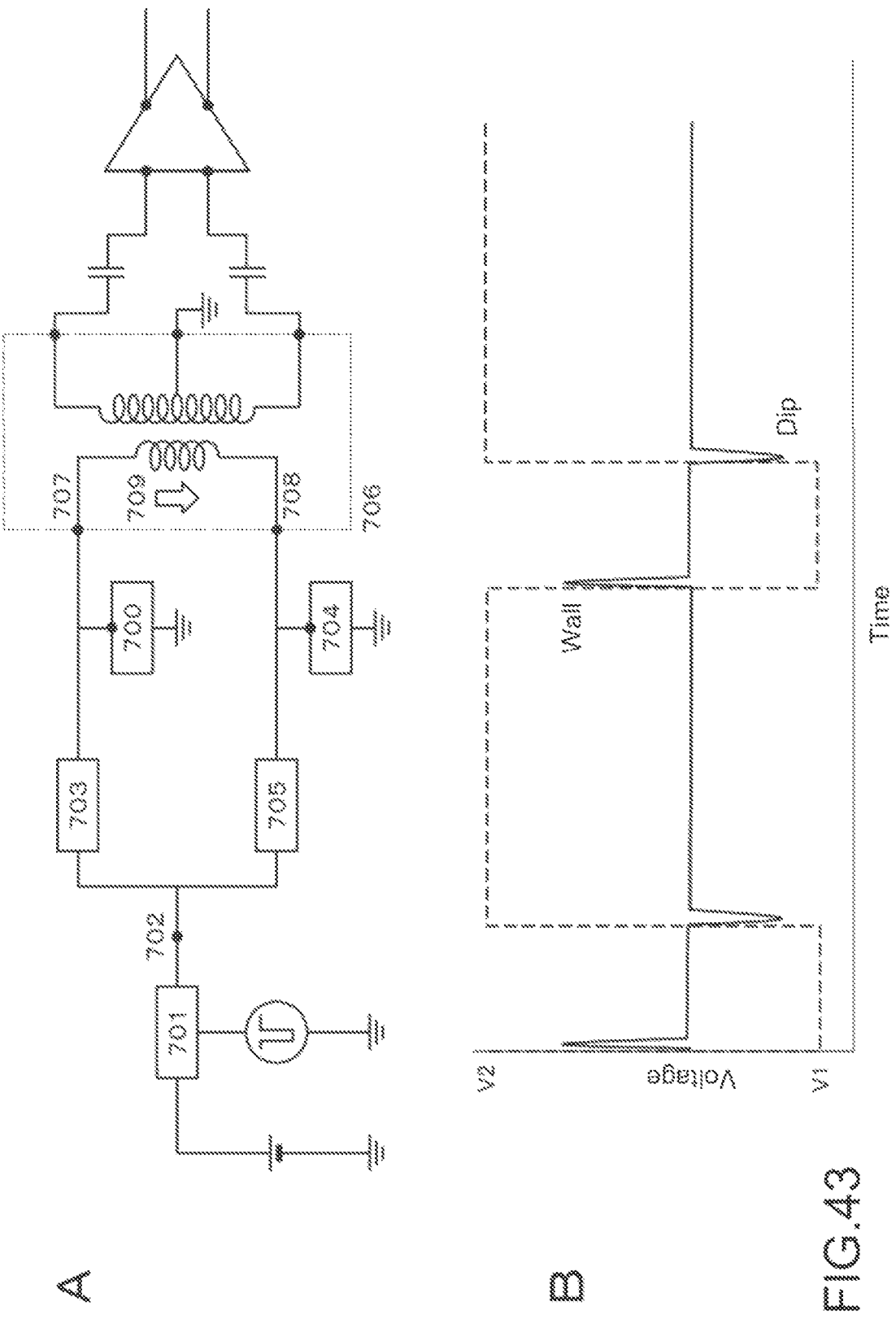
FIG. 43A and FIG. 43B are each a diagram referred to when a plurality of configuration examples of the second light-receiving unit according to the embodiment is described.

As shown in Part A of FIG. 43, the circuit configuration shown in Part A of FIG. 27 may be a configuration obtained by adding a capacitor on the secondary side similarly to FIG.

31 and the like and pulling out a center tap from the secondary-side transformer. Note that the content illustrated in Part B of FIG. 43 is the same as that in Part B of FIG. 27.

Figure 44:
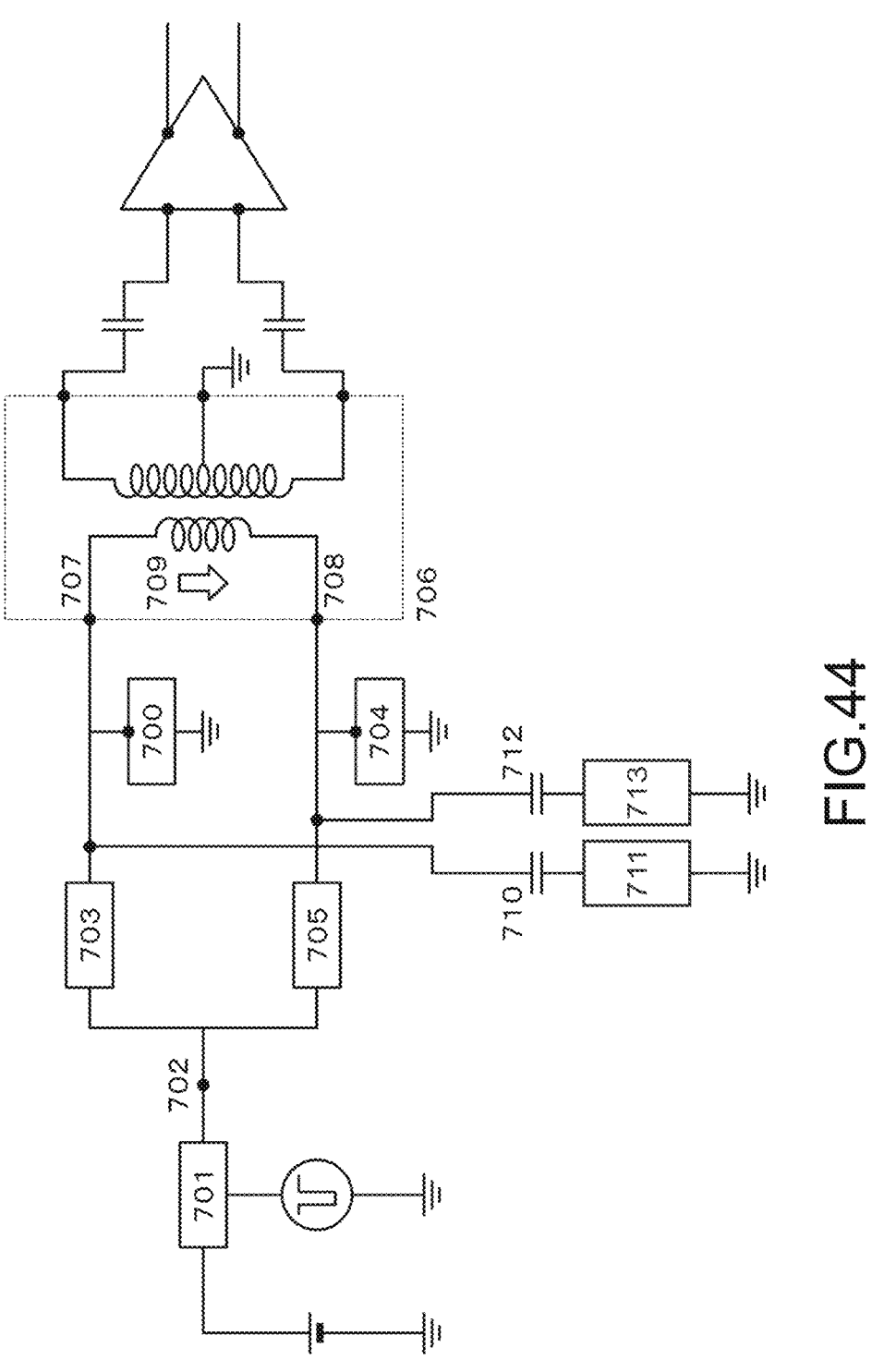
FIG. 44 is a diagram referred to when a plurality of configuration examples of the second light-receiving unit according to the embodiment is described.

As shown in FIG. 44, the circuit configuration shown in FIG. 28 may be a configuration obtained by adding a capacitor on the secondary side similarly to FIG. 31 and the like and pulling out a center tap from the secondary-side transformer.

<Modified example>

Although an embodiment of the present disclosure has been specifically described above, the content of the present disclosure is not limited to the above-mentioned embodiment, and various modifications based on the technical idea of the present disclosure can be made. Hereinafter, a modified example will be described.

The present disclosure may also be realized by an apparatus, a method, a program, a system, or the like. The configuration, numerical value, connection mode, and circuit element described in one embodiment can be appropriately modified without departing from the essence of the present disclosure. Further, the items described in the respective embodiments and modified examples can be combined as appropriate.

The effects described herein are not necessarily limited and may be any of the effects described in the present disclosure. Further, the content of the present disclosure is not construed as being limited due to the illustrated effects.

The present disclosure may also take the following configurations.

(1) A Q-switched semiconductor light-emitting element, including:

a comb electrode that has at least two or more gain regions and two or more absorption regions, the regions including an active layer and being continuous on a semiconductor substrate, separation regions being provided between the gain regions and the absorption regions, the longest region of the gain regions being located on a rear end surface side; and an optical waveguide that staddles the gain regions, the absorption regions, and the separation regions.

(2) The Q-switched semiconductor light-emitting element according to (1), in which the gain regions, the separation regions, and the absorption regions on a surface layer side of the active layer on the semiconductor substrate has a PNP structure.

(3) The Q-switched semiconductor light-emitting element according to (2), further including:

a cathode electrode provided on a back surface of the semiconductor substrate;

a first anode electrode provided in the gain regions; and a second anode electrode provided in the absorption regions, in which a switching element such as an NMOS is provided between the cathode electrode and a ground, the second anode electrode is connected to a delay circuit, an output side of the delay circuit is branched and connected to a capacitor a matching resistance, the capacitor is grounded, and the matching resistance is connected to a constant-voltage source or grounded.

(4) The Q-switched semiconductor light-emitting element according to (2), in which a damping resistance and a capacitor are provided in series between the cathode electrode and the second anode electrode in order from a side of the cathode electrode.

(5) A distance measuring device, including:

the Q-switched semiconductor light-emitting element according to any one of (1) to (4).

(6) A distance measuring device, including:

an optical part that has an optically-polished non-coated plane disposed on an object that is transparent to a wavelength of a light source, has a structure in which light enters the plane from inside the object at an angle larger than a Brewster's angle with P polarization, refracted measurement light is applied to an object to be measured outside a casing, and detection light that is part of light scattered from the object to be measured is reflected on the plane in an orientation opposite to an optical path of the measurement light and enters a light-receiving element, and includes, vertically above reflected light of the light that has entered the plane from inside the object at an angle larger than the Brewster's angle with P polarization, no portion that introduces the light into the object.

(7) The distance measuring device according to (6), further including a mechanism that absorbs reflected light of the light that has entered the plane from inside the object at an angle larger than the Brewster's angle with P polarization.

(8) A distance measuring device, including:

a light-receiving circuit in which one end of a primary-side coil of a balun transformer is connected to a light-receiving element and the other end is connected to a replica of the light-receiving element.

(9) The distance measuring device according to (8), in which the light-receiving element and the replica are connected to a power source or grounded, combined impedance of the balun transformer seen from the light-receiving element and the replica is smaller than combined impedance between the light-receiving element and the power source or ground and combined impedance between the replica and the power source or ground in a signal band.

(10) The distance measuring device according to (8) or (9), in which one end of a secondary-side coil of the balun transformer is connected to a non-inverting input of a differential amplifier and the other end is connected to an inverting input.

(11) The distance measuring device according to any one of (8) to (10), in which the light-receiving element is a SiPM.

(12) The distance measuring device according to (10) or (11), in which a resistance is connected between the light-receiving element and the power source or ground and between the replica and the power source or ground.

(13) The distance measuring device according to any one of (8) to (12), in which the total number of turns of the secondary-side coil of the balun transformer is four times or more the number of turns of the primary-side coil.

(14) The distance measuring device according to (10), in which an output of the differential amplifier is a differential signal.

(15) A distance measuring device, including:

a light-receiving circuit in which both ends of a primary-side coil of a balun transformer are connected to a light-receiving element and a replica of the light-receiving element, the light-receiving element and the replica are connected to a bias T, one end of the bias T is connected to a modulator circuit, and an application voltage to the light-receiving element and the replica is modulated by the modulator circuit.

(16) The distance measuring device according to (15), in which combined impedance of a balun transformer seen from the light-receiving element and the replica is smaller than combined impedance between the light-receiving element and the bias T and combined impedance between the replica and the bias T in a signal band.

(17) The distance measuring device according to (15) or (16), in which one end of the secondary-side coil of the balun transformer is connected to a non-inverting input of a differential amplifier and the other end is connected to an inverting input.

(18) The distance measuring device according to any one of (15) to (17), in which the light-receiving element is a SiPM.

(19) The distance measuring device according to any one of (15) to (18), in which a resistance is connected between the light-receiving element and the bias T and between the replica and the bias T.

(20) The distance measuring device according to any one of (15) to (19), in which the number of turns of the secondary-side coil of the balun transformer is four times or more of the number of turns of the primary-side coil.

(21) The distance measuring device according to (17), in which an output of the differential amplifier is a differential signal.

(22) The distance measuring device according to any one of (15) to (21), in which a dip is formed in a base waveform of an output from the secondary-side coil of the balun transformer by the modulator circuit, and an orientation of the dip and an orientation of a light-receiving signal of a SiPM are opposed to each other with respect to a baseline.

(23) The distance measuring device according to (22), in which a noise signal caused by stray light is included in the dip.

Application Example

Next, an application example of the present disclosure will be described. The SP described in one embodiment is capable of performing distance measurement with high efficiency within the range of ten and several centimeters to several ten meters, and outputting distance data with a latency of 1 millisecond or less. The distance accuracy is millimeters to several millimeters, and the following applications are possible by taking advantage of low power consumption and small size.

Figure 45:
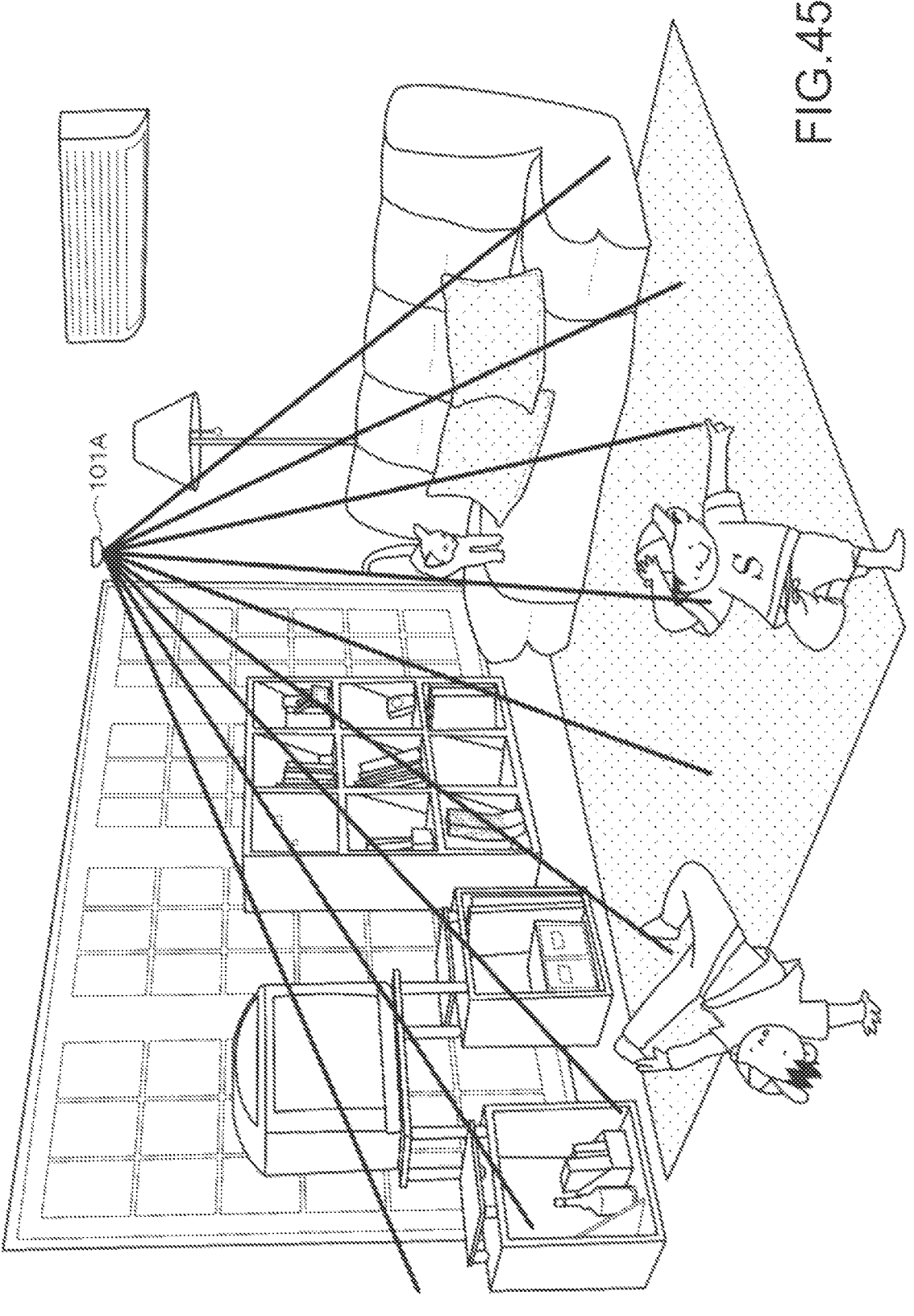
FIG. 45 is a diagram referred to when an application example is described.

For example, when the distance measuring device 101A is disposed in the corner of a room as shown in FIG. 45, the entire room can be measured, and therefore, violent movement in the room or slight movement such as moving the finger while watching TV on the sofa can be captured. This makes it possible to operate electronic apparatuses such as home appliances, provide an interactive game experience, and use it for security. Further, since a scanning SP has very little mutual interference between devices, by performing distance measurement from two or more directions with a plurality of distance sensor systems, 3D modeling is possible in real time and a more realistic and interactive experience can be provided. Since the SP can be used even in the sunlight, it is also possible to provide an experience that expands FIG. 45 to a wider space.

Figure 46:
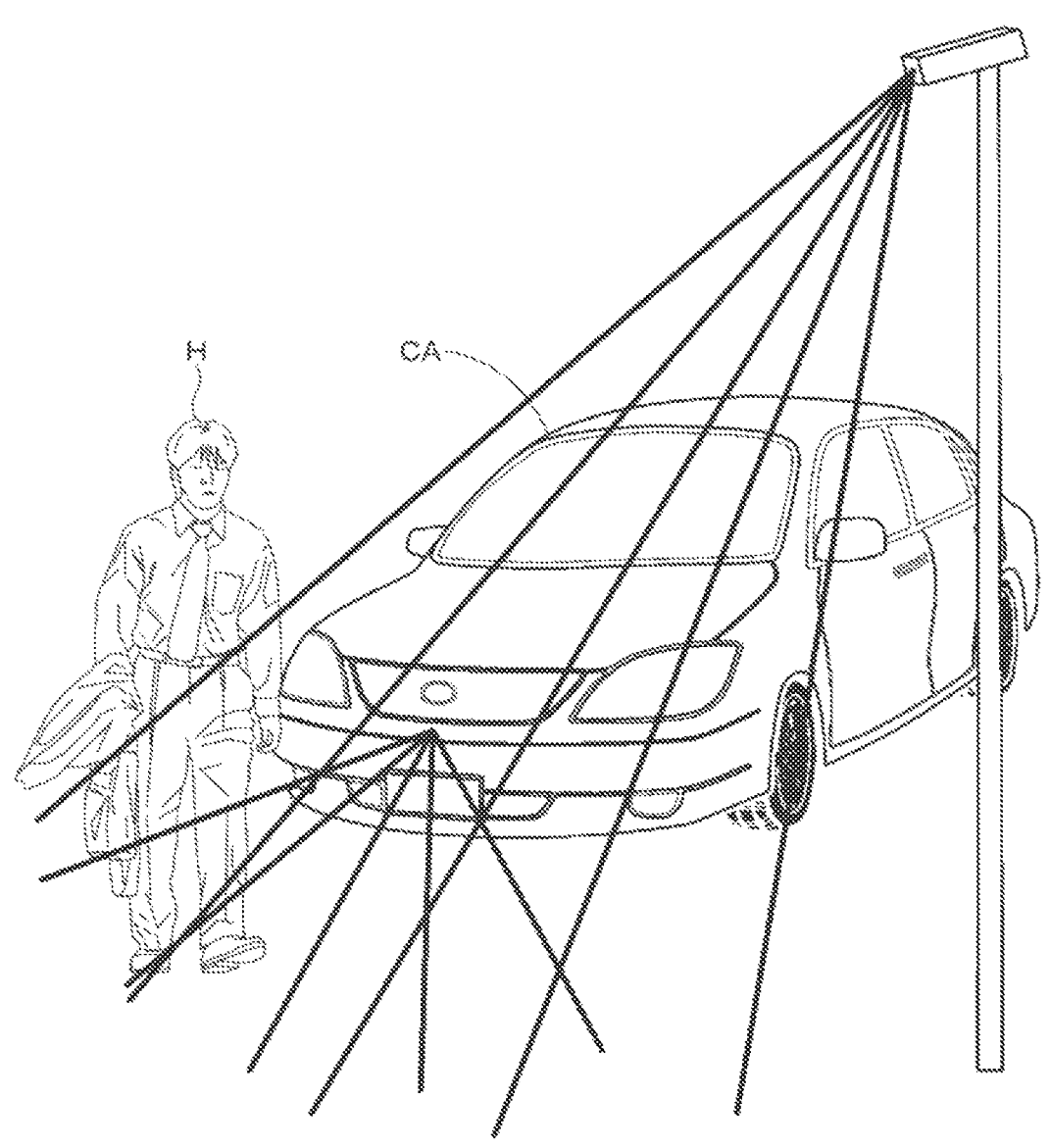
FIG. 46 is a diagram referred to when an application example is described.

FIG. 46 is a diagram schematically showing an application example assuming a usage scene in a city centered on people. Since the SP mounted on an automobile CA performs highly-accurate distance measurement in real time, it is possible to grasp sight movement even in a narrow place such as an intersection and an alley where the distance to a person is short. As a result, not only the safety of a person H but also smooth driving of the automobile CA that automatically drives can be supported. The SP grounded to a utility pole, a roadable tree, or the like is capable of grasping slight movement of a passerby without obstructing the flow line of the person H. Real-time point cloud data is acquired and can be operated with consideration for privacy. For example, it provides information service predicting the movement of the person H, detects crimes in advance, or functions as an interface in the case where a person intentionally operates a public object. Such movement needs to capture the movement of a finger.

Figure 47:
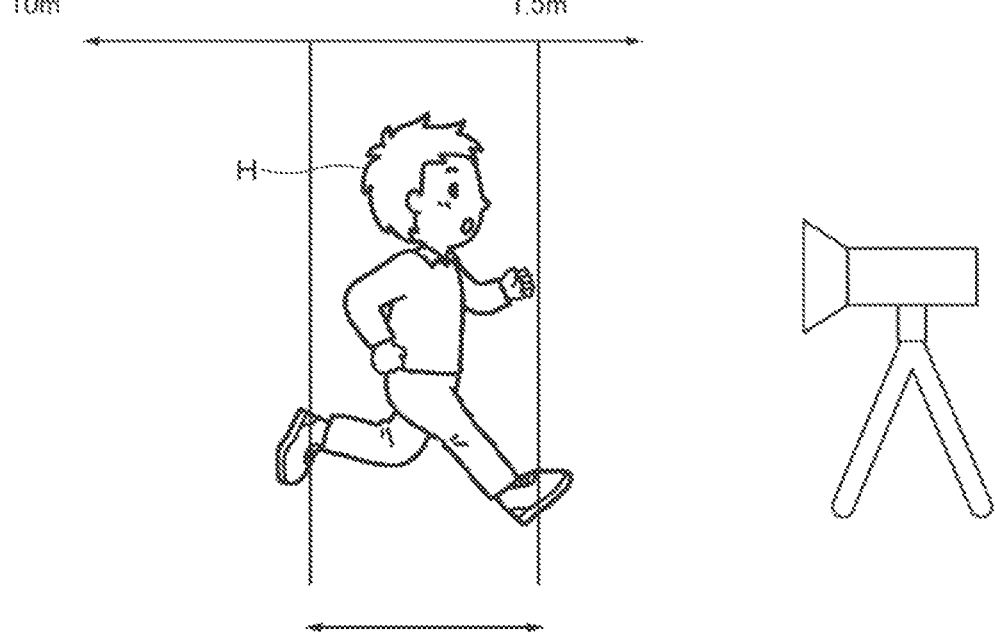
FIG. 47 is a diagram referred to when an application example is described.

FIG. 47 is a schematic diagram showing an application example regarding an imaging technology. Even if the lens has a very shallow depth of focus such as a large camera, the distance measuring device 101A accurately captures position information of a subject (e.g., the person H) to calculate the focal length and the depth of focus, thereby making it possible to automatically adjust the lens. The present disclosure is not limited to this example and can be used for various devices that automatically control the distance. For example, the present disclosure can be applied also to machine connection, train connection, aircraft aerial refueling, artificial satellite connection, and the like.

Further, since the distance measuring device 101A in the present disclosure is small and has low power consumption, it can be applied also to avoiding obstacles of unmanned aerial vehicles such as a drone. There are many severe conditions for drone flight, such as forests and underpasses, the SP capable of outputting point cloud data in real time enables fast and safe flight. The SP is also excellent for asset management of structures using a drone, is capable of acquiring point clouds of mega points or more per second in real time, and has lower power consumption, making it possible to inspect many structures in a single flight.

The real-time SP goes well with sports. In sports judgement, coaching, and the like, point clouds of mega points or more per second capture small movement and a real-time interactive experience digitizes a sensuous sports operation. For example, a person wears a wearable device such as a piezoelectric element that the person can experience and information obtained by the SP is transmitted to the person in real time, thereby improving the understanding.

Further, the technology according to the present disclosure is applicable to various products. For example, the technology according to the present disclosure may be realized as an apparatus installed in any kind of moving object such as automobiles, electric cars, hybrid electric vehicles, motorcycles, bicycles, personal mobility, airplanes, drones, ships, robots, construction equipment, and agricultural machinery (tractors).

Figure 48:
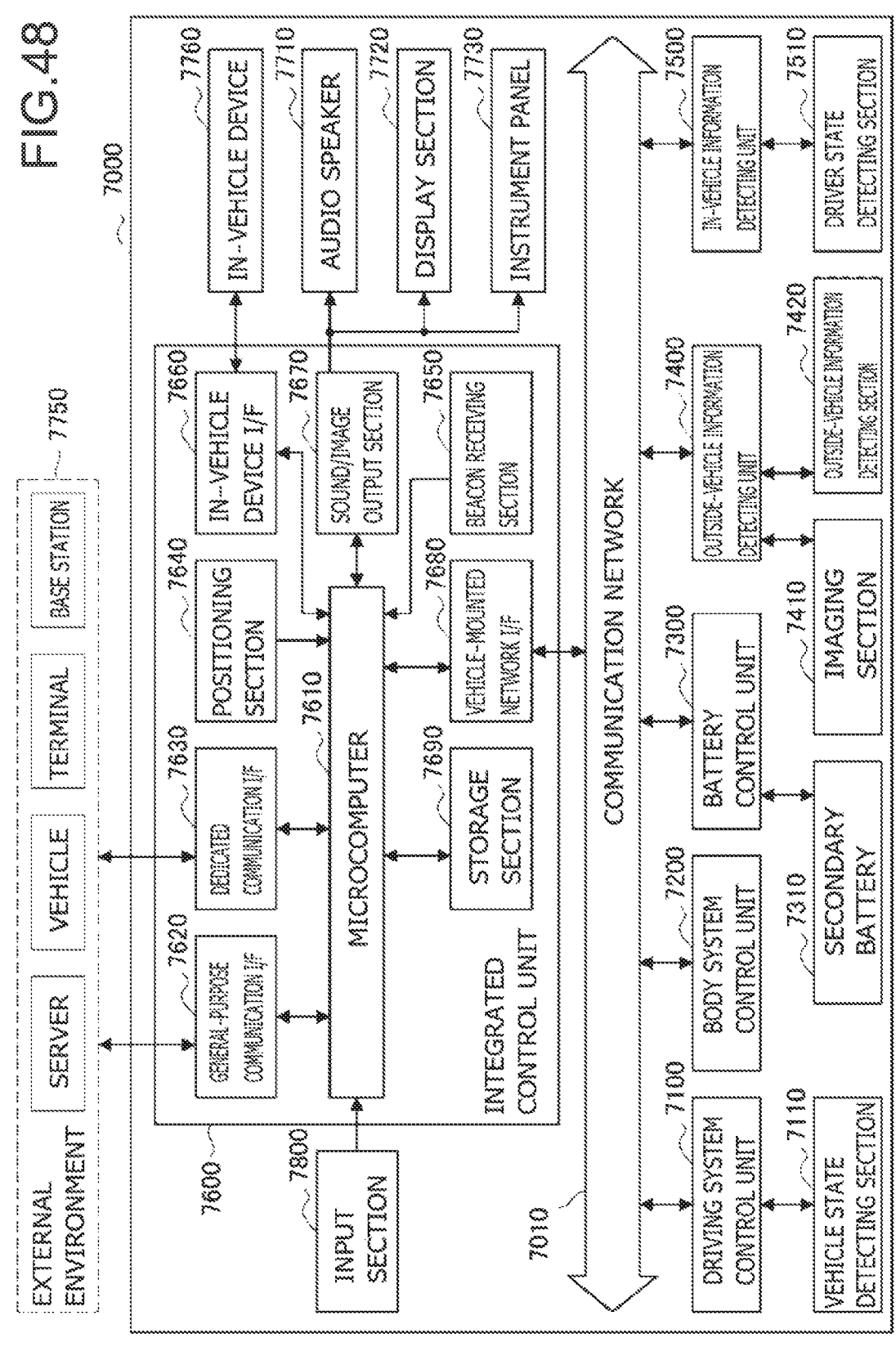
FIG. 48 is a block diagram depicting an example of schematic configuration of a vehicle control system.

FIG. 48 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 48, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 48 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 49:
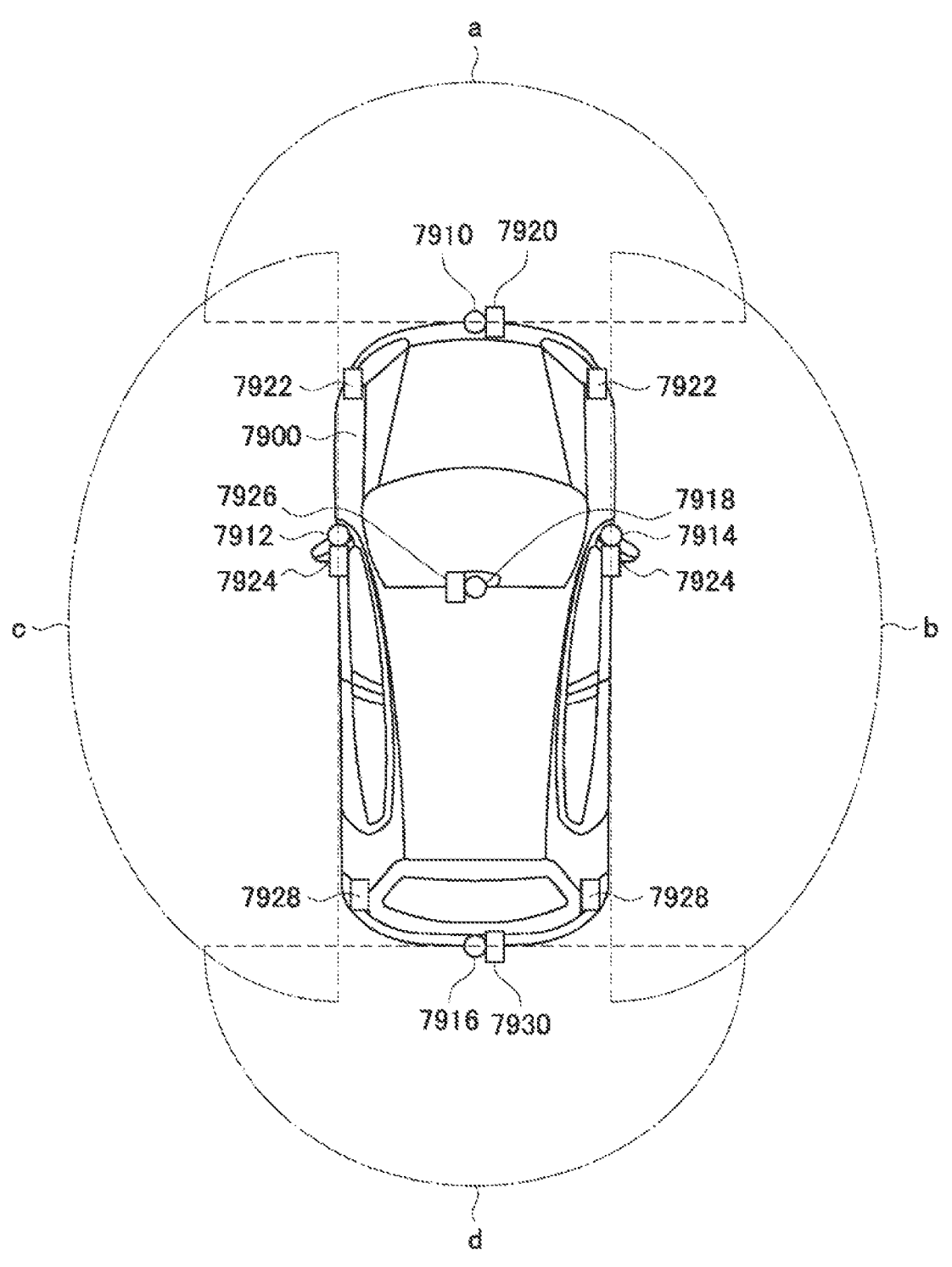
FIG. 49 is a diagram of assistance in explaining an example of installation positions of an outside-vehicle information detecting section and an imaging section.

FIG. 49 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 49 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 48, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture.

Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GLASS) signal from a GLASS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 48, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 48 may be integrated into one control unit.

Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the distance measuring device 101A according to this embodiment can be applied to the outside-vehicle information detecting unit.

Further, at least some of the components of the distance measuring device 101A may be realized in a module (e.g., an integrated circuit module including one die) for the integrated control unit 7600 shown in FIG. 48. Alternatively, the distance measuring device 101A may be realized by a plurality of control units of the vehicle control system 7000 shown in FIG. 48.

REFERENCE SIGNS LIST

101 distance sensor system
101A distance measuring device
104 light source unit
105 optical-path branching unit
115 second light-receiving unit
116 second signal molding unit

The invention claimed is:

1. A Q-switched semiconductor light-emitting element, comprising:

a comb electrode that has at least two or more gain regions and two or more absorption regions, the regions including an active layer and being continuous on a semiconductor substrate, separation regions being provided between the gain regions and the absorption regions, the longest region of the gain regions being located on a rear end surface side; and an optical waveguide that staddles the gain regions, the absorption regions, and the separation regions.

2. The Q-switched semiconductor light-emitting element according to claim 1, wherein the gain regions, the separation regions, and the absorption regions on a surface layer side of the active layer on the semiconductor substrate has a PNP structure.

3. The Q-switched semiconductor light-emitting element according to claim 2, further comprising:

a cathode electrode provided on a back surface of the semiconductor substrate; and an anode electrode provided in the absorption regions, wherein a switching element such as an NMOS is provided between the cathode electrode and a ground, the anode electrode is connected to a delay circuit, an output side of the delay circuit is branched and connected to a capacitor a matching resistance, the capacitor is grounded, and the matching resistance is connected to a constant-voltage source or grounded.

4. The Q-switched semiconductor light-emitting element according to claim 2, wherein a damping resistance and a capacitor are provided in series between the cathode electrode and the anode electrode in order from a side of the cathode electrode.

5. A distance measuring device, comprising:

the Q-switched semiconductor light-emitting element according to claim 1.

* * * * *